United States Patent
Kim et al.

(10) Patent No.: US 10,075,569 B2
(45) Date of Patent: Sep. 11, 2018

(54) ELECTRONIC DEVICE WITH METAL FRAME ANTENNA

(71) Applicant: Samsung Electronics Co., Ltd., Gyeonggi-do (KR)

(72) Inventors: Jaehyung Kim, Gyeonggi-do (KR); Jinkyu Bang, Gyeonggi-do (KR); Jinu Kim, Seoul (KR); Donghwan Kim, Gyeonggi-do (KR); Taegyu Kim, Gyeonggi-do (KR); Kiyoung Chang, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/351,161

(22) Filed: Nov. 14, 2016

(65) Prior Publication Data

US 2017/0142241 A1    May 18, 2017

(30) Foreign Application Priority Data

Nov. 13, 2015    (KR) .................. 10-2015-0159787

(51) Int. Cl.
    *H04B 1/38*    (2015.01)
    *H04M 1/02*    (2006.01)
    *H01Q 1/24*    (2006.01)

(52) U.S. Cl.
    CPC .......... *H04M 1/0218* (2013.01); *H01Q 1/243* (2013.01); *H04M 1/026* (2013.01); *H04M 1/0214* (2013.01); *H04M 1/0235* (2013.01); *H04M 1/0268* (2013.01)

(58) Field of Classification Search
    CPC ..... H04M 1/026; H04M 1/0218; H01Q 1/243
    See application file for complete search history.

(56) References Cited

U.S. PATENT DOCUMENTS

| 7,417,593 | B1 | 8/2008 | Hslao et al. |
| 8,090,419 | B2 | 1/2012 | Isoda et al. |
| 9,143,867 | B2 * | 9/2015 | Nabata ............... H04R 17/00 |
| 2004/0063476 | A1 | 4/2004 | Katagishi et al. |
| 2014/0051487 | A1 * | 2/2014 | Honma ............... H04M 1/0214 |
| | | | 455/575.3 |
| 2014/0145886 | A1 | 5/2014 | Cul |

(Continued)

OTHER PUBLICATIONS

International Search Report dated Jan. 31, 2017 issued in counterpart application No. PCT/KR2016/012908, 8 pages.

*Primary Examiner* — Tuan Pham
(74) *Attorney, Agent, or Firm* — The Farrell Law Firm, P.C.

(57) ABSTRACT

An electronic device is provided. The electronic device includes a housing and a connection part. The housing includes a first housing portion that includes a first side face, and a second housing portion that includes a second side face. The connection part connects the first housing portion and the second housing portion. A first conductive member extends along at least a portion of the first side face, a first non-conductive member is disposed on the first side face, a second conductive member extends along at least a portion of the second side face, a second non-conductive member is disposed on the second side face, and when the second housing portion faces the first housing portion, the first non-conductive member and the second non-conductive member are substantially aligned.

13 Claims, 46 Drawing Sheets

(56) References Cited

U.S. PATENT DOCUMENTS

2014/0295919 A1* 10/2014 Inami ................ H04M 1/0235
    455/566
2015/0070219 A1    3/2015 Dinh et al.
2015/0171916 A1* 6/2015 Asrani ................ H04B 1/68
    455/575.7

* cited by examiner

ELECTRONIC DEVICE WITH METAL FRAME ANTENNA

PRIORITY

This application claims priority under 35 U.S.C. § 119(a) to Korean Patent Application Serial No. 10-2015-0159787, which was filed in the Korean Intellectual Property Office on Nov. 13, 2015, the entire content of which is incorporated herein by reference.

BACKGROUND

1. Field of the Disclosure

The present disclosure relates generally to an electronic device in which an exterior metal frame operates as an antenna radiator.

2. Description of the Related Art

An electronic device having a communication function may provide a mobile communication service using an antenna. The antenna may be arranged in a partial region of the inside and/or the outside of a housing of the electronic device. The antenna may be formed as a pattern of a printed circuit board, may be arranged on a carrier as a plate type, and may be formed on a flexible printed circuit board to be positioned within the housing.

As another method, the antenna may use a metallic mechanical product as a radiator, or there may be a bezel-antenna or the like that uses the metallic housing as a radiator.

An antenna may be positioned inside an electronic device, and an exterior housing may be formed of a metal frame. A signal transmitted to the outside from the antenna arranged inside the electronic device may be at least partially distorted or blocked by a metal frame, which may cause the radiating performance of the antenna to be deteriorated.

The internal space of the housing of the electronic device, in which an antenna is to be mounted, may be limited, and when the electronic device is miniaturized, the internal space may be further limited.

In addition, when frequency bands to be supported by an antenna are diversified, the internal space of the housing may be further limited because of the necessity to arrange a plurality of antennas or to arrange an antenna having a complicated form.

SUMMARY

The present disclosure has been made to address at least the above-mentioned problems and/or disadvantages and to provide at least the advantages described below.

Accordingly, an aspect of the present disclosure is to improve radiation performance of an antenna by aligning a non-conductive member formed on an exterior of a first housing portion of an electronic device with a non-conductive member formed on an exterior of a second housing portion of the electronic device and using conductive member of the exterior of the electronic device as the antenna.

In accordance with an aspect of the present disclosure, an electronic device is provided. The electronic device includes a housing and a connection part. The housing includes a first housing portion that includes a first side face, and a second housing portion that includes a second side face. The connection part connects the first housing portion and the second housing portion. A first conductive member extends along at least a portion of the first side face, a first non-conductive member is disposed on the first side face, a second conductive member extends along at least a portion of the second side face, a second non-conductive member is disposed on the second side face, and when the second housing portion faces the first housing portion, the first non-conductive member and the second non-conductive member are substantially aligned.

In accordance with another aspect of the present invention an electronic device is provided. The electronic device includes a first electronic device including a first side face, and a second electronic device connected to the first electronic device and including a second side face. The first electronic device further includes a first conductive rim structure that encloses at least a portion of the first side face, and a first insulation portion disposed on the first side face. The second electronic device further includes a second conductive rim structure that encloses at least a portion of the second side face, and a second insulation portion disposed on the second side face.

In accordance with another aspect of the present disclosure, a portable electronic device is provided. The portable device includes a first electronic device portion including a first housing having a first side face; and a second electronic device portion including a second housing having a second side face, the second housing connected to the first housing and folded to at least partially overlap with the first housing. The first side face of the first electronic device includes a first metal portion, a second metal portion electrically spaced apart from the first metal portion, and a first non-metal portion between the first metal portion and the second metal portion. The second side face of the second electronic device includes a third metal portion, a fourth metal portion electrically spaced apart from the third metal portion, and a second non-metal portion between the third metal portion and the fourth metal portion. The first non-metal portion and the second non-metal portion are aligned to each other when the second housing is folded to overlap with the first housing.

In accordance with another aspect of the present disclosure, an electronic device is provided. The electronic device includes a housing, a connection part, and a communication circuit. The housing includes a first housing portion that includes a first side face, and a second housing portion that includes a second side face. The connection part connects the first housing portion and the second housing portion. The communication circuit is disposed within the housing. A first conductive member forms a portion of the first side face of the first housing portion, and electrically connects to the communication circuit, a first non-conductive member forms another portion of the first side face of the first housing portion, and contacts the first conductive member, a second conductive member forms a portion of the second side face of the second housing portion, a second non-conductive member forms another portion of the second side face of the second housing, and contacts the second conductive member, and when the first and second housing portions overlap, the first non-conductive member and the second non-conductive member are substantially aligned to each other.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
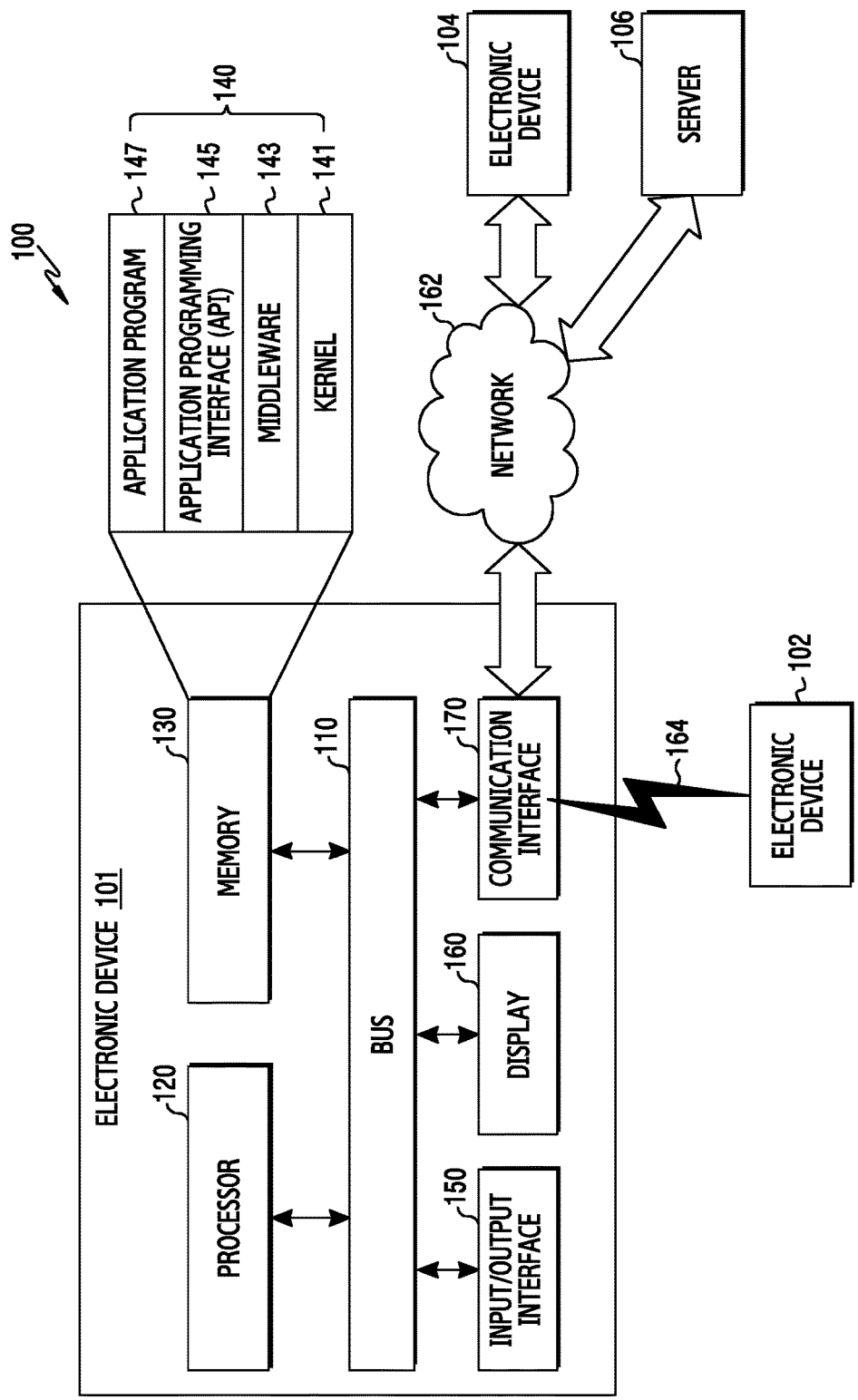
FIG. 1 is a block diagram of an electronic device within a network environment, according to an embodiment of the present disclosure.

Hereinafter, embodiments of the present disclosure will be described in connection with the accompanying drawings. The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications, equivalents, and/or alternatives within the spirit and scope of the present disclosure. In the description of the drawings, similar reference numerals may be used to designate similar elements.

Herein, the expressions "include", "may include" and other conjugates refer to the existence of a corresponding disclosed function, operation, or constituent element, and do not limit one or more additional functions, operations, or constituent elements. Further, "have", and their conjugates merely denote a certain feature, numeral, step, operation, element, component, or a combination thereof, and do not exclude the existence or possibility of addition of one or more other features, numerals, steps, operations, elements, components, or combinations thereof.

The expression "or" or "at least one of A or/and B" includes any or all of combinations of words listed together. For example, the expression "A or B" or "at least A or/and B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. Accordingly, a first element may be referred to as a second element, and likewise a second element may also be referred to as a first element, without departing from the scope of embodiments of the present disclosure.

When an element is referred to as being "coupled" or "connected" to any other element, it should be understood that not only may the element be coupled or connected directly to the other element, but also a third element may be interposed therebetween. Contrarily, when an element is referred to as being "directly coupled" or "directly connected" to any other element, it should be understood that no other element is interposed between the two elements.

The terms herein are used merely to describe one or more certain embodiments and are not intended to limit the present disclosure. As used herein, singular forms may include plural forms as well, unless the context explicitly indicates otherwise. Further, all terms used herein, including technical and scientific terms, have the same meaning as commonly understood by those of skill in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined in herein.

An electronic device according to the present disclosure may be a device including a communication function. For example, the electronic device may include at least one of a Smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g. a head-mounted-device, such as electronic glasses, electronic clothes, an electronic bracelet, an electronic necklace, an electronic appcessory, electronic tattoos, or a smartwatch).

The electronic device may also be a smart home appliance with a communication function such as a television, a digital versatile disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

The electronic device may also include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM), and a point of sale (POS) device.

The electronic device may also include at least one of a part of furniture or a building/structure, an electronic board, an electronic signature receiving device, a projector, and various kinds of measuring instruments (e.g., a water meter, an electric meter, a gas meter, and a radio wave meter).

Further, the electronic device may be a flexible device.

The electronic device may also be a combination of one or more of the aforementioned various devices. Further, it will be apparent to those skilled in the art that the electronic device, according to the present disclosure, is not limited to the aforementioned devices.

Herein, the term "user" in may indicate a person who uses an electronic device or a device (e.g., an artificial intelligence electronic device) that uses an electronic device.

FIG. 1 is a block diagram of an electronic device within a network environment, according to an embodiment of the present disclosure.

Referring to FIG. 1, an electronic device 101 is provided in a network environment. The electronic device 101 includes at least one of a bus 110, a processor 120, a memory 130, an input/output interface 150, a display 160, and a communication interface 170. At least one of the components of the electronic device 101 may be omitted, or other components may be additionally included in the electronic device 101.

The bus 110 is a circuit that interconnects the aforementioned components of the electronic device 101 and transmits communication signals (e.g., control messages) between the components.

The processor 120 carries out operations or data processing related to control and/or communication of at least one other component (for example, the memory 130, the input/output interface 150, the display 160, or the communication interface 170) of the electronic device 101.

The memory 130 stores commands or data (e.g., a reference pattern or a reference touch area) associated with one or more other components of the electronic device 101. The memory 130 stores software and/or a program 140. For example, the program 140 includes a kernel 141, a middleware 143, an application programming interface (API) 145, an application program 147, with one or more of the kernel 141, the middleware 143, and the API 145 being referred to as an Operating System (OS).

The kernel 141 controls or manages system resources (e.g., the bus 110, the processor 120, or the memory 130) used for performing an operation or function implemented by the other programs (e.g., the middleware 143, the API 145, or the application program 147). Further, the kernel 141 provides an interface through which the middleware 143, the API 145, or the application program 147 may access the individual elements of the electronic device 101 to control or manage the system resources.

The middleware 143 functions as an intermediary for allowing the API 145 or the application program 147 to communicate with the kernel 141 to exchange data. In addition, the middleware 143 processes one or more task requests received from the application program 147 according to priorities thereof. For example, the middleware 143 assigns priorities for using the system resources (e.g., the bus 110, the processor 120, or the memory 130) of the electronic device 101, to at least one application of the application program 147. For example, the middleware 143 performs scheduling or loading balancing on the one or more task requests by processing the one or more task requests according to the priorities assigned thereto.

The API 145 is an interface through which the application 147 controls functions provided from the kernel 141 or the middleware 143, and may include at least one interface or function (e.g., instruction) for file control, window control, image processing, or text control.

The input/output interface 150 forwards instructions or data input from a user through an input/output device (e.g., various sensors, such as an acceleration sensor or a gyro sensor, and/or a device such as a keyboard or a touch screen), to the processor 120, the memory 130, or the communication interface 170 through the bus 110. For example, the input/output interface 150 provides the processor 120 with data on a user' touch entered on a touch screen. Further, the input/output interface 150 outputs instructions or data, received from the processor 120, the memory 130, or the communication interface 170 via the bus 110, through an output unit (e.g., a speaker or the display 160).

The display 160 includes, for example, a liquid crystal display (LCD), a light emitting diode (LED) display, an organic LED (OLED) display, a micro electro mechanical system (MEMS) display, an electronic paper display, etc. The display 160 displays various types of content (e.g., a text, images, videos, icons, symbols, etc.) for the user. The display 160 may include a touch screen and receive a touch input, a gesture input, a proximity input, a hovering input, etc., using an electronic pen or a user's body part. The display 160 may display a web page.

The communication interface 170 sets communication between the electronic device 101 and a first external electronic device 102, a second external electronic device 104, or a server 106. For example, the communication interface 170 connects to a network 162 through wireless or wired communication to communicate with the second external electronic device 104 or the server 106.

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include a short range communication 164. The short-range communication 164 may include at least one of Wi-Fi, Bluetooth™ (BT), near field communication (NFC), and GPS.

Each of the first external electronic device 102 and the second external electronic device 104 may be a device which is the same as or different from the electronic device 101.

The server 106 may include a group of one or more servers.

According to the present disclosure, all or a part of operations performed in the electronic device 101 can be performed in another electronic device or multiple electronic devices (e.g., the first external electronic device 102 or the second external electronic device 104 or the server 106). In this case, when the electronic device 101 should perform some functions or services automatically or by a request, the electronic device 101 may make a request for performing at least some functions related to the functions or services by the first external electronic device 102, the second external electronic device 104, or the server 106, instead of performing the functions or services by itself. The first external electronic device 102, the second external electronic device 104, or the server 106 may perform a function requested from the electronic device 101 or an additional function and transfer the performed result to the electronic device 101. The electronic device 101 can provide the requested function or service to another electronic device by processing the received result as it is or additionally. To this end, for example, cloud computing, distributed computing, or client-server computing technology may be used.

Figure 2:
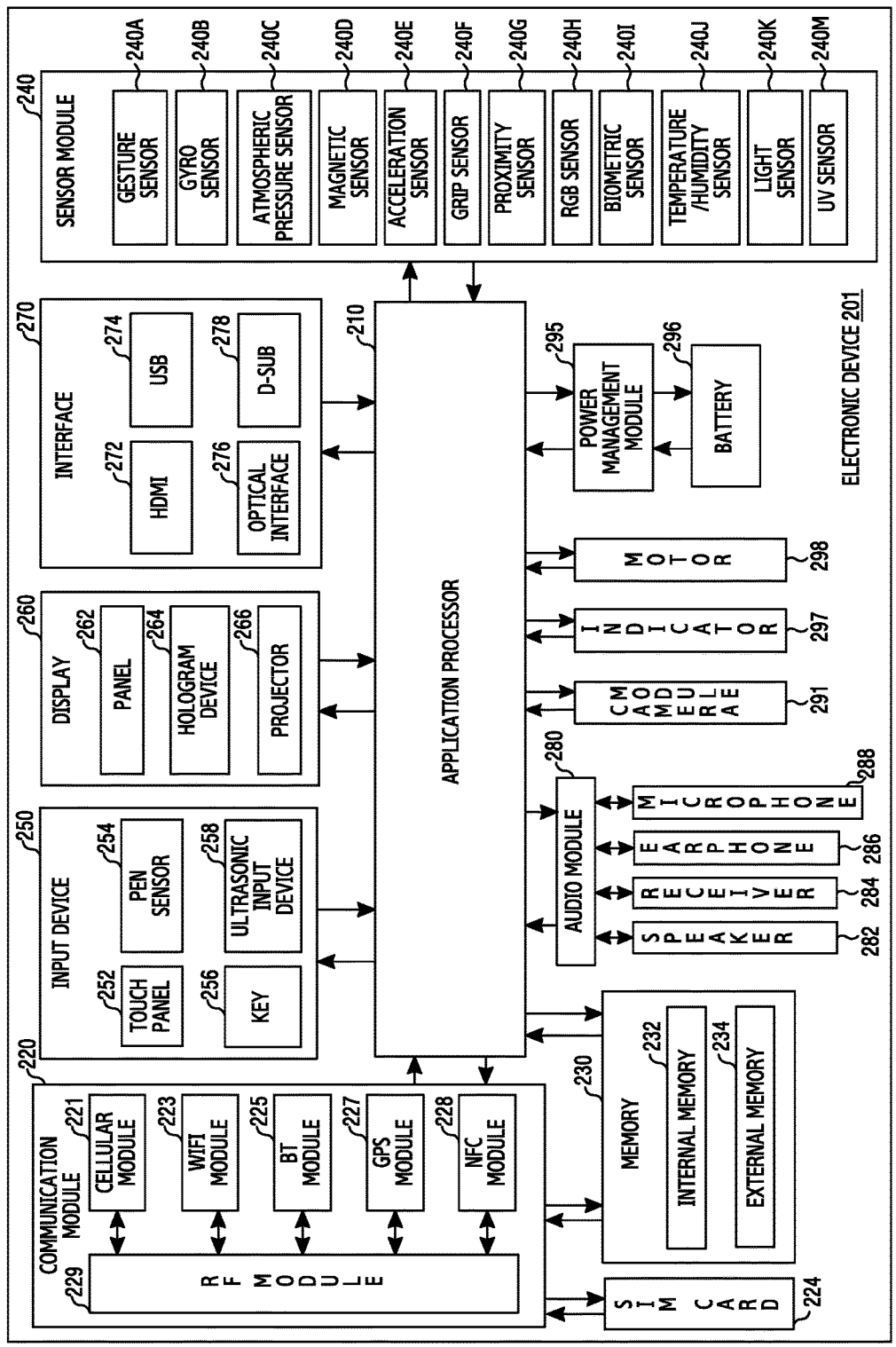
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2, an electronic device 201 is provided. The electronic device 201 may constitute the entirety or a part of the electronic device 101 illustrated in FIG. 1, or may expand all or some elements of the electronic device 101. The electronic device 201 includes an application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 runs an operating system or an application program to control a plurality of hardware or software elements connected to the AP 210, and may perform processing and operation of various data including multimedia data. The AP 210 may be implemented as a system on chip (SoC). The AP 210 may further include a graphical processing unit (GPU). The AP 210 may further include at least one of other elements of the electronic device 210 (e.g., the cellular module 221). The AP 210 loads an instruction or data, which is received from a non-volatile memory connected to each or at least one of other elements, to a volatile memory and processes the loaded instruction or data. In addition, the AP 210 stores in the non-volatile memory, data received from at least one of the other elements or generated by at least one of the other elements.

The communication module 220 performs data transmission/reception in communication between the electronic device 201 and other electronic devices connected through a network. The communication module 220 includes a cellular module 221, a Wi-Fi module 223, a BT module 225, a GPS module 227, an NFC module 228, and a radio frequency (RF) module 229.

The cellular module 221 provides a voice telephony, a video telephony, a text service, an Internet service, etc., through a telecommunication network (e.g., LTE, LTE-A, CDMA, WCDMA, UMTS, WiBro, GSM, etc.). In addition, the cellular module 221 may use the SIM card 224 to perform electronic device identification and authorization within the telecommunication network. According to an embodiment of the present disclosure, the cellular module 221 may perform at least some of functions that the AP 210 may provide. For example, the cellular module 221 may perform at least one part of a multimedia control function.

The WiFi module 223, the BT module 225, the GPS module 227 and the NFC module 228 each may include a processor for processing data transmitted/received through the corresponding module. According to an embodiment of the present disclosure, two or more of the cellular module 221, the WiFi module 223, the BT module 225, the GPS module 227 and the NFC module 228 may be included within one IC or IC package.

The RF module 229 performs transmission/reception of an RF signal. The RF module 229 may include a transceiver, a power amplifier module (PAM), a frequency filter, a low noise amplifier (LNA), an antenna, etc. According to an embodiment of the present disclosure, at least one of the cellular module 221, the WiFi module 223, the BT module 225, the GPS module 227 or the NFC module 228 may perform transmission/reception of an RF signal through a separate RF module.

The SIM card 224 may be inserted into a slot provided in a specific position of the electronic device 201. The SIM card 224 includes unique identification information (e.g., an integrated circuit card ID (ICCID)) or subscriber information (e.g., an international mobile subscriber identity (IMSI)).

The memory 230 includes an internal memory 232 or an external memory 234. The internal memory 232 includes at least one of a volatile memory (e.g., a dynamic random access memory (DRAM), a static RAM (SRAM) and a synchronous DRAM (SDRAM)) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory).

The internal memory 232 may be a solid state drive (SSD).

The external memory 234 may include a flash drive, for example, compact flash (CF), secure digital (SD), micro-SD, mini-SD, extreme digital (xD), a memory stick, etc. The external memory 234 may be operatively connected with the electronic device 201 through various interfaces.

The sensor module 240 measures a physical quantity or detects an activation state of the electronic device 201, and converts measured or detected information into an electric signal. The sensor module 240 includes, at least one of a gesture sensor 240A, a gyro sensor 240B, an air pressure sensor 240C, a magnetic sensor 240D, an acceleration sensor 240E, a grip sensor 240F, a proximity sensor 240G, a red, green, blue (RGB) sensor 240H, a biometric sensor 240I, a temperature/humidity sensor 240J, an light sensor 240K, and an ultraviolet (UV) sensor 240M. Additionally or alternatively, the sensor module 240 may also include an E-nose sensor, an electromyography (EMG) sensor, an electroencephalogram (EEG) sensor, an electrocardiogram (ECG) sensor, an infrared (IR) sensor, an iris sensor, a fingerprint sensor, etc. The sensor module 240 may further include a control circuit for controlling at least one or more sensors belonging therein.

The input device 250 includes a touch panel 252, a (digital) pen sensor 254, a key 256, an ultrasonic input device 258, and the like.

The touch panel 252 may detect a touch input in at least one of a capacitive overlay scheme, a pressure sensitive scheme, an infrared beam scheme, and an acoustic wave scheme. The touch panel 252 may also include a control circuit. In the case of the capacitive overlay scheme, physical contact or proximity detection is possible. The touch panel 252 may further include a tactile layer, to provide a tactile response to a user.

The (digital) pen sensor 254 may be implemented in the same or a similar method to receiving a user's touch input or by using a separate sheet for detection.

The key 256 may include a physical button, an optical key, or a keypad.

The ultrasonic input device 258 is capable of identifying data by detecting a sound wave in the electronic device 201 through an input tool generating an ultrasonic signal, and enables wireless detection.

The electronic device 201 may also use the communication module 220 to receive a user input from a connected external device (e.g., a computer or a server).

The display 260 includes a panel 262, a hologram device 264, or a projector 266.

The panel 262 may be an LCD, an Active-Matrix Organic LED (AMOLED), etc. The panel 262 may be implemented to be flexible, transparent, or wearable. The panel 262 may be constructed as one module along with the touch panel 252 as well.

The hologram device 264 may use interference of light to display a three-dimensional image in the air.

The projector 266 may project light to a screen to display an image. The screen may be located inside or outside the electronic device 201.

The display 260 may further include a control circuit for controlling the panel 262, the hologram device 264, or the projector 266.

The interface 270 includes a high-definition multimedia interface (HDMI) 272, a universal service bus (USB) 274, an optical interface 276, or a D-subminiature (D-sub) 278. Additionally or alternatively, the interface 270 may include a mobile high-definition link (MHL) interface, an SD card/multimedia card (MMC) interface or an infrared data association (IrDA) standard interface.

The audio module 280 converts a voice and an electric signal interactively. The audio module 280 may process sound information which is inputted or outputted through a speaker 282, a receiver 284, an earphone 286, the microphone 288, and the like.

The camera module 291 takes still pictures and moving pictures. The camera module 291 may include one or more image sensors (e.g., a front sensor or a rear sensor), a lens, an image signal processor (ISP), or a flash (e.g., an LED or a xenon lamp).

The power management module 295 manages electric power of the electronic device 201. The power management module 295 may include a power management integrated circuit (PMIC), a charger IC, a battery, a battery gauge, etc.

The PMIC may be mounted within an integrated circuit or an SoC semiconductor. A charging scheme may be divided into a wired charging scheme and a wireless charging scheme. The charger IC charges the battery 296, and prevents the inflow of overvoltage or overcurrent from an electric charger. The charger IC includes a charger IC for at least one of the wired charging scheme or the wireless charging scheme. The wireless charging scheme may be a magnetic resonance scheme, a magnetic induction scheme, an electromagnetic wave scheme, etc. A supplementary circuit for wireless charging a circuit, such as a coil loop, a resonance circuit, a rectifier, and the like, may be added.

The battery gauge may measure a level of the battery 296, a voltage during charging, a current or a temperature. The battery 296 generates or stores electricity, and uses the stored or generated electricity to supply power to the electronic device 201. The battery 296 may include, for example, a rechargeable battery or a solar battery.

The indicator 297 displays a specific status of the electronic device 201 or one part (e.g., the AP 210) thereof, for example, a booting state, a message state, a charging state, etc.

The motor 298 may convert an electric signal into a mechanical vibration.

The electronic device 101 may include a processing device (e.g., a GPU) for mobile TV support. The processing device for mobile TV support may process media data according to the standards of digital multimedia broadcasting (DMB), digital video broadcasting (DVB), a media flow, and the like.

Each of the above-described elements of the electronic device may include one or more components, and the name of a corresponding element may vary according to the type of electronic device. The electronic device according to the present disclosure may include at least one of the above-described elements and may exclude some of the elements or further include other additional elements. Further, some of the elements of the electronic device according to the present disclosure may be coupled to form a single entity while performing the same functions as those of the corresponding elements before the coupling.

Figure 3A:
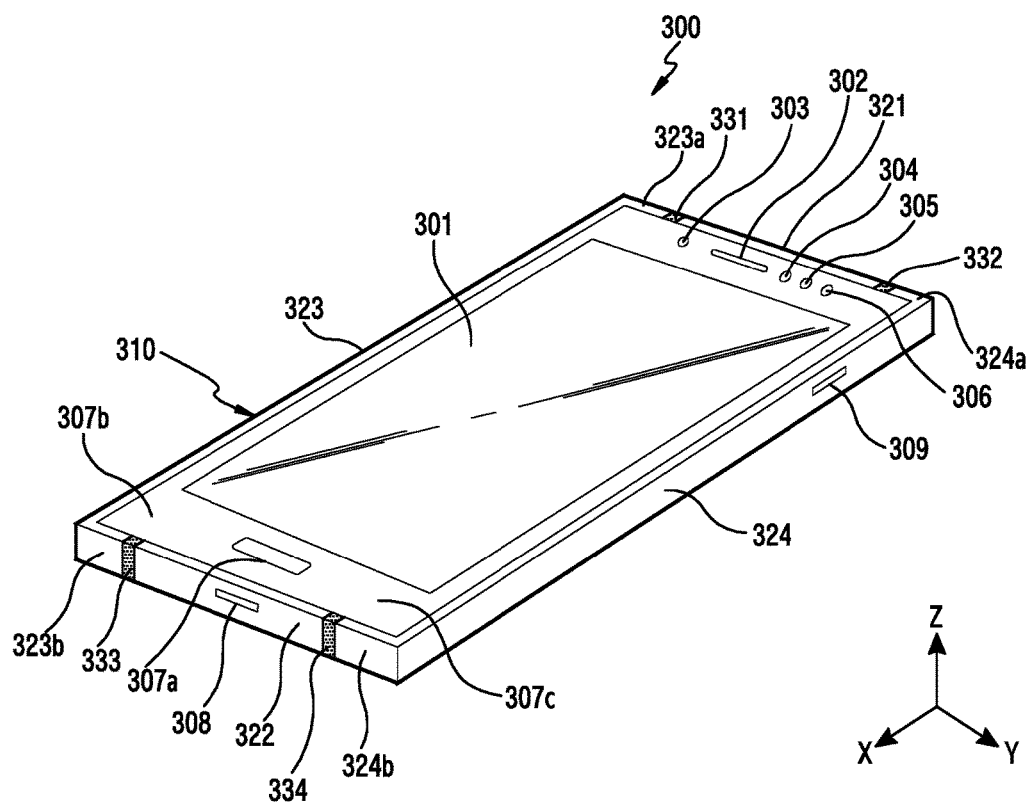
FIGS. 3A and 3B illustrate an electronic device, according to an embodiment of the present disclosure.
Figure 3B:
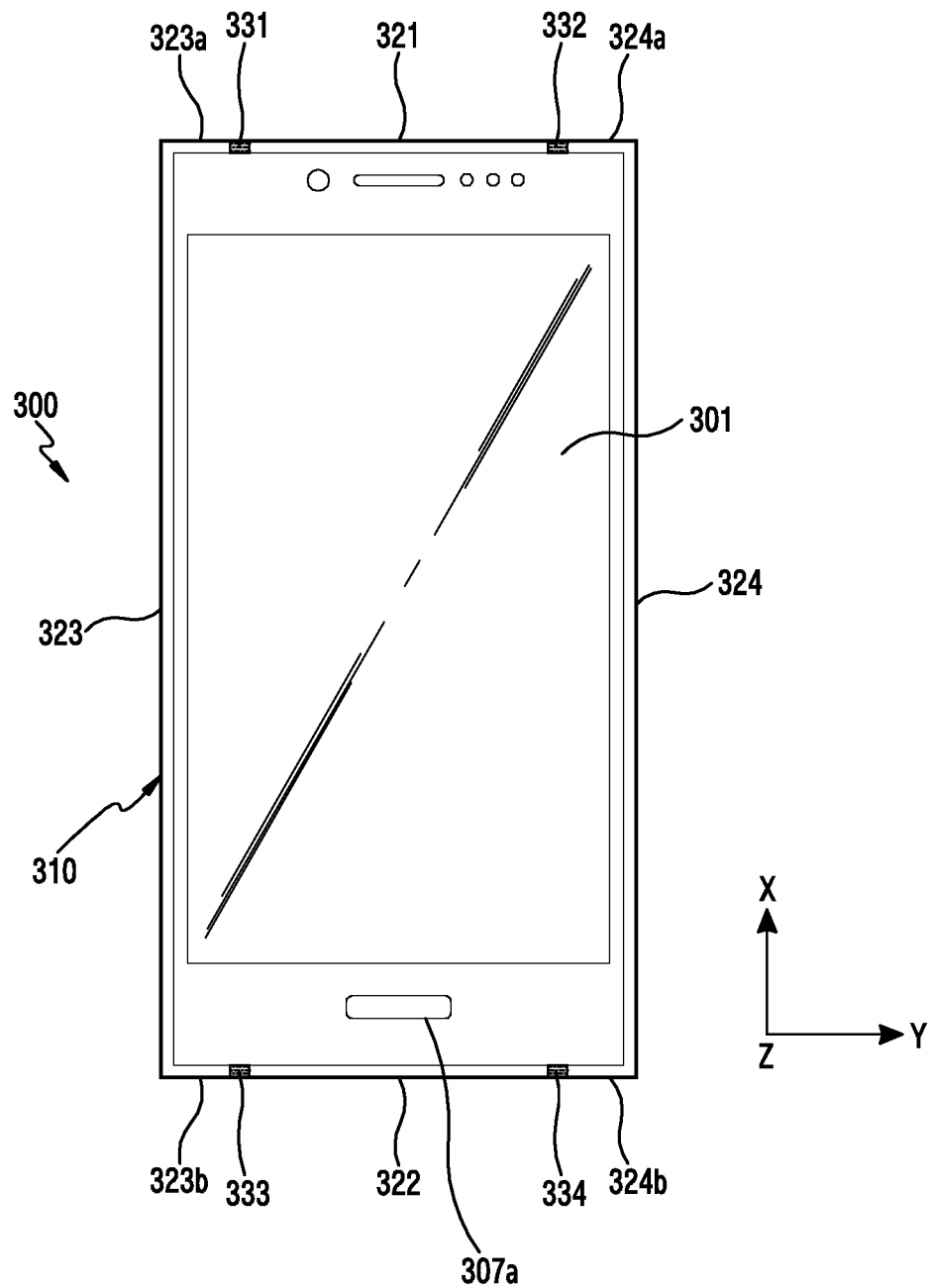

FIGS. 3A and 3B illustrate an electronic device, according to an embodiment of the present disclosure.

Referring to FIGS. 3A and 3B, an electronic device 300 is shown. In FIGS. 3A and 3B, an orthogonal coordinate system is used in which the X axis represents a vertical direction of the electronic device 300, the Y axis represents the horizontal direction of the electronic device 300, and the Z axis represents an up-and-down direction (thickness direction). In FIG. 3A, a perspective view of the electronic device 300 is provided. In FIG. 3B, a front view of the electronic device 300 is provided. The electronic device 300, according to various embodiments, may be the same as electronic devices 101 and 201 illustrated in FIGS. 1 and 2.

In FIGS. 3A and 3B at least a portion of a housing of the electronic device 400 forms at least a portion of an antenna. For example, at least one gap may be formed in a housing portion 310 of the electronic device 300. The housing portion 310 may form the whole or at least a portion of the exterior of the electronic device 300. The housing portion 310 may be formed of materials, such as a plastic, a metal, carbon fiber and other fiber composites, ceramics, glass, and wood, or combinations thereof.

The entire housing portion 310 may be formed of one material or a combination of materials, and may be partially formed of materials having different physical properties.

The housing portion 310 of the electronic device 300 may have a top face, a bottom face, and a plurality of side faces. The top face, the bottom face, and the plurality of side faces of the housing portion 310 may be formed of the same material, or of materials having different physical properties.

The housing portion 310 of the electronic device 300 may include a display 301 (the display 301 may be referred to as a "touch screen" when a touch panel is mounted) on the top face thereof.

A receiver 302 may be disposed above the display 301 so as to receive a voice of a counterpart. Components for conducting various functions of the electronic device 300 may be arranged around the receiver 302. The components may include one or more sensors 303, 304, and 305. The sensors 303, 304, and 305 may include at least one of an illuminance sensor (e.g., an optical sensor), a proximity sensor (e.g., an optical sensor), an infrared sensor, and an ultrasonic sensor. The front face of the housing portion 310 may additionally include at least one front camera 306.

The display 301 may be formed in a large size to occupy a greater portion of the top face of the electronic device 300. A main home screen refers to a first screen that is displayed on the display 301 when the power source of the electronic device 300 is turned on. When the electronic device 300 has several pages of different home screens, the main home screen may be the first home screen among the several pages of home screens. The home screen may display shortcut icons to execute frequently used applications, a main menu switching key, time, weather, or the like. The main menu switching key may cause the main screen to be displayed on the display 301. In the upper end of the display 301, status bars may be formed to indicate the statuses of the electronic device 300, such as a battery charge status, a received signal strength, and the current time. Below the display 301, a home key 307a, a menu key 307b, and a back key 307c may be formed.

When the home key 307a is pushed, the electronic device 300 may display the main home screen on the display 301. For example, when the home key 307a is touched in the state where a home screen, which is different from the main home screen, or the menu screen is displayed on the display 301, the main home screen may be displayed on the display 301. In another example, when the home key 307a is touched while applications are executed on the display 301, the main home screen may be displayed on the display 301. In another example, the home key 307a may be used in order to cause the most recently used application or a task manager to be displayed on the display 301.

The menu button 307b may provide a connection menu that may be used on the display 301. For example, the connection menu may include a widget addition menu, a background screen change menu, a retrieve menu, an edition menu, and an environment setting menu. The back button 307c may cause the screen, which was executed just prior to the currently executed screen, to be displayed, or may cause the most recently used application to be terminated.

The housing portion 310 of the electronic device 300 may include a housing portion that includes a first face, a second face that faces opposite to the first face, and a first side face that encloses at least a portion of the space between the first and second faces. The housing portion 310 may include a conductive material and a non-conductive material.

The housing portion 310 may be a conductive member (e.g., a metallic member), and at least a portion of the front face, at least a portion of the rear face, or at least a portion of the side face may be formed as a conductive member.

Alternatively, the housing portion 310 may be a non-conductive member (e.g., a non-conductive housing), and at least a portion of the front face, at least a portion of the rear face, or at least a portion of the side face of the housing portion 310 may be formed as a non-conductive member.

For example, when the housing portion 310 of the electronic device 300 is a metallic housing, the metallic housing may include an exterior conductive member that forms the exterior of the metallic housing.

The exterior conductive member may include metal frames arranged along the rim of the electronic device 300. For example, the metal frame may be arranged to extend to at least a partial region of the rear face of the electronic device 300 in which the rim extends.

The conductive member may form at least a partial region of the rim of the electronic device 300, and the non-conductive member may form the remaining portion of the rim. In such a case, the housing may be formed in a manner in which the non-conductive member is formed on the conductive member through insert injection molding.

A conductive rim structure, which forms the rim of the housing of the electronic device 300, may include a plurality of conductive members 321 to 324. The conductive members 321 to 324 are metal frames that form at least a portion of the exterior, and because the electronic device 300 has a substantially rectangular shape in a plan view, the metal frames may include first to fourth metal frames. For example, the conductive members 321 to 324 may form a polygonal shape without being limited to the substantially rectangular shape, and may form a curved shape (e.g., a circular shape or an oval shape).

The housing portion 310 may include first to fourth sides. The first side and the second side, which are opposite to each other, may have the same length, the third side and the fourth side, which are opposite to each other, may have the same length, and the third and fourth sides may be configured to be longer than the first and second sides. Hereinafter, a conductive member will be referred to as a metal frame.

When viewing the electronic device 300 from the front side, the metal frame positioned at the top side of the housing of the electronic device 300 may be referred to as a first metal frame 321, the metal frame positioned at the bottom side of the housing of the electronic device 300 may be referred to as a second metal frame 322, the metal frame positioned at the left side of the housing of the electronic device 300 may be referred to as a third metal frame 323, and the metal frame positioned at the right side of the housing of the electronic device 300 may be referred to as a fourth metal frame 324.

The first metal frame 321 or the second metal frame 322 may include at least one non-conductive member. For example, the first metal frame 321 and the second metal frame 322 may include non-conductive members 331 and 332 and non-conductive members 333 and 334, respectively. Each of the non-conductive members 331, 332, 333, and 334 is made of an insulation material, and may thus be referred to as an insulation portion. Further, each of the non-conductive members 331, 332, 333, and 334 splits adjacent metal frames and may thus be referred to as a split portion.

The non-conductive members may be arranged in the first metal frame 321, in the second metal frame 322, or in both of the first metal frame 321 and the second metal frame 322. For example, a pair of non-conductive members 331 and 332 respectively disposed at the opposite ends of the first metal frame 321 may be defined as first non-conductive members, and a pair of non-conductive members 333 and 334 respectively disposed at the opposite ends of the second metal frame 322 may be defined as second non-conductive members.

At least a portion of a metal frame split by at least one non-conductive member may operate as at least a portion of an antenna radiator. For example, at least a portion of each of the metal frames 321 to 324 split by the first non-conductive members 331 and 332 and the second non-conductive members 333 and 334 may be used as an antenna radiator. For example, the first metal frame 321 may be a top center radiator that is provided by a pair of first non-conductive members 331 and 332 formed at a predetermined interval, and the second metal frame 332 may be a bottom center radiator that is provided by a pair of second non-conductive members 333 and 334 formed at a predetermined interval. At least one of the first non-conductive members 331 and 332 or the second non-conductive members 333 and 334 may be formed when a non-conductive member is formed on a metal frame through insert injection molding.

When one of the first metal frame 321 and the second metal frame 322 is fed with power to operate as at least a portion of an antenna radiator, one of the third metal frame 323 and the fourth metal frame 324 is electrically coupled to at least one of the first metal frame 321 and the second metal frame 322 to operate as at least a portion of an antenna radiator.

The pair of first non-conductive members 331 and 332 may be formed by at least partially filling one or more gaps between the metal frames with a non-conductive material. The pair of second non-conductive members 333 and 334 may be formed by filling a gap between the metal frames with a non-conductive material. The first non-conductive members 331 and 332 and the second non-conductive members 333 and 334 may be arranged to be vertically symmetric or asymmetric and/or horizontally symmetric or asymmetric with reference to the display.

The first metal frame 321 may further include top side metal frames 323a and 324a that respectively extend from the third and fourth metal frames 323 and 324, and are then bent. For example, the first non-conductive members 331 and 332 may be arranged between the first metal frame 321 and the top side metal frames 323a and 324a, respectively. The first metal frame 321 may operate as an antenna radiator that is fed with power from a power feeding circuit so as to form resonance. When the first metal frame 321 is fed with power from the power feeding circuit to operate as an antenna radiator, at least a portion of the top side metal frame 323a and the third metal frame 323 and at least a portion of the top side metal frame 324a and the fourth metal frame 324 are electrically coupled to each other so as to operate as a portion of the antenna radiator.

The second metal frame 322 may further include bottom side metal frames 323b and 324b that respectively extend from the third and fourth metal frames 323 and 324, and are then bent. For example, the bottom side metal frames 323b and 324b may be formed by extending from the third and fourth frames 323 and 324, respectively, and being bent at a right angle. The second non-conductive members 333 and 334 may be arranged between the second metal frame 322 and the bottom side metal frames 323b and 324b, respectively. The second metal frame 322 may operate as an antenna radiator that is fed with power from a power feeding circuit so as to form resonance. When the second metal frame 322 is fed with power from the power feeding circuit to operate as an antenna radiator, at least a portion of the bottom side metal frame 323b and the third metal frame 323 and at least a portion of the bottom side metal frame 324b and the fourth metal frame 324 are electrically coupled to each other so as to operate as a portion of the antenna radiator.

At least some of various electronic components may be arranged on the first metal frame 321 of the electronic device 300. For example, in the first metal frame 321, at least one of a socket device for inserting a card-type external device or a memory card for expanding a storage space may be accommodated. An earphone jack connector configured to connect an earphone jack may be disposed on the first metal frame 321. However, the arrangement of the socket device or the memory card is not limited thereto.

On the second metal frame 322, an interface connector port 308 may be disposed in order to perform a transmission/reception function by an external device as well as to charge the electronic device 300 by receiving power applied from an external power source. For example, an earphone jack hole may be disposed at one side of the interface connector port 308. However, without being limited thereto, at least one of the above-mentioned electronic components may be disposed outside the metal frame.

At least one side key button may be disposed on the third metal frame 323 to perform a volume up/down function, a scroll function, etc.

At least one second side key button 309 may be disposed on the fourth metal frame 324. The second side key buttons 309 may serve to perform a power ON/OFF function, an electronic device wake-up/sleep function, etc.

At least one key button may be disposed in at least a partial region, other than the display 301, in the front face of the electronic device 300. The key button may perform a home key button function. A fingerprint recognition sensor device may be disposed on the top surface of the home key button. The home key button may be configured to perform a first function (e.g., the home screen return function or the wake-up/sleep function) by an operation of physically pressing the home key button, and to perform a second function (e.g., a fingerprint recognition function) by an operation of swiping the top surface of the home key button.

The display 301 of the electronic device 300 may be configured to have a flat surface or a curved surface at one side or at each side. The display may include a curved face portion having a curvature. The curved face portion may extend along an edge region of the display and along the X axis and/or the Y axis. The electronic device 300 may selectively display at least a portion of information by controlling a display module.

Figure 3C:
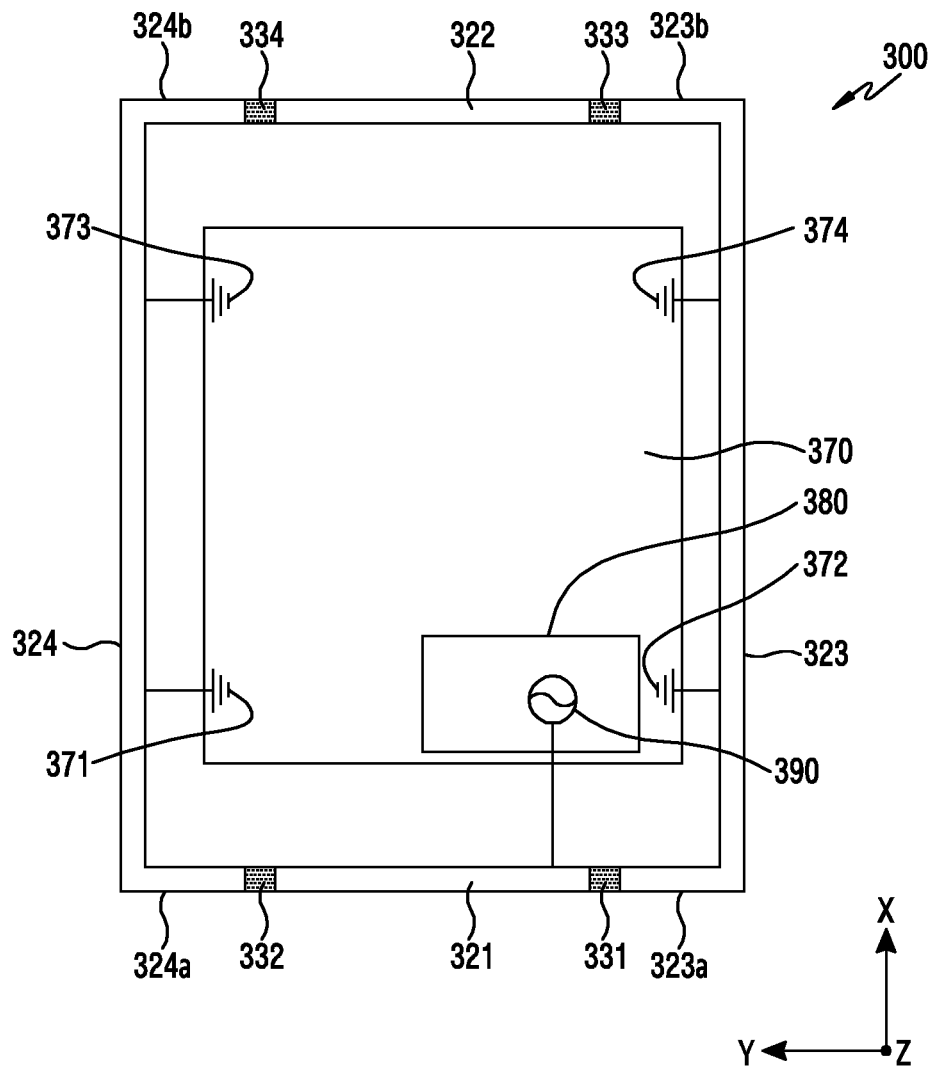
FIGS. 3C to 3E illustrate configurations of an antenna provided in a metal frame of an electronic device, according to various embodiments of the present disclosure.
Figure 3D:
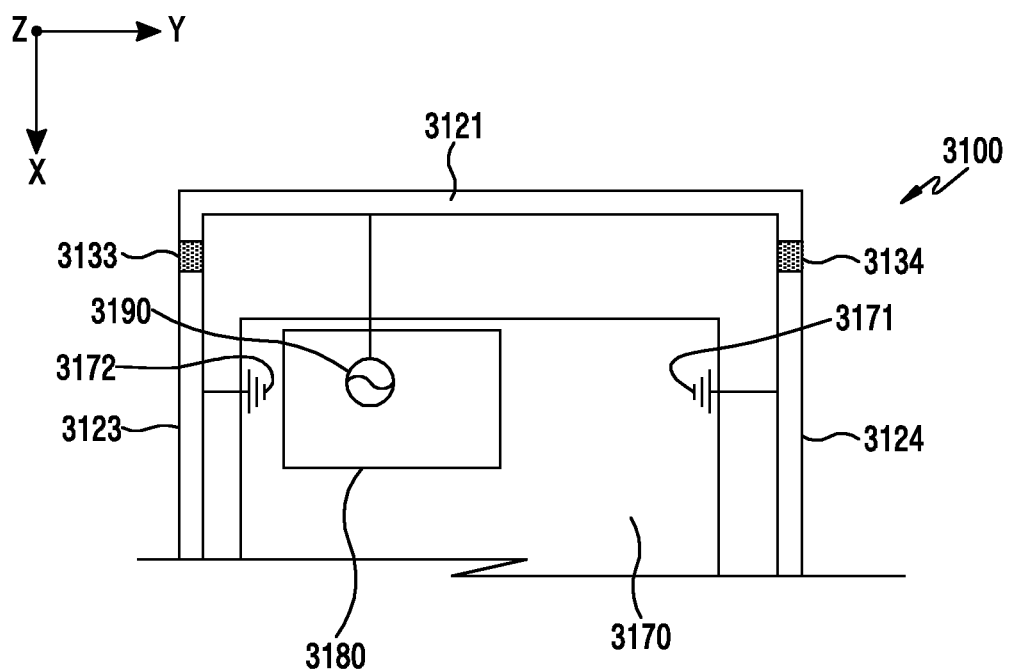
Figure 3E:
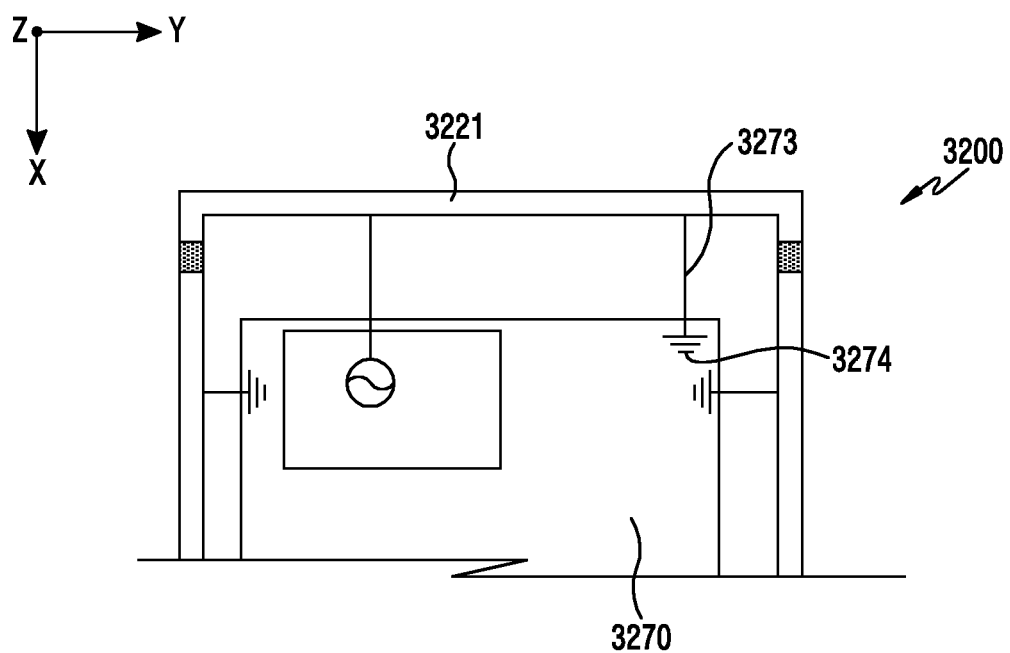

FIGS. 3C to 3E illustrate configurations of an antenna provided in a metal frame of an electronic device, according to various embodiments of the present disclosure.

Referring to FIG. 3C, the electronic device 300 is shown. The first metal frame 321 (i.e., a conductive member) disposed on the housing portion 310 of the electronic device 300, according to various embodiments, may operate as at least a portion of an antenna radiator that is fed with power from the communication circuit 380 so as to form resonance. For example, at least one of the metal frames 321; 323, 323a; 324, 324a, which are respectively split by the non-conductive members 331 and 332, may operate as at least a portion of an antenna radiator. For example, the first metal frame 321 may operate as at least a portion of a main antenna radiator, and each of the side metal frames 323 and 323a disposed at one side of the first metal frame 321 and/or the side metal frames 324 and 324a disposed at the other side of the first metal frame 321 may operate as at least a portion of an auxiliary antenna radiator by each being electrically coupled to the first metal frame 321. Each of the side metal frames 323, 323a; 324, 324a may be referred to as a coupling antenna or a coupling radiator.

The first metal frame 321 may be fed with power by a power feeding unit 390 disposed on a circuit board so as to operate as at least a portion of an antenna radiator. In such a case, the conductive member 321 may serve as a main antenna of the electronic device 300. The other conductive members 323 and 324, in the vicinity of the conductive member 321, may not be electrically connected to the communication circuit 380.

As another example, the other conductive members 323 and 324 in the vicinity of the conductive member 321 may be electrically connected to each of the ground members 371 and 372 of the circuit board 370 or other ground members 373 and 374. Each of the ground members 371 to 374 may be formed as a ground plane in at least a partial region of the circuit board 370.

The communication circuit 380 may be formed in at least a portion of the circuit board 370, which exists within the electronic device 300. The circuit board 370 may generally refer to all the boards that may be conventionally mounted within the electronic device 300 (such as a printed circuit board (PCB), a flexible printed circuit board (FPCB), and printed board assembly (PBA)).

The electronic device 300 may differently adjust the length of an antenna depending on a bandwidth to be supported. For example, the antenna bandwidth may be differently adjusted depending on the position of a non-conductive member, the position of a power feeding unit, an opening (i.e., a gap or split portion), and a ground unit.

At least one antenna may be formed in the electronic device 300 by using a metal frame. The antenna may be configured by using a single band antenna structure and/or a multi-band antenna structure. An ordinary antenna used in a portable electronic device has a planar inverted-F antenna (PIFA) or monopole radiator as a basic structure, and the number of the antennas may be determined depending on a service frequency, a service bandwidth, and a kind of the service. Although frequencies are different depending on the region of the world, typically a low band of 700 MHz to 900 MHz, a mid band of 1700 MHz to 2100 MHz, and a high band of 2300 MHz to 2700 MHz are used as major communication bands, and various wireless communication services, such as BT, GPS, and WIFI may be additionally used. Service bands, which are similar to each other in terms of frequency bands, are lumped with each other and are designed to be split to several antennas.

For example, a main antenna, which is in charge of voice/data communication (e.g., GPRS, WCDMA, or LTE), which is the principal communication of an electronic device, is positioned in a lower end of the electronic device where the number of metal components that undermine an antenna performance is small, and in view of European standards, the following bands should be implemented: 24 bands in total should be implemented including 2G (GSM850, EGSM, DCS, PCS), WCDMA (B1, B2, B5, B8), and LTE (B1, B2, B3, B4, B5, B7, B8, B12, B17, B18, B19, B20, B26, B38, B39, B40, B41).

The electronic device 300 may lump service bands, of which the frequency bands are similar to each other over at least two regions, with each other so as to implement antennas. As an example, 2G (GSM850, EGSM, DCS, PCS), WCDMA (B1, B2, B5, B8) and LTE (B1, B2, B3, B4, B5, B8, B12, B17, B18, B19, B20, B26, B39) may be implemented in Main 1 antenna, and an antenna for LTE (B7, B38, B40, B41) may be designed in Main 2 antenna.

Referring to FIG. 3D, an electronic device 3100 is shown. The electronic device 3100 may be the same as the electronic device 101 of FIG. 1.

The electronic device 3100, according to various embodiments, may include at least one gap in a side face, and a non-conductive member that fills at least a portion of the at least one gap. For example, the electronic device 3100 may include non-conductive members 3133 and 3134, which are respectively disposed in at least partial regions of third and fourth metal frames 3123 and 3124, which are located at opposite sides of the housing portion, respectively.

The first and second non-conductive members 331 and 332, illustrated in FIG. 3C, are disposed in the metal frames that are disposed in the upper end, lower end, or upper and lower ends of the housing portion of the electronic device, and the first and second non-conductive members 3133 and 3134, illustrated in FIG. 3D, are disposed on side faces of the housing portion of the electronic device 3100, and may include, for example, a first non-conductive member 3133 disposed on the first side face and a second non-conductive member 3134 disposed on the second side face.

The metal frame 3121 disposed around the upper end of the electronic device 3100 may operate as at least a portion of an antenna radiator by being fed with power from the communication circuit 3180. For example, each of the metal frames 3121, 3123, and 3124, which are respectively split by the non-conductive members 3133 and 3134, may operate as at least a portion of an antenna radiator. The first metal frame 3121 may operate as a main antenna radiator, and the first side metal frame 3123 disposed at one side of the first metal frame 3121 and/or the side metal frame 3124 disposed at the other side of the first metal frame 3121 may operate as an auxiliary antenna radiator by being electrically coupled to the first metal frame 3121. At least one side metal frame 3123 or 3124 may be referred to as a coupling antenna or a coupling radiator.

The first metal frame 3121 is fed with power by the power feeding unit 3190 formed on the circuit board 3170 to operate as a main antenna radiator such that the first metal frame 3121 may serve as the main antenna of the electronic device 3100. The other conductive members 3123 and 3124 in the vicinity of the conductive member 3121 may be or may not be electrically connected to the communication circuit 3180.

As another example, the other conductive members 3123 and 3124 in the vicinity of the first metal frame 3121 may be electrically connected to each of the ground members 3172 and 3173 of the circuit board 3170. Each of the ground members 3172 and 3171 may be formed as a ground plane in at least a partial region of the circuit board 3170.

The communication circuit 3180 may be formed in at least a portion of the circuit board 3170, which exists within the electronic device 3100. The circuit board 3170 may generally refer to all the boards that may be conventionally mounted within the electronic device 3100, such as a PCB, a FPCB, and PBA.

The electronic device 3100 may differently adjust the length of an antenna depending on a bandwidth to be supported. For example, the antenna bandwidth may be differently adjusted depending on the distance between a power feeding unit and a ground unit.

Referring to FIG. 3E, an electronic device 3200 is shown. The electronic device 3200 may be the same as the electronic device 101 of FIG. 1.

The electronic device 3200, according to various embodiments, may include an additional ground line 3273 on the metal frame 3221, as compared with the electronic device 3100 illustrated in FIG. 3D. The electronic device 3200 may be electrically connected, via the additional ground line 3273, to a ground member 3274 disposed on the board 3270.

The electronic device 3200 has the same configuration as the electronic device 3100 illustrated in FIG. 3D, except that the additional ground line 3273 and the ground member 3274 are configured. Accordingly, the remaining descriptions will be omitted.

FIGS. 4A to 4D illustrate a folder-type electronic device, according to an embodiment of the present disclosure.

Figure 4A:
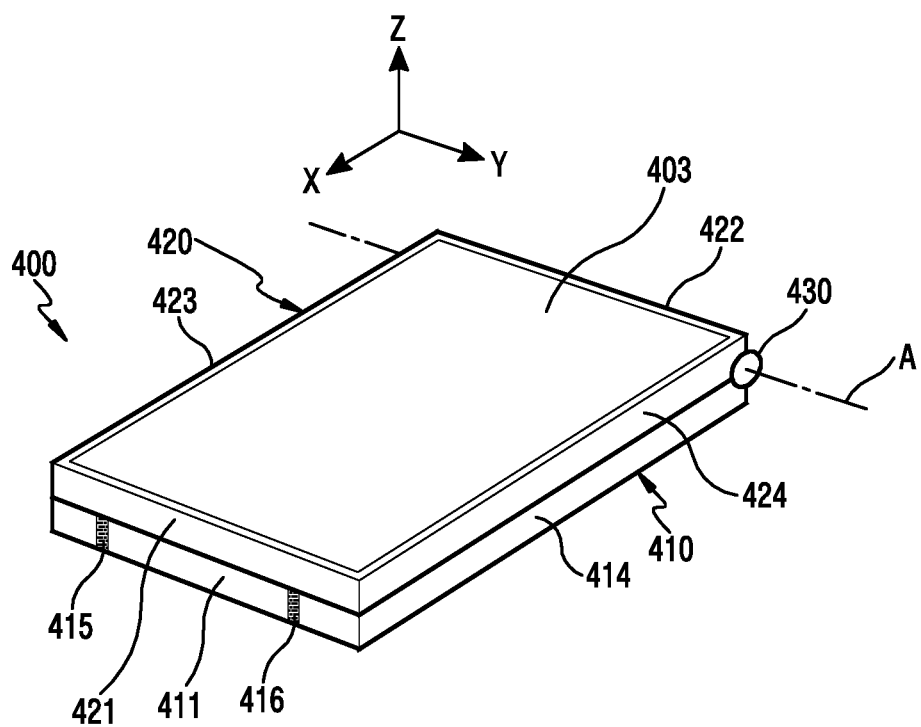
FIGS. 4A to 4D illustrate a folder-type electronic device, according to an embodiment of the present disclosure.
Figure 4B:
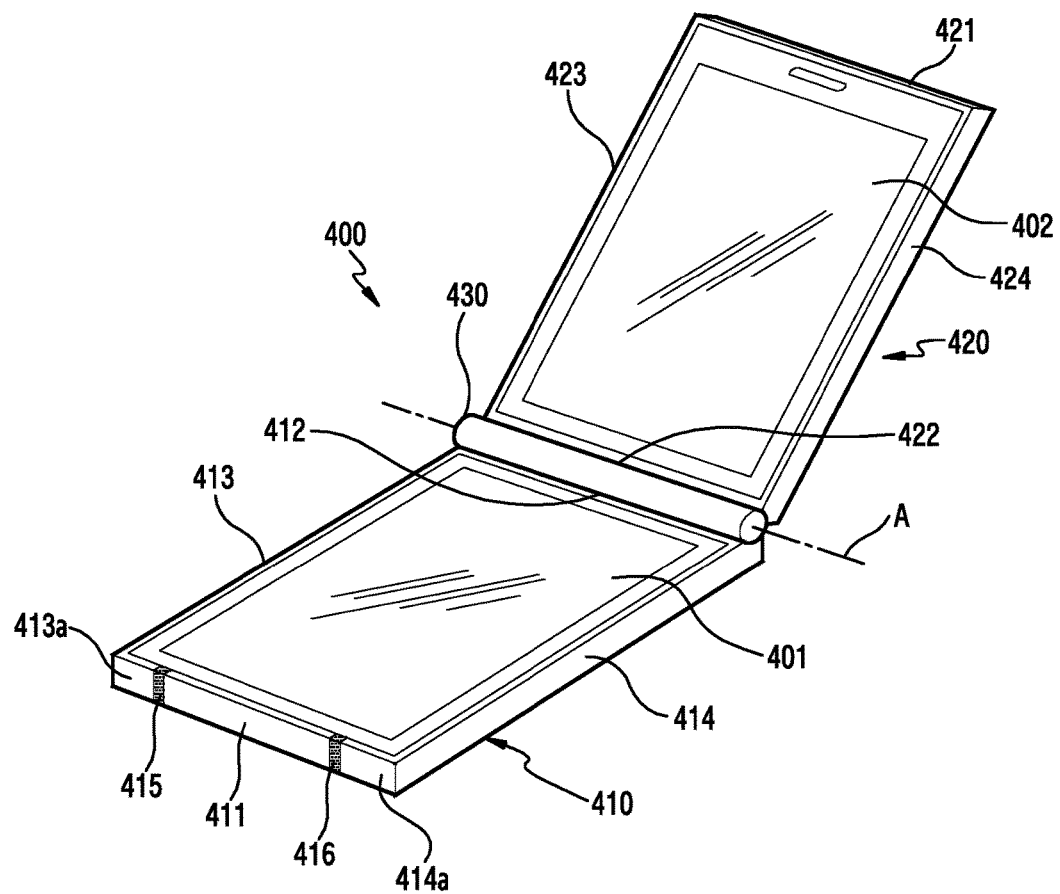
Figure 4C:
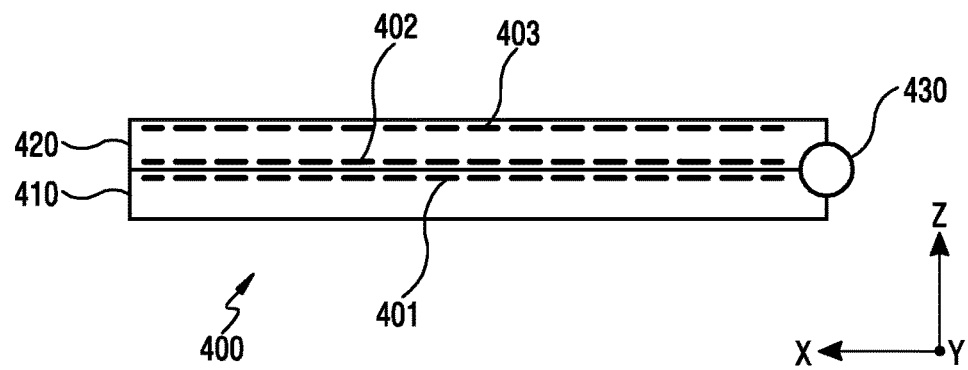
Figure 4D:
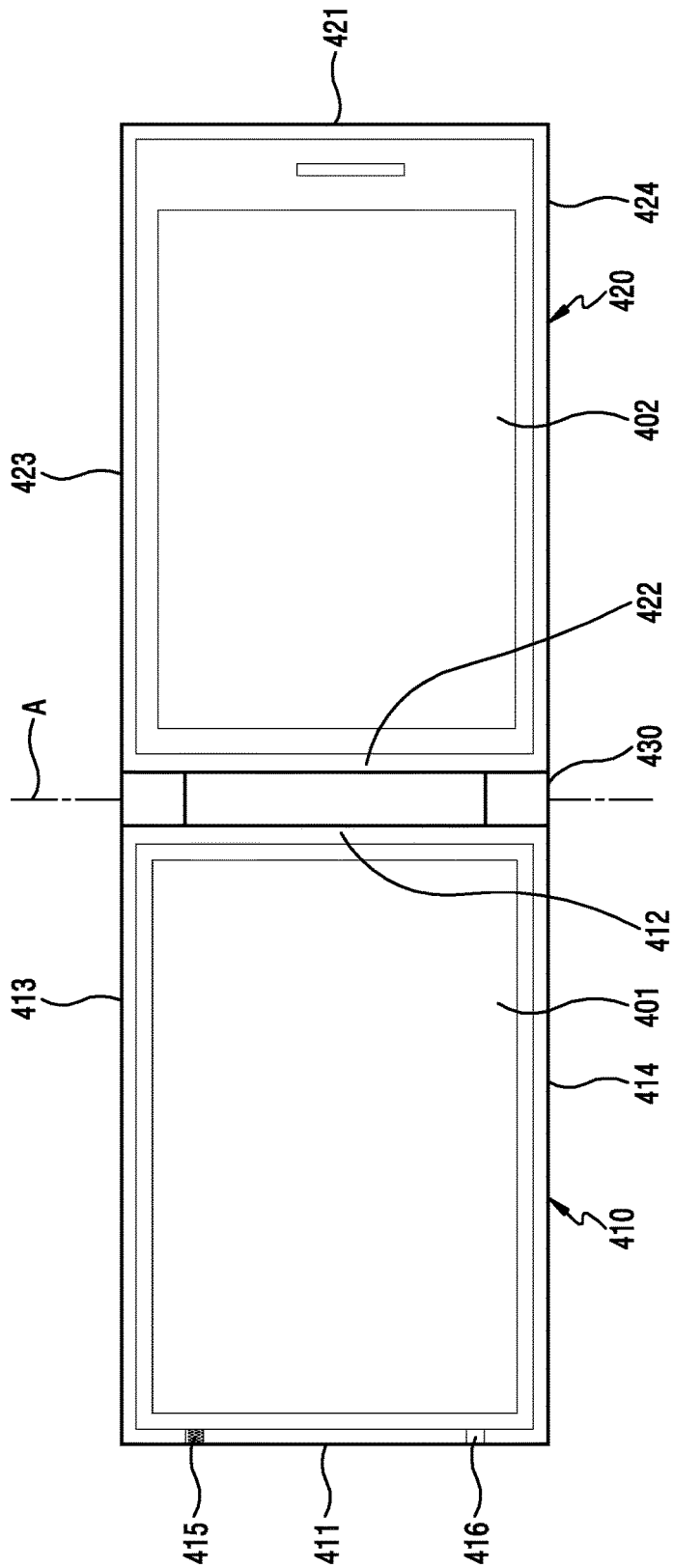

Referring to FIGS. 4A to 4D, a folder-type electronic device 400 is shown. In FIGS. 4A and 4B, perspective views of the electronic device 400 in a folded and unfolded state, respectively, are provided. In FIG. 4C, a side view of the electronic device 400 in the folded state is provided. In FIG. 4D, a front view of the electronic device 400 in the unfolded state is provided. The electronic device 400, according to various embodiments, may be the same as electronic devices 101 and 201 of FIGS. 1 and 2.

In FIGS. 4A to 4D, at least a portion of a housing of the electronic device 400 forms at least a portion of an antenna. For example, at least one gap may be formed in a first housing portion 410 or a second housing portion 420 of the electronic device 400.

The first housing portion 410 may be referred to as a first electronic device, and the second housing portion 420 may be referred to as a second electronic device. The electronic device 400 may further include a connection part 430. The connection part 430 may interconnect the first and second housing portions 410 and 420 to be rotatable about a rotation axis A, and may be defined as a hinge unit. For example, the hinge unit 430 may provide a pivot movement between the first and second housing portions 410 and 420. For example, the second housing portion 420 may be oriented to face the first housing portion 410, and may be folded or unfolded around the rotation axis A. The first and second housing portions 410 and 420 may form the whole or at least a portion of the exterior of the electronic device. According to various embodiments, the first and second housing portions 410 and 420 may be formed of materials, such as a plastic, a metal, carbon fiber and/or other fiber composites, ceramics, glass, and wood, or combinations thereof.

The first and second housing portions 410 and 420 may have first and second rim structures, respectively. For example, the first and second rim structures are made of a conductive material, and may be referred to as first and second conductive rim structures.

The first conductive rim structure of the first housing portion 410 may have a substantially rectangular shape that includes a first side, a second side that is shorter than the first side, a third side that has the same length as the first side, and a fourth side that has the same length as the second side. The second conductive rim structure of the second housing portion 420 may have a substantially rectangular shape that includes a first side, a second side that is shorter than the first side, a third side that has the same length as the first side, and a fourth side that has the same length as the second side.

When the electronic device 400 is in the folded state, the first and second housing portions 410 and 420 may be arranged such that the rims thereof overlap with each other in a shape where the first and second housing portions 410 and 420 are substantially aligned to each other. The first side of the first housing portion 410 may have the same length as the first side of the second housing portion 420, and the remaining sides of the first and second housing portions 410 and 420 may be equal to each other.

Each of the first and second housings 410 and 420 may have a top face, a bottom face, and a plurality of side faces. The top face, the bottom face, and the plurality of side faces of the first housing 410 may be formed of materials having the same physical property, or may be formed of materials having different physical properties. For example, the top face, the bottom face, and the plurality of side faces of the second housing 420 may be formed of the same material, or may be formed of materials having different physical properties.

The electronic device 400 may have one or more displays on each of the first housing portion 410 and the second housing portion 420. For example, the first housing portion 410 may include a first display 401 disposed on the top face thereof. The first display 401 may be a touch screen. The second housing portion 420 may include a second display 403 disposed on the top face (i.e., an outer face) thereof. The second display 403 may be a touch screen. The second housing portion 420 may include a third display 402 disposed on the bottom face (i.e., an inner face) thereof. The third display 402 may be a touch screen. The first housing portion 410 may be provided with a keyboard operated by a physical pushing operation instead of the first display 401. The one or more displays of the electronic device may be formed in different sizes. For example, the third display 403 may be configured to be smaller than the first and second displays 401 and 402, and may not be disposed.

The first housing portion 410 of the electronic device 400 may include a display 401 mounted on the top face thereof (i.e., the first display 401 may be referred to as a "touch screen" when a touch panel is mounted). The first display 401 may be formed in a large size to occupy a greater portion of the top face of the electronic device 400. The first display 401 may be the same as the display 301 illustrated in FIGS. 3A and 3B.

The first housing portion 410 of the electronic device 400 may include a first face, a second face that faces opposite to the first face, and a first side face that encloses at least a portion of the space between the first and second faces. The first housing portion 410 may include a conductive material and a non-conductive material. For example, the first housing portion 410 may have an exterior rim structure that includes a conductive member and a non-conductive member.

In the first housing portion 410, at least a portion of the front face, at least a portion of the rear face, or at least a portion of the side face may be formed of a conductive material. In the first housing portion 410, at least a portion of the front face, at least a portion of the rear face, or at least a portion of the side face may be formed of a non-conductive material. For example, in the case where the first housing portion 410 of the electronic device 400 is a metallic housing, the metallic housing may include an exterior conductive member that forms the exterior of the metallic housing. The exterior conductive member may include a metal frame arranged along the rim of the electronic device 400.

The metal member may be arranged on at least a partial region of the rim of the electronic device 400, and the remaining portion may be replaced by a non-conductive member. In such a case, the first housing portion 410 may be formed in a manner in which the non-conductive member is formed on the metal frame through insert injection molding.

The rim of the first housing portion 410 of the electronic device 400 may include a plurality of metal frames (i.e., metal portions). The metal frames may include first to fourth metal frames 411 to 414.

The metal frame positioned at the bottom side of the first housing portion 410 may be referred to as a first metal frame 411, the metal frame positioned at the top side of the first housing portion 410 may be referred to as a second metal frame 412, the metal frame positioned at the left side of the first housing portion 410 may be referred to as a third metal frame 413, and the metal frame positioned at the right side of the first housing portion 410 may be referred to as a fourth metal frame 414.

The first metal frame 411 may include one or more non-conductive members 415 and 416. Each of the non-conductive members 415 and 416 is made of a non-conductive material, and may thus be referred to as an insulation portion. Further, each of the non-conductive members 415 and 416 splits adjacent metal frames and may thus be referred to as a split portion. For example, one or more non-conductive members may be aligned along the conductive member or the side face of the housing portion. The non-conductive member may include a non-metallic portion.

The non-conductive members 415 and 416 may include a metallic material. The conductive member may include a metallic material. The metallic material may include any one of aluminum, stainless steel, and amorphous metal alloy.

The amorphous metal alloy may have a fine structure similar to a liquid phase in which no crystal structure exists because atoms are irregularly arranged, unlike a conventional alloy. Because the amorphous metal alloy has a homogeneous isotropic characteristic, and does not have a crystallographic anisotropy, the amorphous metal alloy may be excellent in mechanical strength, and because the amorphous metal alloy is uniform in structure and composition, the amorphous metal alloy has excellent corrosion resistance.

Each of the metal frames, which are split by respective non-conductive members 415 and 416 may be used as an antenna radiator. The first metal frame 411 may be a top center radiator that is provided by a pair of the non-conductive members 415 and 416 formed at a predetermined interval. For example, the non-conductive members 415 and 416 may be formed when a non-conductive member is formed on the first metal frame 411 through insert injection molding.

When the first metal frame 411 is fed with power to operate as an antenna radiator, at least a portion of each of the third and fourth metal frames 413 and 414 may be electrically coupled to the first metal frame 411 to operate as at least a portion of an antenna radiator. The third and fourth metal frames 413 and 414 may be arranged in the form of being split by a non-conductive material.

The non-conductive members 415 and 416 may be formed by filling a gap between the metal frames with a non-conductive material.

The first metal frame 411 may further include top side metal frames 413a and 414a that respectively extend from the third and fourth metal frames 413 and 414, and are then bent. The non-conductive members 415 and 416 may be arranged between the first metal frame 411 and the top side metal frames 413a and 414a, respectively.

The first metal frame 411 may operate as an antenna radiator that is fed with power from a power feeding circuit so as to form resonance. When the first metal frame 411 is fed with power from the power feeding circuit to operate as an antenna radiator that forms resonance, at least a portion of the top side metal frame 413a and the third metal frame 413 or at least a portion of the top side metal frame 414a and the fourth metal frame 414 are electrically coupled to each other so as to operate as at least a portion of the antenna radiator.

The first housing portion 410 of the electronic device 400 may include a communication circuit and a ground unit disposed on a board therein. The configuration, in which the center metal frame is connected to a communication circuit and a ground unit to operate as an antenna radiator that forms resonance, was described above with reference to FIG. 3C, and thus, duplicate descriptions will be omitted.

The second housing portion 420 may include a second display 402 on the bottom face thereof (i.e., the display 402 may be referred to as a "touch screen" when a touch panel is mounted). The second display 402 may be formed in a large size to occupy a greater portion of the bottom face of the electronic device 400. The second housing portion 420 may include a third display 403 on the top face thereof (i.e., the display 403 may be referred to as a "touch screen" when a touch panel is mounted).

The second housing portion 420 of the electronic device 400 may include a first face, a second face that faces opposite to the first face, and a first side face that encloses at least a portion of the space between the first and second faces. The second housing portion 420 may include a conductive material and a non-conductive material.

The second housing portion 420 may be made of a conductive member (e.g., a metal housing), and at least a portion of the front face, at least a portion of the rear face, or at least a portion of the side face of the second housing portion 420 may be made of a conductive material. Alternatively, the second housing portion 420 may be made of a non-conductive member (e.g., a non-conductive housing), and at least a portion of the front face, at least a portion of the rear face, or at least a portion of the side face of the second housing portion 420 may be made of a non-conductive material. For example, in the case where the second housing portion 420 of the electronic device 400 is a metallic housing, the metallic housing may include an exterior conductive member that forms the exterior of the metallic housing. The exterior conductive member may include a metal frame arranged along the rim of the electronic device 400.

The rim of the second housing portion 420 of the electronic device 400 may include a plurality of metal frames. The metal frames may include first to fourth metal frames 421 to 424.

The metal frame positioned at the bottom side of the second housing portion 420 may be referred to as a first metal frame 421, the metal frame positioned at the top side of the second housing portion 420 may be referred to as a second metal frame 422, the metal frame positioned at the left side of the second housing portion 420 may be referred to as a third metal frame 423, and the metal frame positioned at the right side of the second housing portion 420 may be referred to as a fourth metal frame 424.

When the electronic device 400 is in the folded state as shown in FIG. 4A, an electric field, which is generated from the first metal frame (i.e., a conductive member) 411 disposed in the first housing portion 410 and is formed in a region adjacent to the non-conductive members (i.e., insulation portions) 415 and 416, may be formed in a region other than the direction of the second housing portion 420, which may cause the antenna radiating performance to be deteriorated. For example, when the direction of an electric field is restricted to some extent, the radiation performance of the antenna is poor. Accordingly, when the electronic device 400 is of a folder-type and a non-conductive member is disposed only in the first housing portion, the antenna radiation performance may be deteriorated when the electronic device 400 is in a standby state (i.e., a folded state).

Figure 5A:
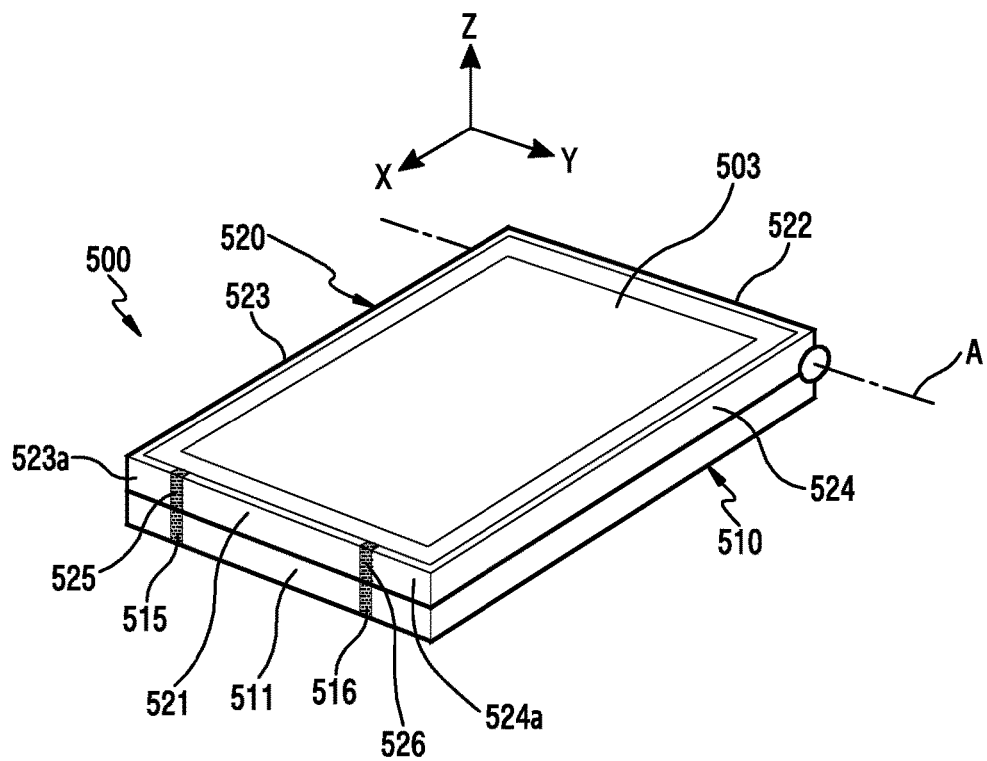
FIGS. 5A and 5B illustrate a folder-type electronic device, according to an embodiment of the present disclosure.
Figure 5B:
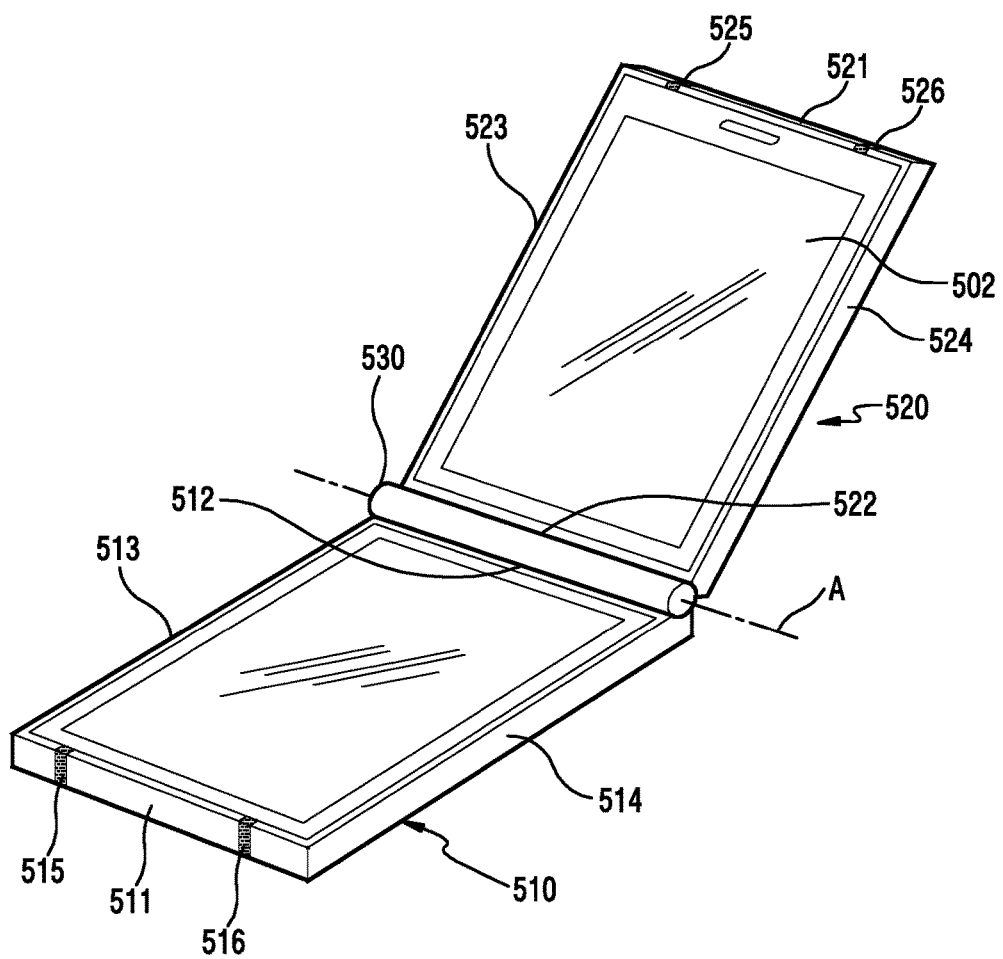

FIGS. 5A and 5B illustrate a folder-type electronic device, according to an embodiment of the present disclosure.

Referring to FIGS. 5A and 5B, a folder-type electronic device 500 is shown. In FIGS. 5A and 5B, perspective views of the electronic device 500 in a folded and unfolded state, respectively, are provided. The electronic device 500, according to various embodiments, may be the same as the electronic device 101 of FIG. 1.

In FIGS. 5A and 5B, at least a portion of a housing of the electronic device 500 forms at least a portion of an antenna. For example, at least one gap may be formed in a first housing portion 510 or a second housing portion 520 of the electronic device 500.

The electronic device 500 according to various embodiments is different from the electronic device illustrated in FIGS. 4A to 4D only in the configuration of the second housing portion 520. The configurations of the remaining components (i.e., the first housing portion 510 and a connection part 530 are the same as those of the electronic device illustrated in FIGS. 4A to 4D). Thus, descriptions of the first housing portion 510 and the connection part 530 will be omitted. The second housing portion 520 of the electronic device 500 may include a second display 502 on the inner face thereof (i.e., the second display 502 may be referred to as a "touch screen" when a touch panel is mounted). For example, the second display 502 may be formed in a large size to occupy a greater portion of the inner face of the electronic device 500. The second housing portion 520 of the electronic device 500 may include a third display 503 mounted on the outer face thereof (i.e., the third display 503 may be referred to as a "touch screen" when a touch panel is mounted). The third display 503 may be formed to occupy a portion of the outer face of the electronic device 500.

The second housing portion 520 of the electronic device 500 may include a first face, a second face that faces opposite to the first face, and a first side face that encloses at least a portion of the space between the first and second faces. The second housing portion 520 may include a conductive material and/or a non-conductive material.

The second housing portion 520 may be made of a conductive member (e.g., a metal housing), and at least a portion of the front face, at least a portion of the rear face, or at least a portion of the side face of the second housing portion 520 may be made of a conductive material. The second housing portion 520 may be made of a non-conductive member (e.g., a non-conductive housing), and at least a portion of the front face, at least a portion of the rear face, or at least a portion of the side face of the second housing portion 520 may be made of a non-conductive material. For example, in the case where the second housing portion 520 of the electronic device 500 is a metallic housing, the metallic housing may include an exterior conductive member that forms the exterior of the metallic housing. The exterior conductive member may include at least one metal frame arranged along the rim of the electronic device 500. The metal member may be arranged only on at least a partial region of the rim of the electronic device 500, and the remaining portion may be replaced by a non-conductive member. In such a case, the second housing portion 520 may be formed in a manner in which the non-conductive member is formed on the metal frame through insert injection molding.

The rim of the second housing portion 520 of the electronic device 500 may include one or more metal frames. The metal frames may include first to fourth metal frames 521 to 524.

The metal frame positioned at the bottom side of the second housing portion 520 may be referred to as a first metal frame 521, the metal frame positioned at the top side of the second housing portion 520 may be referred to as a second metal frame 522, the metal frame positioned at the left side of the second housing portion 520 may be referred to as a third metal frame 523, and the metal frame positioned at the right side of the second housing portion 520 may be referred to as a fourth metal frame 524.

The first metal frame 521 may include one or more non-conductive members 525 and 526. Each of the non-conductive members 525 and 526 is made of an insulation material, and may thus be referred to as an insulation portion. Further, each of the non-conductive members 525 and 526 splits adjacent metal frames and may thus be referred to as a split portion.

Each of the metal frames, which are split by respective non-conductive members 525 and 526, may be used as an antenna radiator. The first metal frame 521 may be a top center frame that is provided by a pair of the non-conductive members 525 and 526 formed at a predetermined interval. For example, the non-conductive members 525 and 526 may be formed when a non-conductive member is formed on the first metal frame 521 through insert injection molding.

When the first metal frame 521 is fed with power by a power feeding circuit to operate as an antenna radiator, at least a portion of each of the third and fourth metal frames 523 and 524 may be electrically coupled to the first metal frame 521 to operate as at least a portion of an antenna radiator. The third and fourth metal frames 523 and 524 may be arranged in the form of being split by a non-conductive material (not illustrated).

The non-conductive members 525 and 526 may be formed by filling a gap (i.e., an opening) between the metal frames with a non-conductive material.

The first metal frame 521 may further include top side metal frames 523a and 524a that respectively extend from the third and fourth metal frames 523 and 524, and are then bent. The first non-conductive members 525 and 526 may be arranged between the first metal frame 521 and the top side metal frames 523a and 524a, respectively. The first metal frame 521 may operate as an antenna radiator that is fed with power from a power feeding circuit so as to form resonance. When the first metal frame 521 is fed with power from the power feeding circuit to operate as an antenna radiator, at least a portion of the top side metal frame 523a and the third metal frame 523 or at least a portion of the top side metal frame 524a and the fourth metal frame 524 is electrically coupled to each other so as to operate as a portion of the antenna radiator.

The second housing portion 520 of the electronic device 500 may include therein a communication circuit and a ground unit disposed on a board. The configuration, in which the first metal frame 521 is connected to a communication circuit and a ground unit to operate as at least a portion of an antenna radiator that forms resonance, was described above with reference to FIG. 3C, therefore, duplicate descriptions will be omitted.

An antenna using the metal frames of the electronic device 500 according to various embodiments is a call transmission/reception antenna, and may be any one of a CDMA antenna, a personal communication service (PCS) antenna, and a GSM antenna. However, the present disclosure is not limited thereto.

As another example, an antenna using the metal frame of the electronic device 500 may be variously used as long as it is an antenna that transmits/receives electromagnetic waves wirelessly like a GPS antenna, a Bluetooth antenna, or a wireless LAN antenna.

The electronic device 500 may differently adjust the length of an antenna depending on a bandwidth to be supported. For example, the antenna bandwidth may be differently adjusted depending on the positions of a non-conductive member, a power feeding unit, and a ground unit.

In the electronic device 500, the first non-conductive members 515 and 516 and the second non-conductive members 525 and 526 may be arranged to be substantially symmetrically aligned to each other when viewed with reference to the YZ plane. For example, the first non-conductive members 515 and 516 and the second non-conductive members 525 and 526 may be substantially aligned in the vertical direction with reference to the Z axis.

The conductive member (i.e., a center metal frame) 511 of the first housing portion 510 and the conductive member (i.e., a center metal frame) 521 of the second housing 520 may be arranged along the Z axis to be symmetric to each other.

With this arrangement, the electronic device 500 may maintain the radiation effect of the antenna even in the state where the first housing portion 510 and the second housing portion 520 are disposed close to each other (i.e., when the electronic device 500 is in a folded state).

For example, when the second housing portion 520 is disposed close to the first housing portion 510 (i.e. when the first and second non-conductive members are symmetrically aligned), radiation radiated from the antenna radiator formed by at least a portion of the first housing portion 510 may be radiated through the second non-conductive member (i.e., opening) of the second housing portion 520.

When the first face of the first housing portion 510 and the first face of the second housing portion 520 of the electronic device 500 face each other, the first non-conductive members 515 and 516 and the second non-conductive members 525 and 526 are substantially aligned so that antenna radiation may be executed through the open region of the antenna formed in the first housing portion 510 and an open region of the second housing portion 520 substantially aligned thereto. Thus, when the antenna radiation is executed to the open region of the second housing 520, the deterioration of the antenna radiation performance can be prevented.

Figure 6A:
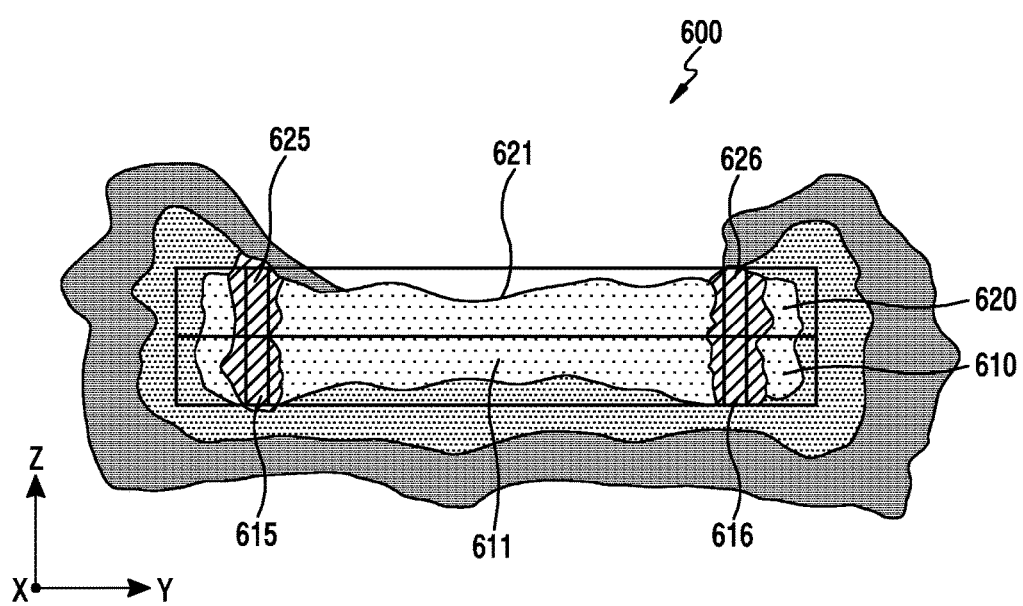
FIGS. 6A and 6B a distribution of electric fields generated from an electronic device according to an embodiment of the present disclosure.
Figure 6B:
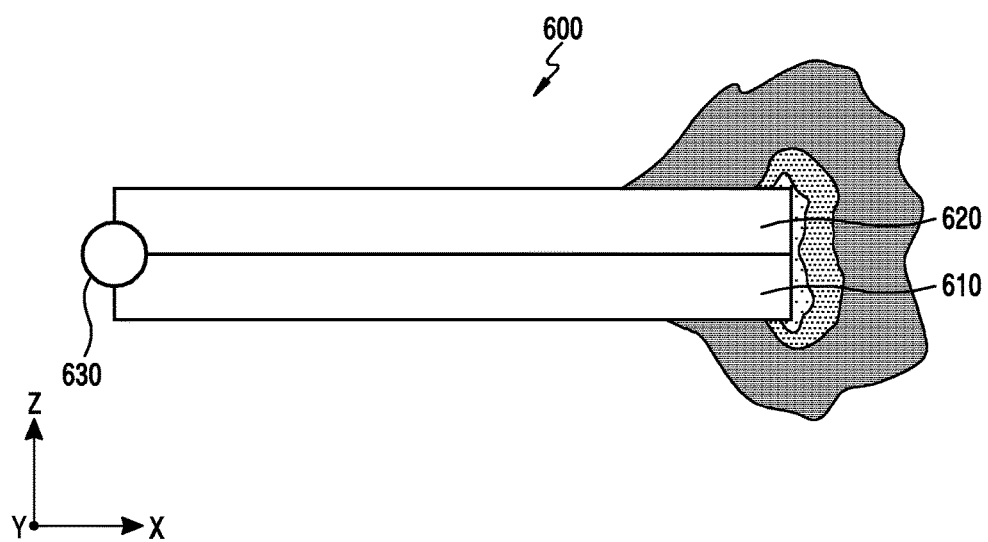

FIGS. 6A and 6B illustrate a distribution of electric fields generated from at an electronic device, according to an embodiment of the present disclosure.

Referring to FIGS. 6A and 6B, an electronic device 600 is shown. The electronic device 600, according to various embodiments, may be the same as the electronic device 101 of FIG. 1.

The electronic device 600 includes first non-conductive members 615 and 616 of a first housing portion 610. Many electric fields may be formed in the vicinity of the first non-conductive members 615 and 616.

A second housing portion 620 may include second non-conductive members 625 and 626, which are located at the positions corresponding to the first non-conductive members 615 and 616. A passage may be formed, through which the electric fields generated in the vicinity of the first non-conductive members 615 and 616 may be radiated toward the second housing portion 620, so that many electric fields may also be formed in the vicinity of the second non-conductive members 625 and 626.

The electric fields may be generated in a shape that encompasses the whole of the first housing portion 610 and the second housing portion 620. As shown in FIGS. 6A and 6B, many electric fields are also formed toward the second housing portion 620.

The electronic device 600 may be provided with second non-conductive members 625 and 626 in the second housing portion 620 so as to maintain the radiation direction of the energy fields generated from the first non-conductive members 615 and 616, and the first conductive member 611 and the second conductive member 621, which are centrally positioned, may be electrically coupled to each other so as to maintain a better radiation performance.

Figure 7:
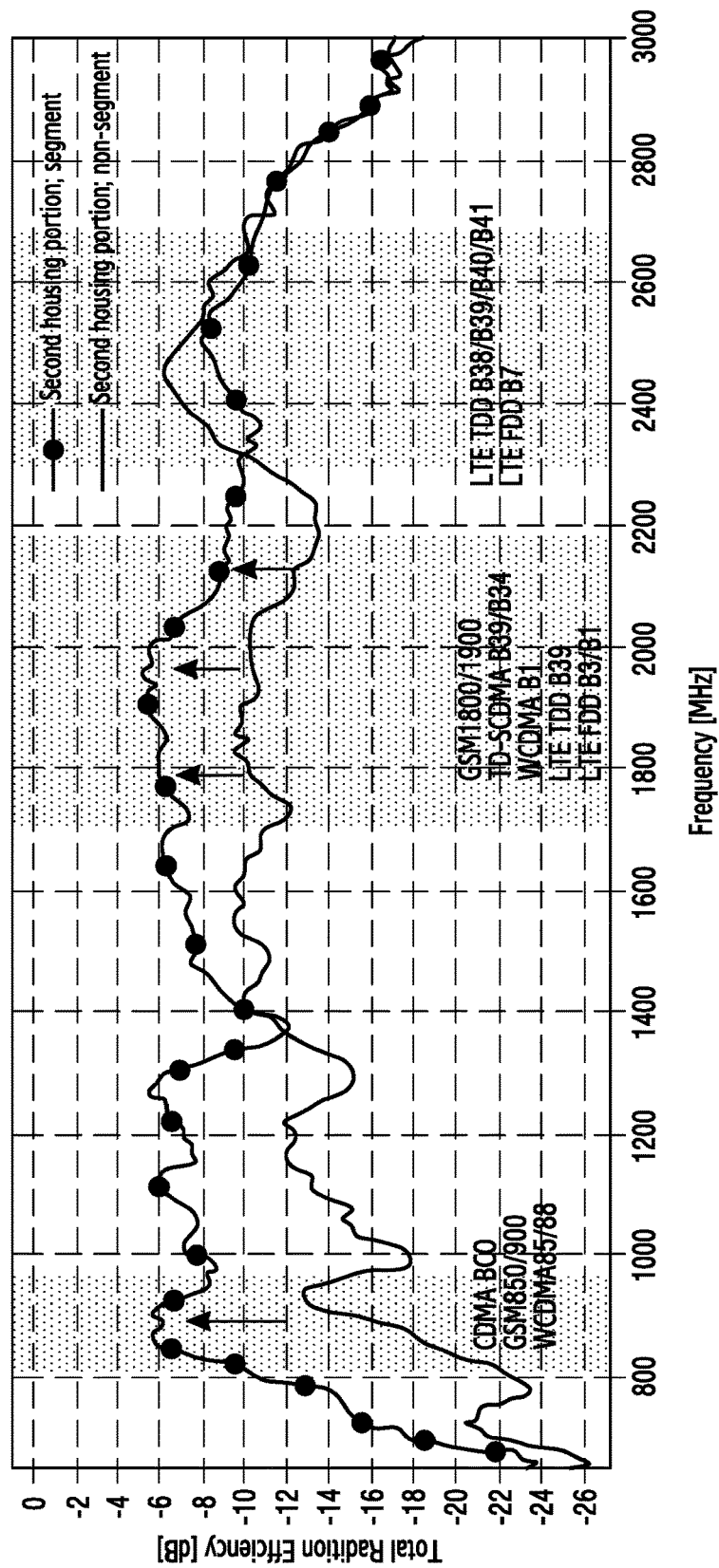
FIG. 7 is a graph representing radiation efficiencies of an electronic device in various frequency bands, according to an embodiment of the present disclosure.

FIG. 7 is a graph representing radiation efficiencies of an electronic device in various frequency bands, according to an embodiment of the present disclosure.

Referring to FIG. 7 the graph illustrates radiation efficiencies for various frequency bands (low band, mid band, and high band) in a case where a non-conductive member exists in a second housing portion 520 of the electronic device 500 and a case where a non-conductive member does not exist in the second housing portion 520 of the electronic device 500. That is, the graph illustrates a case where first split portions (e.g., the positions, each of which has an opening shape, and where the first non-conductive members 515 and 516 are located) are disposed in the first housing portion 510, and second split portions (e.g., the positions, each of which has an opening shape, and where the second non-conductive members 525 and 526 aligned with the first non-conductive members are located) exist (e.g., the electronic device 500 in the folded state, as in FIG. 5A), and in a case where first split portions (e.g., the positions, each of which has an opening shape, and where the first non-conductive members 515 and 516 are located), and second split portions (e.g., the positions, each of which has an opening shape, and where the second non-conductive members 525 and 526 aligned with the first non-conductive members are located) do not exist (e.g., the electronic device 400 in the folded state, as in FIG. 4A). The low band may be in the range of about 800 MHz to 1000 MHz, the mid band may be in the range of about 1700 MHz to 2200 MHz, and the high band may be in the range of 2300 MHz to 2700 MHz.

As shown in FIG. 7, the antenna employed in the electronic device 500 exhibits a higher total radiation efficiency for respective frequency bands in the case where the split portions corresponding to the first split portions exist in the second housing portion 520 (the upper curve in the graph) (e.g., the electronic device in the folded state as in FIG. 5A) as compared to that in the case where the second split portions do not exist in the second housing portion 520 (the lower curve in the graph) (e.g., the electronic device in the folded state as in FIG. 4A).

Table 1, shows a comparison of the radiation efficiency for respective frequency bands when the second split portions (e.g., the non-conductive members 525 and 526) corresponding to the first split portions (e.g., the first non-conductive members 515 and 516) of the first housing portion 510 exist in the second housing portion 520 and the radiation efficiency in the case where the second split portions do not exist in the second housing portion 520.

TABLE 1

| | Band (MHz) | | | | |
|---|---|---|---|---|---|
| | 850 | 900 | 1800 | 1900 | 2100 |
| 2$^{nd}$ Split portion does not exist | 2.75% (−15.6 dB) | 6.97% (−11.6 dB) | 9.91% (−10 dB) | 14.6% (−8.36 dB) | 12.8% (−8.93 dB) |
| 2$^{nd}$ Split portion exists | 20.4% (−6.9 dB) | 22.7% (−6.44 dB) | 24.1% (−6.19 dB) | 27.4% (−5.63 dB) | 20.3% (−6.93 dB) |
| Difference | 8.7 dB | 5.16 dB | 3.81 dB | 2.73 dB | 2 dB |

Referring to Table 1, the antenna employed in the electronic device, according to various embodiments, may be greatly improved in radiation performance when the second split portions exist in the second housing portion 520, as compared to the case where no second split portion exists.

Referring to Table 1, various embodiments exhibit a great difference in radiation performance in the low band (850 to 900 MHz). In the low band (850 to 900 MHz), it can be seen that the radiation efficiency is improved three or more times in the level of 5.16 dB to 8.7 dB.

For example, in the 850 MHz band, which is the low band, the radiation efficiency in the case where no second split portion exists in the second housing portion 520 (e.g., the electronic device in the folded state as in FIG. 4A) is 14.6% while the radiation efficiency in the case where the second split portions exist in the second housing portion 520 (e.g., the electronic device in the folded state as in FIG. 5A) is improved to 20.4%.

According to another example, in the 900 MHz band, which is the low band, the radiation efficiency in the case where no second split portion exists in the second housing portion 520 (e.g., the electronic device in the folded state as in FIG. 4A) is 6.97% while the radiation efficiency in the case where the second split portions exist in the second housing portion 520 (e.g., the electronic device in the folded state as in FIG. 5A) is improved to 22.7%.

In the 1900 MHz band, which is the mid band, the radiation efficiency in the case where no second split portion exists in the second housing portion 520 (e.g., the electronic device in the folded state as in FIG. 4A) is 2.75% while the radiation efficiency in the case where the second split portions exist in the second housing portion 520 (e.g., the electronic device in the folded state as in FIG. 5A) is improved to 27.4%.

In addition, in the 2000 MHz band, which is the mid band, the radiation efficiency in the case where no second split portion exists in the second housing portion 520 (the electronic device in the folded state as in FIG. 4A) is 12.8% while the radiation efficiency in the case where the second split portions exist in the second housing portion 520 (the electronic device in the folded state as in FIG. 5A) is improved to 20.3%.

In addition, in the 2500 MHz band, which is the high band, the radiation efficiency can be improved in the case where the second split portions exist in the second housing portion 520 (e.g., the electronic device in the folded state as in FIG. 5A) as compared to the case where no second split portion exists in the second housing portion 520 (the electronic device in the folded state as in FIG. 4A).

Figure 8:
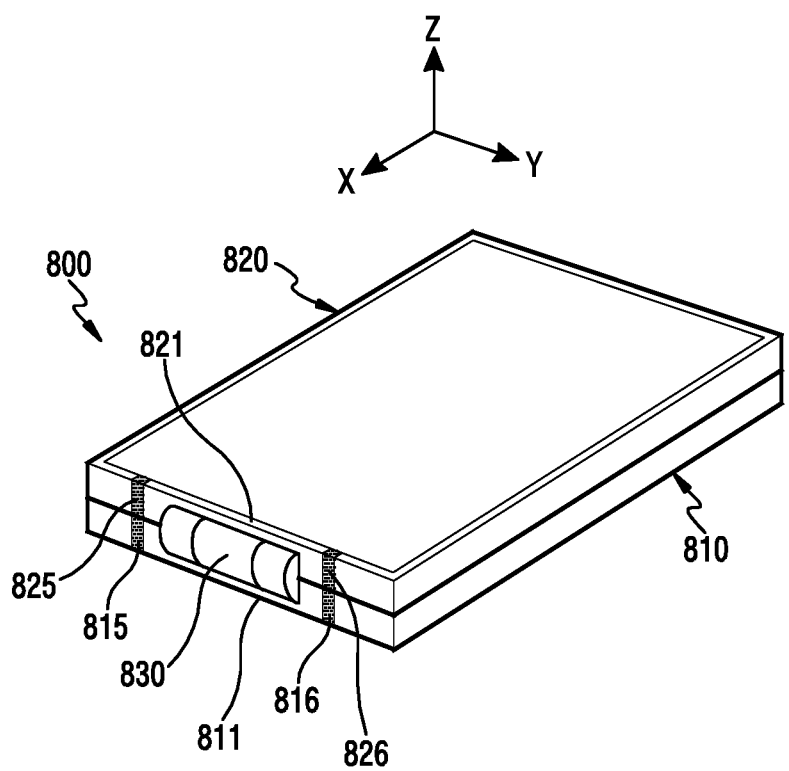
FIG. 8 illustrates a folder-type electronic device, according to an embodiment of the present disclosure.

FIG. 8 illustrates a folder-type electronic device, according to an embodiment of the present disclosure.

Referring to FIG. 8, a perspective view of a folder-type electronic device 800 in a folded state is shown. The electronic device 800, according to various embodiments, may be the same as the electronic device 101 of FIG. 1.

In FIG. 8, at least one gap may be formed in a first housing portion 810 and/or a second housing portion 820 of the electronic device 800.

The first and second housing portions 810 and 820 of the electronic device 800 may be rotatably connected to each other by a connection part 830. According to various embodiments, each of the first and second housing portions 810 and 820 may include a conductive member and/or a non-conductive member. For example, in the electronic device 800, the first and second housing portions 810 and 820 may include one or more metal frames 811 and 821 disposed along the rims thereof, respectively.

The electronic device 800 may include at least one non-conductive member that is formed in a region adjacent to the connection part 830 that interconnects the first housing portion 810 and the second housing portion 820. For example, the electronic device 800 may include first non-conductive members 815 and 816 and second non-conductive members 825 and 826, which may be respectively disposed in the first and second metal frames 811 and 821 of the first and second housing portions 810 and 820 in which the connection part 830 is disposed.

Each of the first and second metal frames 811 and 821, which are split by each of the first non-conductive members 815 and 816 and the second non-conductive members 825 and 826, may be used as an antenna radiator. The first non-conductive members 815 and 816 and the second non-conductive members 825 and 826 may be formed by filling gaps (i.e., openings) between the first and second metal frames with a non-conductive material.

In the folded/unfolded state of the electronic device 800, the first non-conductive members 815 and 816 and the second non-conductive members 825 and 826 may be respectively disposed in the first metal frame 811 and the second metal frame 821 positioned around the connection part 830. The first non-conductive members 815 and 816 and the second non-conductive members 825 and 826 may be disposed at the opposite sides of the connection part 830, respectively.

The connection part 830 may be referred to as a hinge unit because it provides a rotation axis of the first and second housing portions 810 and 820. The connection part 830 may include at least one hinge arm, and a hinge cam, a hinge shaft, a hinge spring, and so on, which are known in the art, may be disposed inside the hinge arm.

The first non-conductive members 815 and 816 and the second non-conductive members 825 and 826 may be aligned to each other, and the first and second metal frames 811 and 821 may be aligned to each other. For example, the first non-conductive members 815 and 816 and the second non-conductive members 825 and 826 may be arranged to be vertically symmetric to each other with reference to the connection part 830, and the first metal frame 811 and the second metal frame 812 may be arranged to be vertically symmetric to each other with reference to the connection part 830.

When the first face of the first housing portion 810 and the first face of the second housing portion 820 of the electronic device 800 face each other, the first non-conductive members 815 and 816 and the second non-conductive members 825 and 826 are substantially aligned so that antenna radiation may be executed through the open region of the antenna formed in the first housing portion 810 and an open region of the second housing portion 820 substantially aligned thereto. Thus, when the antenna radiation is executed to the open region of the second housing 820, deterioration of the antenna radiation performance can be prevented.

The electronic device 800 is not limited to an arrangement in which the first non-conductive members 815 and 816 and the second non-conductive members 825 and 826 are disposed around the connection part 830. Instead, each of the first non-conductive members 815 and 816 and the second non-conductive members 825 and 826 may be disposed in a symmetric or asymmetric arrangement on the metal frames disposed in at least the remaining portion, other than a portion where the connection part 830 is disposed, in each of the first and second housing portions 810 and 820.

Figure 9A:
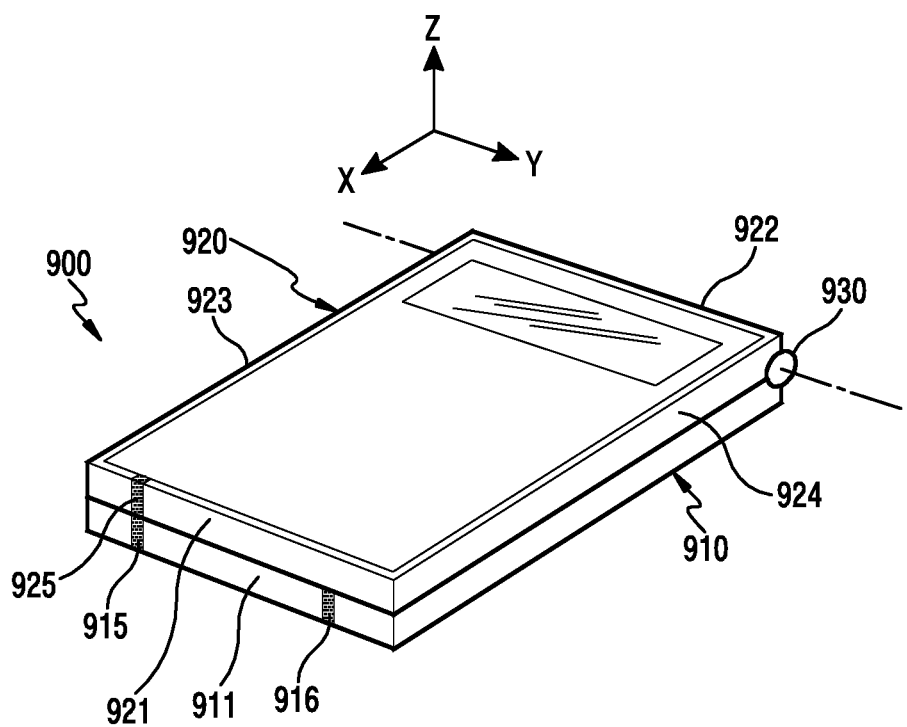
FIGS. 9A and 9B illustrate a folder-type electronic device, according to an embodiment of the present disclosure.
Figure 9B:
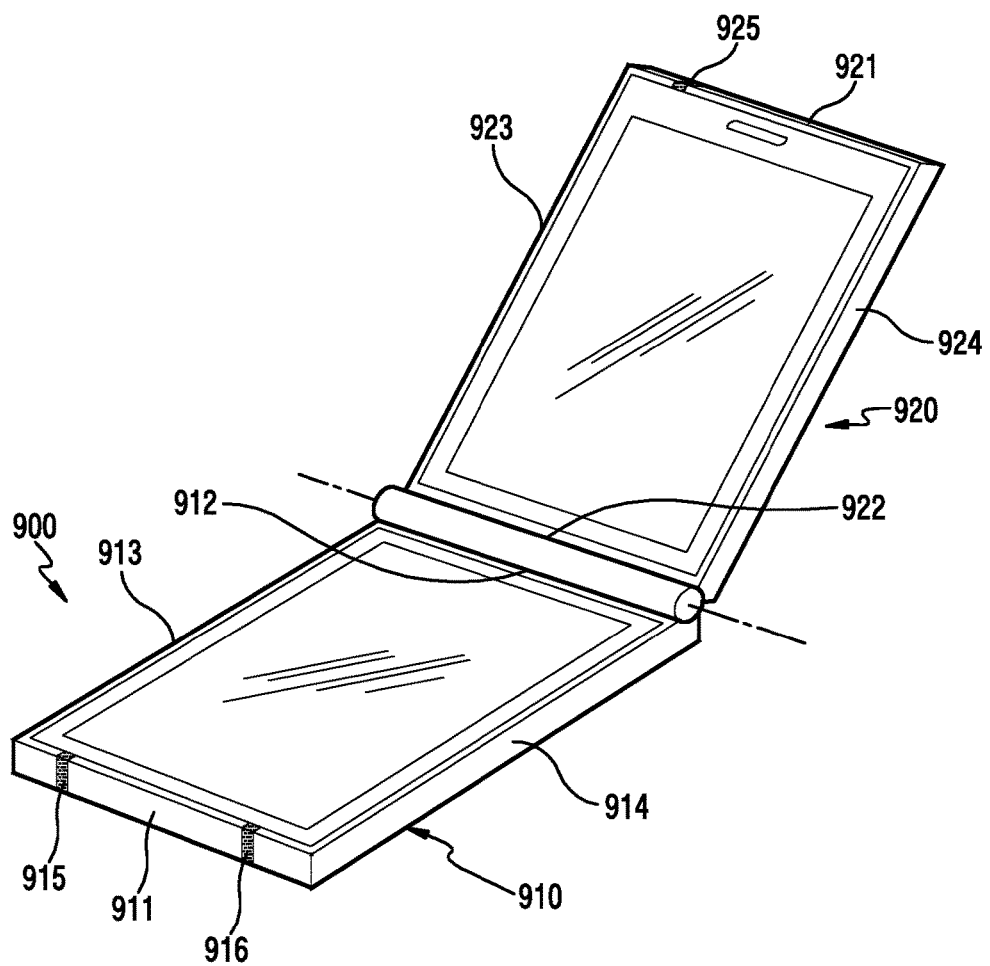

FIGS. 9A and 9B illustrate a folder-type electronic device, according to an embodiment of the present disclosure.

Referring to FIGS. 9A and 9B, a folder-type electronic device 900 is shown. In FIGS. 9A and 9B, perspective views of the electronic device 900 in a folded and unfolded state, respectively, are provided. The electronic device 900, according to various embodiments, may be the same as the electronic device 101 of FIG. 1.

In FIGS. 9A and 9B, at least a portion of a housing of the electronic device 900 forms at least a portion of an antenna. For example, at least one gap may be formed in a first housing portion 910 and/or a second housing portion 920 of the electronic device 900.

The electronic device 900 may include one or more non-conductive members, which are disposed on the first housing portion 910 and the second housing portion 920, respectively. Non-conductive members may be arranged in the first housing portion 910 and the second housing portion 920, respectively, such that the number of non-conductive members in the first housing portion 910 may be different from the number of non-conductive members in the second housing portion 920. Non-conductive members may be asymmetrically arranged in the first housing portion 910 and the second housing portion 920, respectively, and the number of non-conductive members arranged in the first housing portion 910 may be different from the number of non-conductive members arranged in the second housing portion 920.

For example, first non-conductive members 915 and 916 may be disposed in the first housing portion 910 and a second non-conductive member 925 may be disposed in the second housing portion 920. One non-conductive member 915 disposed in the first housing portion 910 and the second non-conductive member 925 disposed in the second housing portion 920 may be arranged to be aligned to each other. The non-conductive members disposed in the electronic device 900 may be arranged not only in the regions of the first and second metal frames 911 and 921 of the first and second housing portions 910 and 920, but also in the second metal frames 912 and 922, the third metal frames 913 and 923, or the fourth metal frames 914 and 924 of the first and second housing portions as the same arrangement structures.

The electronic device 900 is different from the electronic device illustrated in FIGS. 4A to 4D only in the configuration of the second housing portion 920. The configurations of the remaining components (i.e., the first housing portion 910 and a connection part 930 are the same as those of the electronic device illustrated in FIGS. 4A to 4D). Thus, descriptions of the first housing portion 910 and the connection part 930 will be omitted.

The rim of the second housing portion 920 of the electronic device 900 may include a plurality of metal frames (i.e., conductive portions). The metal frames may include first to fourth metal frames 921 to 924 depending on the disposed positions thereof.

The first housing portion 910 and the second housing portion 920 of the electronic device 900 may include non-conductive members, in which the number of the non-conductive members disposed in the first housing portion 910 may be different from the number of the non-conductive members disposed in the second housing portion 920. For example, the first metal frame 921 of the second housing portion 920 may include the second non-conductive member 925. Each of the metal frames 921 and 923, which are split by the first non-conductive member 925, may be used as at least a portion of an antenna radiator. The second non-conductive member 925 may be disposed at a side of the first metal frame 921. For example, in the state illustrated in FIG. 9A, the first non-conductive members 915 and 916, and the second non-conductive member 925 may be arranged asymmetrically in the vertical direction and in the horizontal direction. For example, in the state where the first and second housing portions 910 and 920 of the electronic device are folded, the non-conductive member 915 of the first housing portion and the second non-conductive member 925 of the second housing portion may be arranged to be superimposed one on another, which may improve an antenna radiation efficiency.

The second non-conductive member 925 may be formed by filling a gap (i.e., an opening) between the metal frames 921 and 923 with a non-conductive material.

The electronic device 900 may differently adjust the length of an antenna depending on a bandwidth to support. For example, the antenna bandwidth may be differently adjusted depending on the positions of a non-conductive member (i.e., the opening or gap), a power feeding unit, and a ground unit.

When the first face of the first housing portion 910 and the first face of the second housing portion 920 of the electronic device 900 face each other, the non-conductive member 915 and the second non-conductive member 925 are substantially aligned so that antenna radiation may be executed through the open region of the antenna formed in the first housing portion 910 and an open region of the second housing portion 920 substantially aligned thereto. Thus, when the antenna radiation is executed to the open region of the second housing 920, the deterioration of the antenna radiation performance can be prevented.

Figure 10A:
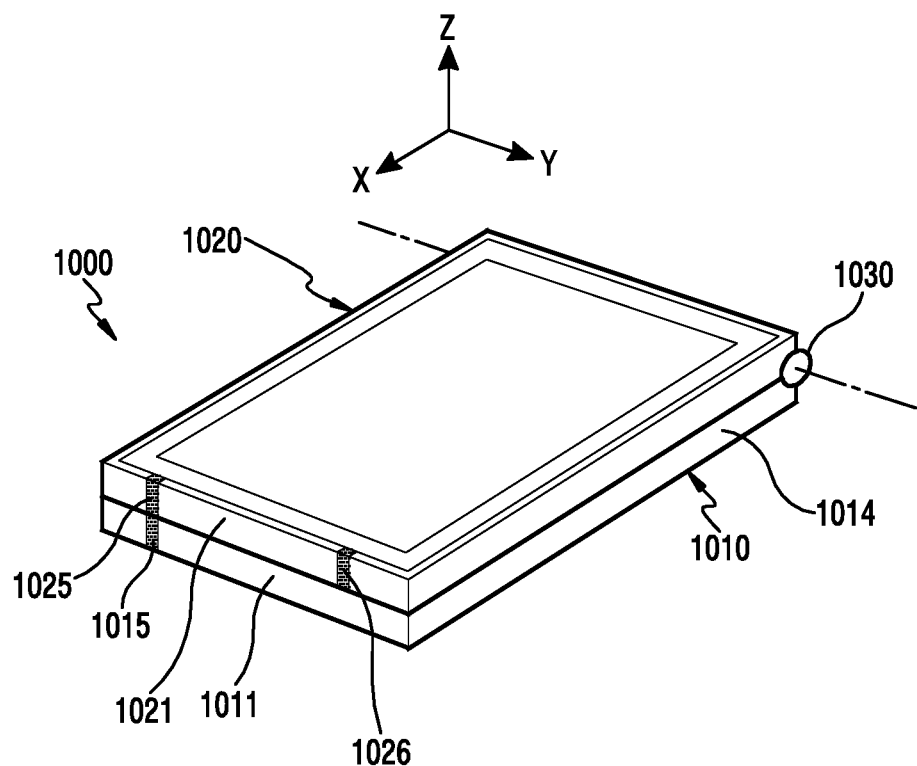
FIGS. 10A and 10B illustrate a folder-type electronic device, according to an embodiment of the present disclosure.
Figure 10B:
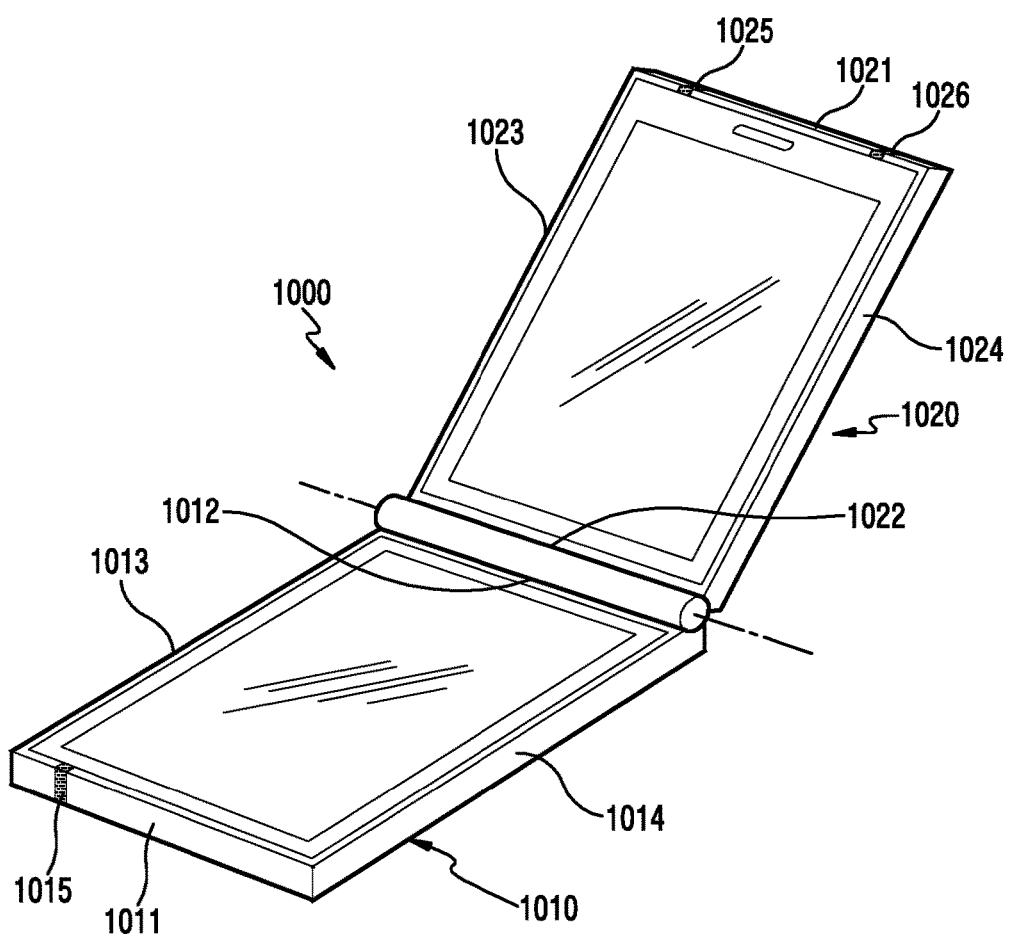

FIGS. 10A and 10B illustrate a folder-type electronic device, according to an embodiment of the present disclosure.

Referring to FIGS. 10A and 10B, a folder-type electronic device 1000 is shown. In FIGS. 10A and 10B, perspective views of the electronic device 1000 in a folded and unfolded state, respectively, are provided. The electronic device 1000, according to various embodiments, may be the same as the electronic device 101 of FIG. 1.

In FIGS. 10A and 10B, at least a portion of a housing of the electronic device 1000 forms at least a portion of an antenna. For example, at least one gap may be formed in a first housing portion 1010 or a second housing portion 1020 of the electronic device 1000.

The electronic device 1000 may include one or more non-conductive members, which are disposed on the first housing portion 1010 and the second housing portion 1020, respectively. Non-conductive members may be arranged in the first housing portion 1010 and the second housing portion 1020, respectively, and the number of non-conductive members arranged in the first housing portion 1010 may be different from the number of non-conductive members arranged in the second housing portion 1020. Non-conductive members may be asymmetrically arranged in the first housing portion 1010 and the second housing portion 1020, respectively, and the number of non-conductive members arranged in the first housing portion 1010 may be different from the number of non-conductive members arranged in the second housing portion 1020.

For example, a first non-conductive member 1015 may be disposed in the first housing portion 1010 and two or more second non-conductive members 1025 and 1026 may be disposed in the second housing portion 1020. The first non-conductive member 1015 disposed in the first housing portion 1010 and one second non-conductive member 1025 disposed in the second housing portion 1020 may be arranged to be aligned to each other.

The non-conductive members disposed in the electronic device 1000 may be arranged not only in the regions of the first and second metal frames 1011 and 1021 of the first and second housing portions 1010 and 1020, but also in the second metal frames 1012 and 1022, the third metal frames 1013 and 1023, or the fourth metal frames 1014 and 1024 of the first and second housing portions as the same arrangement structures.

The Electronic Device 1000

The electronic device 1000 is different from the electronic device illustrated in FIGS. 4A to 4D only in the configuration of the first housing portion 1010. The configurations of the remaining components (i.e., the second housing portion 1020 and a connection part 1030 are the same as those of the electronic device illustrated in FIGS. 4A to 4D). Thus, descriptions of the second housing portion 1020 and the connection part 1030 will be omitted. The rim of the first housing portion 1010 of the electronic device 1000 may include a plurality of metal frames (i.e., conductive portions). The metal frames may include first to fourth metal frames 1011 to 1014 depending on the disposed positions thereof.

The first metal frame 1011 may include the first non-conductive member 1015. Each of the metal frames 1011 and 1013, which are split by the first non-conductive member 1015, may be used as an antenna radiator. The first non-conductive member 1015 may be disposed at a side of the first metal frame 1011. For example, in the state illustrated in FIG. 10A, the first non-conductive members 1015, and the second non-conductive members 1025 and 1026 may be arranged asymmetrically in the vertical direction and in the horizontal direction. In the state where the first and second housing portions 1010 and 1020 of the electronic device 1000 are folded, the first non-conductive member 1015 of the first housing portion and the second non-conductive member 1025 of the second housing portion may be arranged to be superimposed one on another, which may improve an antenna radiation efficiency.

The first non-conductive member 1015 may be formed by filling a gap (i.e., an opening) between the metal frames 1011 and 1013 with a non-conductive material.

The electronic device 1000 may differently adjust the length of an antenna depending on a bandwidth to support. For example, the antenna bandwidth may be differently adjusted depending on the positions of a split portion (i.e., the opening or gap), a non-conductive member, a power feeding unit, and a ground unit.

When the first face of the first housing portion 1010 and the first face of the second housing portion 1020 of the electronic device 1000 face each other, the first non-conductive member 1015 and the second non-conductive member 1025 are substantially aligned so that antenna radiation may be executed through the open region of the antenna formed in the first housing portion 1010 and an open region of the second housing portion 1020 substantially aligned thereto. Thus, when the antenna radiation is executed to the open region of the second housing 1020, the deterioration of the antenna radiation performance can be prevented.

Figure 11A:
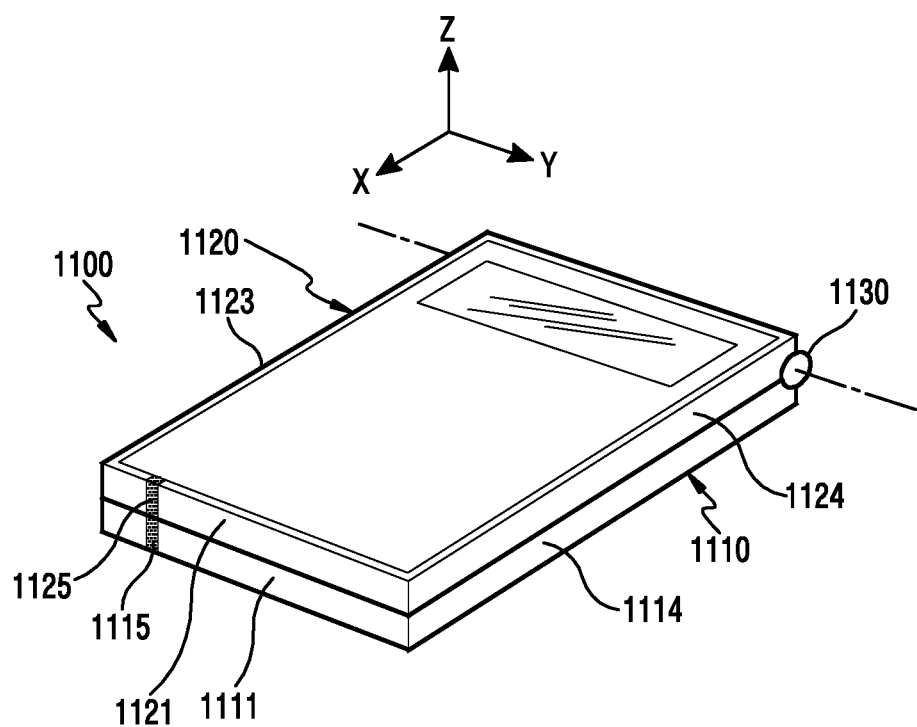
FIGS. 11A and 11B illustrate a folder-type electronic device, according to an embodiment of the present disclosure.
Figure 11B:
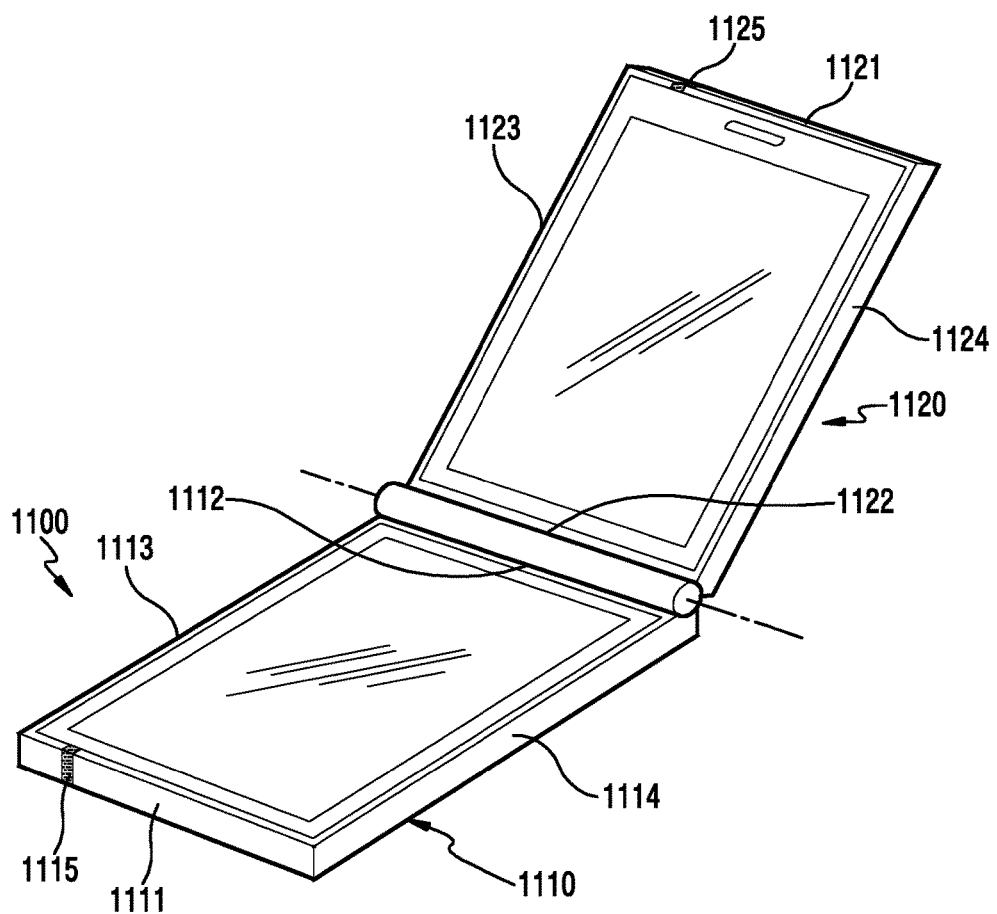

FIGS. 11A and 11B illustrate a folder-type electronic device, according to an embodiment of the present disclosure.

Referring to FIGS. 11A and 11B, a folder-type electronic device 1100 is shown. In FIGS. 11A and 11B, perspective views of the electronic device 1100 in a folded and unfolded state, respectively, are provided. The electronic device 1100, according to various embodiments, may be the same as the electronic device 101 of FIG. 1.

In FIGS. 11A and 11B, at least a portion of a housing of the electronic device 1100 forms at least a portion of an antenna. For example, at least one gap may be formed in a first housing portion 1110 and/or a second housing portion 1120 of the electronic device 1100.

The electronic device 1100 may include one non-conductive member, which is disposed in each of the first housing portion 1110 and the second housing portion 1120. Non-conductive members may be arranged in the first housing portion 1110 and the second housing portion 1120, respectively, and the number of non-conductive members arranged in the first housing portion 1110 may be the same as the number of non-conductive members arranged in the second housing portion 1120. Non-conductive members may be symmetrically arranged in the first housing portion 1110 and the second housing portion 1120, respectively, and the number of non-conductive members arranged in the first housing portion 1110 may be the same as the number of non-conductive members arranged in the second housing portion 1120.

For example, a first non-conductive member 1115 may be disposed in the first housing portion 1110 and a second non-conductive member 1125 may be disposed in the second housing portion 1120. The first non-conductive member 1115 disposed in the first housing portion 1110 and the second non-conductive member 1125 disposed in the second housing portion 1120 may be arranged to be aligned to each other.

The non-conductive members disposed in the electronic device 1100 may be arranged not only in the regions of the first and second metal frames 1111 and 1121 of the first and second housing portions 1110 and 1120, but also in the second metal frames 1112 and 1122, the third metal frames 1113 and 1123, or the fourth metal frames 1114 and 1124 of the first and second housing portions as the same arrangement structures.

The electronic device 1100 may further include a connection part 1130. The configuration of both the first and second housing portions 1110 and 1120 is the same as that of the first housing portion 910 illustrated in FIGS. 9A and 9B, and thus, detailed descriptions thereof will be omitted.

The first metal frame 1111 of the first housing portion may include a single non-conductive member 1115. Each of the metal frames 1111 and 1113, which are split by the single non-conductive member 1115, may be used as an antenna radiator. The first non-conductive member 1115 may be disposed at a side of the first metal frame 1111. The first metal frame 1121 of the second housing portion may include a single non-conductive member 1125. Each of the metal frames 1121 and 1123, which are split by the second non-conductive member 1125, may be used as an antenna radiator. The second non-conductive member 1125 may be disposed at a side of the first metal frame 1121.

When the first face of the first housing portion 1110 and the first face of the second housing portion 1120 of the electronic device 1100 face each other, the first non-conductive member 1115 and the second non-conductive member 1125 are substantially aligned so that antenna radiation may be executed through the open region of the antenna formed in the first housing portion 1110 and an open region of the second housing portion 1120 substantially aligned thereto. Thus, when the antenna radiation is executed to the open region of the second housing 1120, the deterioration of the antenna radiation performance can be prevented.

In the state illustrated in FIG. 11A, the first and second non-conductive members 1115 and 1125 may be arranged symmetrically in the vertical direction and symmetrically in the horizontal direction. In the state where the first and second housing portions 1110 and 1120 are folded, each of the first and second non-conductive members 1115 and 1125 may be disposed to be superimposed one on another, which may improve an antenna radiation efficiency.

Figure 12A:
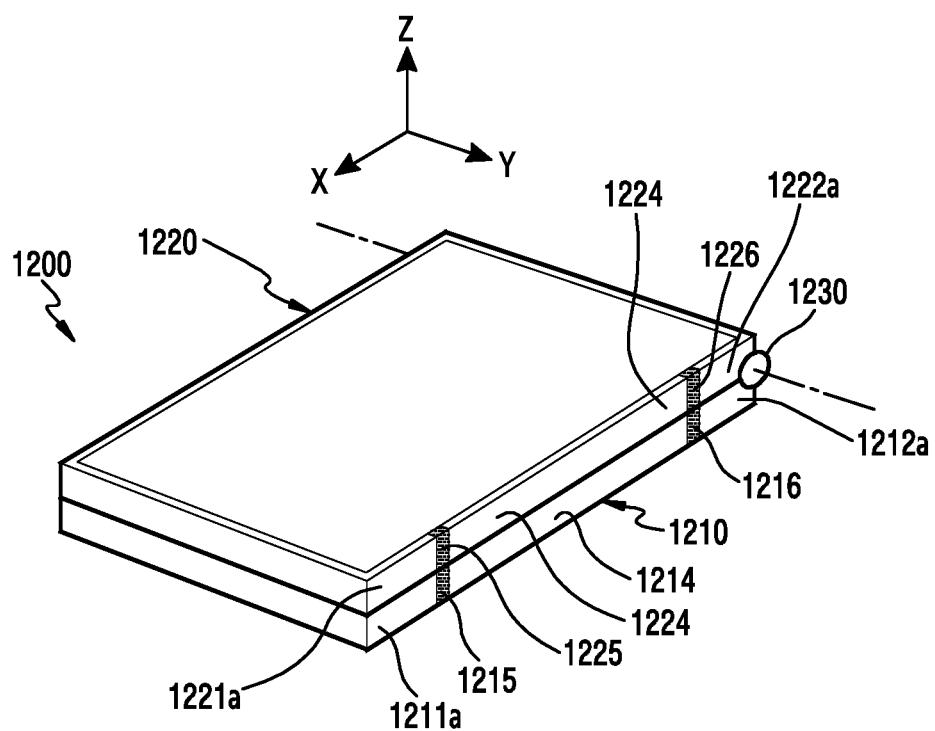
FIGS. 12A and 12B illustrate a folder-type electronic device, according to an embodiment of the present disclosure.
Figure 12B:
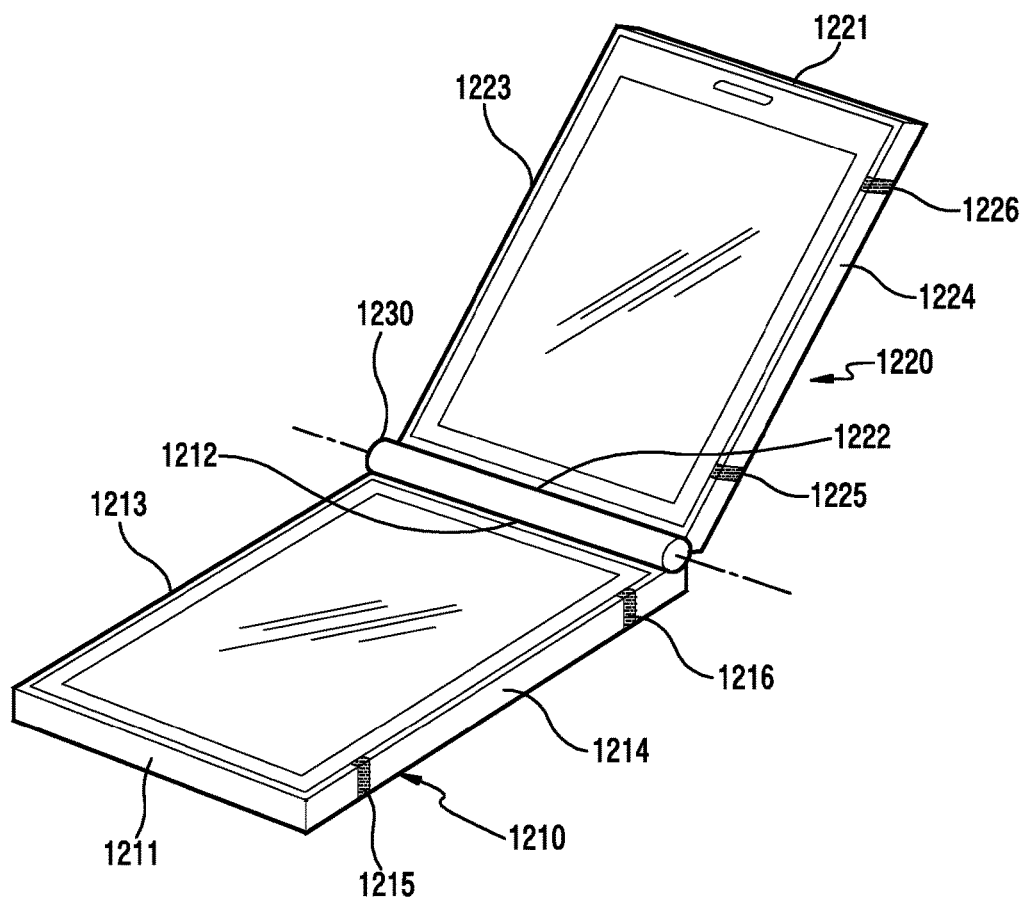

FIGS. 12A and 12B illustrate a folder-type electronic device, according to an embodiment of the present disclosure.

Referring to FIGS. 12A and 12B, a folder-type electronic device 1200 is shown. In FIGS. 12A and 12B, perspective views of the electronic device 1200 in a folded and unfolded state, respectively, are provided. The electronic device 1200, according to various embodiments, may be the same as the electronic device 101 of FIG. 1.

In FIGS. 12A and 12B, at least a portion of a housing of the electronic device 1200 forms at least a portion of an antenna. For example, at least one gap may be formed in a first housing portion 1210 or a second housing portion 1220 of the electronic device 1200.

The electronic device 1200 may include one non-conductive member, which is disposed in each of the first housing portion 1210 and the second housing portion 1220. Non-conductive members may be arranged in the first housing portion 1210 and the second housing portion 1220, respectively, and the number of non-conductive members arranged in the first housing portion 1210 may be the same as the number of non-conductive members arranged in the second housing portion 1220. Non-conductive members may be symmetrically arranged in the first housing portion 1210 and the second housing portion 1220, respectively, and the number of non-conductive members arranged in the first housing portion 1210 may be the same as the number of non-conductive members arranged in the second housing portion 1220.

For example, two first non-conductive members 1215 and 1216 may be disposed in the first housing portion 1210 and two second non-conductive members 1225 and 1226 may be disposed in the second housing portion 1220. The two first non-conductive members 1215 and 1216 disposed in the first housing portion 1210 and the two second non-conductive members 1225 and 1226 disposed in the second housing portion 1220 may be arranged to be aligned to each other. For example, in the state where the electronic device 1200 is folded, first non-conductive members 1215 and 1216 and second non-conductive members 1225 and 1226 may be arranged on the metal frames to be symmetric in the vertical direction and in the horizontal direction.

The non-conductive members disposed in the electronic device 1200 may be arranged not only in the regions of the first and second metal frames 1211 and 1221 of the first and second housing portions 1210 and 1220, but also in the second metal frames 1212 and 1222, the third metal frames 1213 and 1223, or the fourth metal frames 1214 and 1224 of the first and second housing portions as the same arrangement structures.

The electronic device 1200 may further include a connection part 1230. The electronic device 1200 may be different from the electronic device 400 illustrated in FIGS. 4A to 4D in terms of the arrangement positions of the non-conductive members disposed in each of the first and second housing portions 1210 and 1220. The metal frames forming the rim of the first housing portion 1210 may include first to fourth metal frames 1211 to 1214. The metal frames forming the rim of the second housing portion 1220 may include first to fourth metal frames 1221 to 1224.

The fourth metal frame 1214 of the first housing 1210 may include one or more of the first non-conductive members 1215 and 1216. The first non-conductive members 1215 and 1216 may be mounted on the fourth metal frame to be symmetric to each other.

Each of the metal frames, which are split by respective first non-conductive members 1215 and 1216, may be used as an antenna radiator. The fourth metal frame may be a center metal frame that is provided by a pair of the first non-conductive members 1215 and 1216 formed at a predetermined interval. When the first metal frame 1214 is fed with power to operate as an antenna radiator, at least a portion of each of the first and second metal frames 1211 and 1212 may be electrically coupled to the fourth metal frame 1214 to operate as an antenna radiator. The first non-conductive members 1215 and 1216 may be formed by filling a gap (i.e., an opening) between the metal frames with a non-conductive material.

The fourth metal frame 1214 of the first housing portion may further include side metal frames 1211a and 1212a that respectively extend from the first and second metal frames 1211 and 1212 and are bent at a right angle. The first non-conductive members 1215 and 1216 may be arranged between the fourth metal frame 1214 and the side metal frames 1211a and 1212a, respectively. When the fourth metal frame 1214 is fed with power, the fourth metal frame 1214 may operate as an antenna radiator that is fed with power from a power feeding circuit so as to form resonance. When the fourth metal frame 1214 is fed with power from the power feeding circuit to operate as an antenna radiator, at least a portion of the side metal frame 1211a and the first metal frame 1211 or at least a portion of the side metal frame 1212a and the second metal frame 1212 is electrically coupled to each other so as to operate as a portion of the antenna radiator.

The fourth metal frame 1224 of the second housing portion 1220 may include one or more of the second non-conductive members 1225 and 1226. Each of the second non-conductive members 1225 and 1226 may be mounted on the fourth metal frame 1224 to be symmetric to each other.

Each of the metal frames 1224, which are split by the respective second non-conductive members 1225 and 1226, may be used as an antenna radiator. The fourth metal frame 1224 of the second housing portion may be a center frame 1224 that is provided by the second non-conductive members 1225 and 1226 formed at a predetermined interval. When the fourth metal frame 1224 of the second housing portion is fed with power by a power feeding circuit to operate as at least a portion of an antenna radiator that forms resonance, at least a portion of each of the first and second metal frames 1221 and 1222 may be electrically coupled to the center metal frame 1224 to operate as an antenna radiator. The second non-conductive members 1225 and 1226 may be formed by filling a gap (i.e., an opening) between the metal frames with a non-conductive material.

The fourth metal frame 1224 of the second housing portion may further include side metal frames 1221a and 1222a that respectively extend from the first and second metal frames 1211 and 1212 and are then bent at a right angle. The second non-conductive members 1225 and 1226 may be arranged between the fourth metal frame 1224 of the second housing portion and the top side metal frames 1221a and 1222a, respectively. When the fourth metal frame 1224 is fed with power by a power feeding circuit, the fourth metal frame 1224 may operate as an antenna radiator that forms resonance. When the fourth metal frame 1224 is fed with power from the power feeding circuit to operate as a radiator, at least a portion of the side metal frame 1221a and the first metal frame 1221 or at least a portion of the side metal frame 1222a and the second metal frame 1222 is electrically coupled to each other so as to operate as an antenna radiator.

In the electronic device 1200, the first non-conductive members 1215 and 1216 and the second non-conductive members 1225 and 1226 may be arranged to be substantially symmetrically aligned to each other when viewed with reference to the YZ plane. For example, the first non-conductive members 1215 and 1216 and the second non-conductive members 1225 and 1226 may be substantially aligned in the vertical direction with reference to the Z axis.

The fourth metal frame 1214 of the first housing portion 1210 and the fourth metal frame 1224 of the second housing 1220 may be aligned to be vertically symmetric to each other along the Z axis.

With this arrangement, the electronic device 1200 may maintain the radiation effect of the antenna even in the state where the first housing portion 1210 and the second housing portion 1220 are disposed close to each other (i.e., when the electronic device 1200 is in a folded state).

When the second housing portion 1220 is disposed closed to the first housing portion 1210 (i.e. when the first non-conductive members 1215 and 1216 and the second non-conductive members 1225 and 1226 are symmetrically aligned), radiation radiated from the antenna radiator formed by at least a portion of the first housing portion 1210 may be radiated through the second non-conductive member (i.e., the opening) of the second housing portion 1220.

The first non-conductive members 1215 and 1216 and the second non-conductive members 1225 and 1226 may be equally arranged on the third frames 1213 and 1223 of the first and second housing portions, respectively.

The disposed number of each of the first non-conductive members 1215 and 1216 and the second non-conductive members 1225 and 1226 does not need to be limited to two, and may be one or three or more.

When the first face of the first housing portion 1210 and the first face of the second housing portion 1220 of the electronic device 1200 face each other, the first non-conductive members 1215 and 1216 and the second non-conductive members 1225 and 1226 are substantially aligned so that antenna radiation may be executed through the open region of the antenna formed in the first housing portion 1210 and an open region of the second housing portion 1220 substantially aligned thereto. Thus, when the antenna radiation is executed to the open region of the second housing 1220, the deterioration of the antenna radiation performance can be prevented.

Figure 13A:
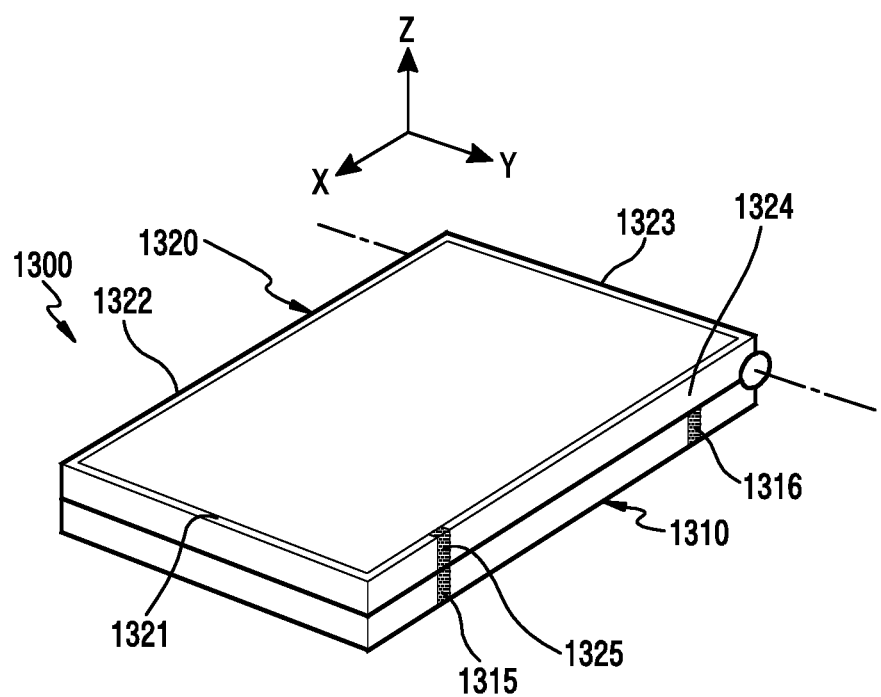
FIGS. 13A and 13B illustrate a folder-type electronic device, according to an embodiment of the present disclosure.
Figure 13B:
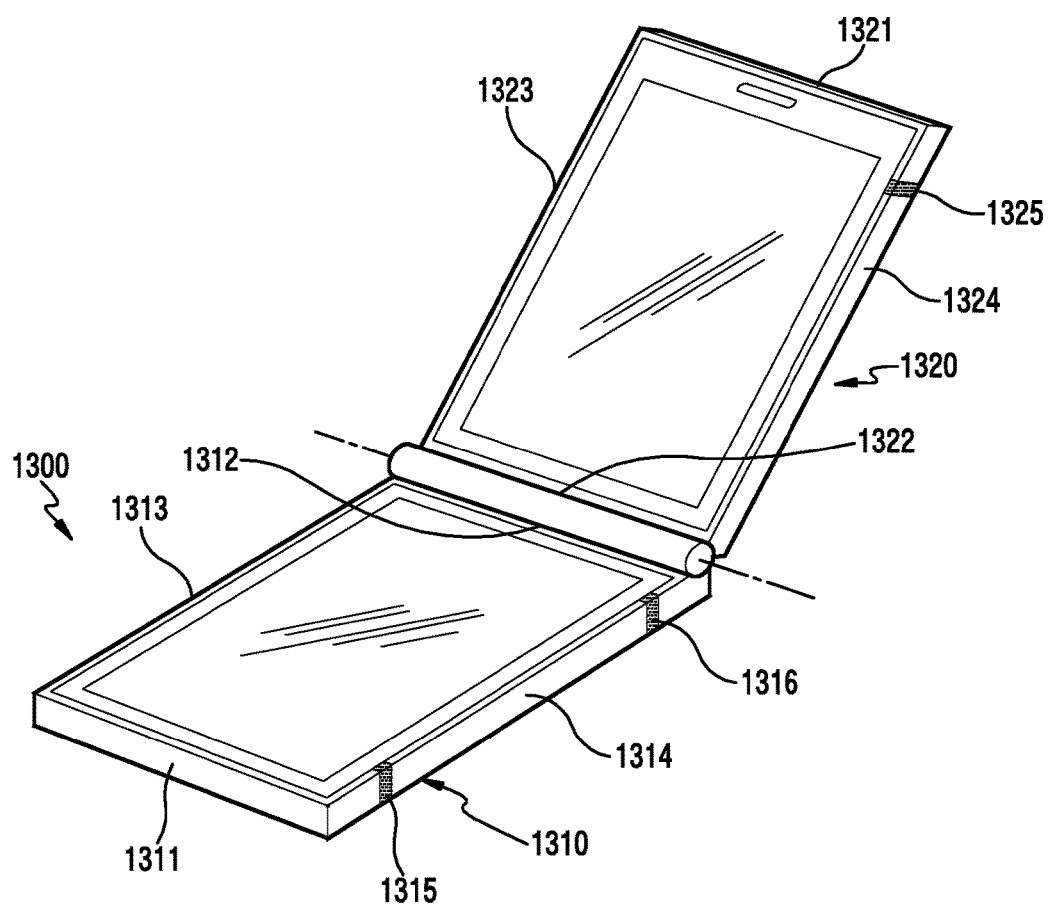

FIGS. 13A and 13B illustrate a folder-type electronic device, according to an embodiment of the present disclosure.

Referring to FIGS. 13A and 13B, a folder-type electronic device 1300 is shown. In FIGS. 13A and 13B, perspective views of the electronic device 1300 in a folded and unfolded state, respectively, are provided. The electronic device 1300, according to various embodiments, may be the same as the electronic device 101 of FIG. 1.

In FIGS. 13A and 13B, at least a portion of a housing of the electronic device 1300 forms at least a portion of an antenna. For example, at least one gap may be formed in a first housing portion 1310 and/or a second housing portion 1320 of the electronic device 1300.

The electronic device 1300 may include one or more non-conductive member, which may be disposed in each of the first housing portion 1310 and the second housing portion 1320. Non-conductive members may be arranged in the first housing portion 1310 and the second housing portion 1320, respectively, and the number of non-conductive members arranged in the first housing portion 1310 may be different from the number of non-conductive members arranged in the second housing portion 1320. Non-conductive members may be symmetrically arranged in the first housing portion 1310 and the second housing portion 1320, respectively, and the number of non-conductive members arranged in the first housing portion 1310 may be different from the number of non-conductive members arranged in the second housing portion 1320.

For example, two first non-conductive members 1315 and 1316 may be disposed in the first housing portion 1310 and one second non-conductive member 1325 may be disposed in the second housing portion 1320. One non-conductive member 1315 of the first housing portion 1310 and the second non-conductive member 1325 of the second housing portion 1320 may be arranged to be substantially aligned to each other when the first housing portion 1310 and the second housing portion 1320 face each other. In the state where the electronic device 1300 is folded, first non-conductive members 1315 and 1316 and second non-conductive member 1325 may be arranged on the metal frames to be asymmetric in the vertical direction and in the horizontal direction.

The non-conductive members disposed in the electronic device 1300 may be arranged not only in the regions of the first and second metal frames 1311 and 1321 of the first and second housing portions 1310 and 1320, but also in the second metal frames 1312 and 1322, the third metal frames 1313 and 1323, or the fourth metal frames 1314 and 1324 of the first and second housing portions 1310 and 1320 as the same arrangement structures.

The electronic device 1300 is different from the electronic device 1200 illustrated in FIGS. 12A and 12B only in the configuration of the second housing portion 1320. The configurations of the remaining components, (i.e., the first housing portion 1310 and a connection part 1330 are the same as those of the electronic device 1200 illustrated in FIGS. 12A to 12B). Thus, descriptions of the first housing portion 1310 and the connection part 1330 will be omitted.

The rim of the second housing portion 1320 of the electronic device 1300 may include a plurality of metal frames (i.e., conductive portions). The metal frames may include first to fourth metal frames 1321 to 1324 depending on the disposed positions thereof.

The fourth metal frame 1324 may include the second non-conductive member 1325. Each of the metal frames 1321 and 1324, which are split by the second non-conductive member 1325, may be used as an antenna radiator. The second non-conductive member 1325 may be disposed at a side of the fourth metal frame 1324. In the state illustrated in FIG. 13A, the first non-conductive members 1315 and 1316 and the second non-conductive member 1325 may be arranged asymmetrically in the vertical direction and in the horizontal direction. In the state where the first and second housing portions 1310 and 1320 are folded, the first non-conductive member 1315 and the second non-conductive member 1325 may be disposed to be superimposed one on another, which may improve an antenna radiation efficiency. The second non-conductive member 1325 may be formed by filling a gap (i.e., an opening) between the metal frames 1321 and 1324 with a non-conductive material.

The disposed number of each of the first non-conductive members 1315 and 1316 and the second non-conductive members 1326 in each of the first and second housing portions 1310 and 1320 does not need to be limited, and a plurality of non-conductive members may be variously disposed.

When the first face of the first housing portion 1310 and the first face of the second housing portion 1320 of the electronic device 1300 face each other, the first non-conductive member 1315 and the second non-conductive member 1325 are substantially aligned so that antenna radiation may be executed through the open region of the antenna formed in the first housing portion 1310 and an open region of the second housing portion 1320 substantially aligned thereto. Thus, when the antenna radiation is executed to the open region of the second housing 1320, the deterioration of the antenna radiation performance can be prevented.

Figure 14A:
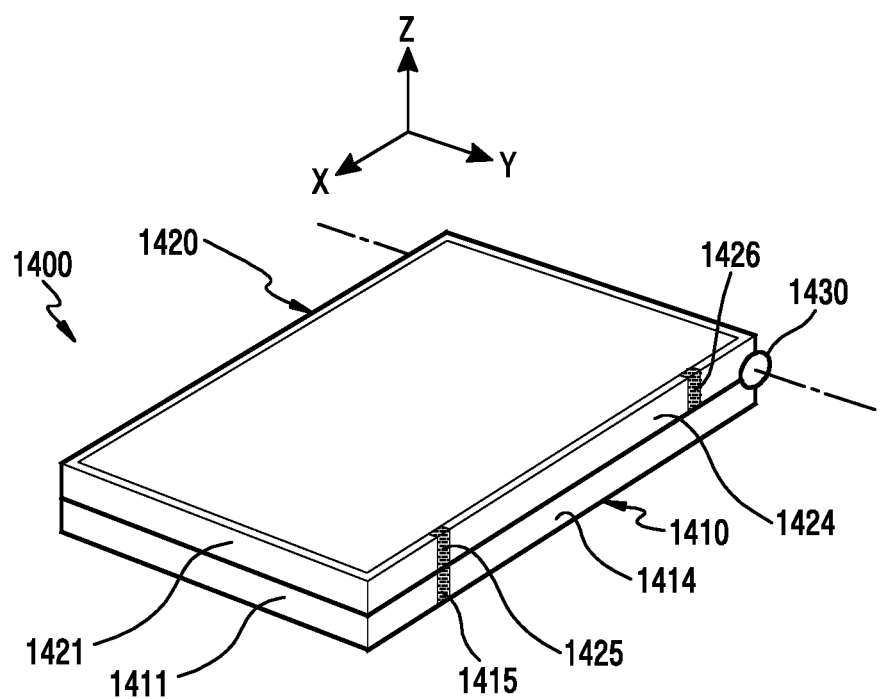
FIGS. 14A and 14B illustrate a folder-type electronic device, according to an embodiment of the present disclosure.
Figure 14B:
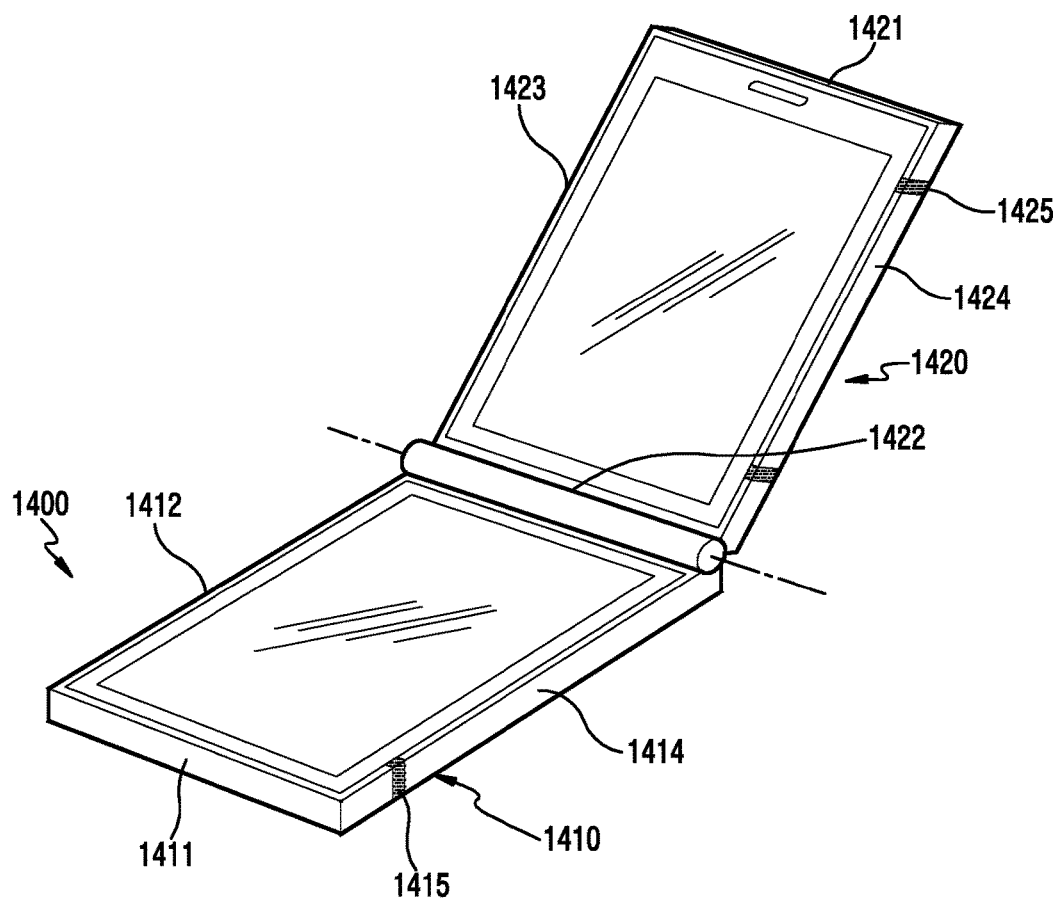

FIGS. 14A and 14B illustrate a folder-type electronic device, according to an embodiment of the present disclosure.

Referring to FIGS. 14A and 14B, a folder-type electronic device 1400 is shown. In FIGS. 14A and 14B, perspective views of the electronic device 1400 in a folded and unfolded state, respectively, are provided. The electronic device 1400, according to various embodiments, may be the same as the electronic device 101 of FIG. 1.

In FIGS. 14A and 14B, at least a portion of a housing of the electronic device 1400 forms at least a portion of an antenna. For example, at least one gap may be formed in a first housing portion 1410 and/or a second housing portion 1420 of the electronic device 1400.

The electronic device 1400 may include one or more non-conductive members, which are disposed on the first housing portion 1410 and the second housing portion 1420, respectively. Non-conductive members may be arranged in the first housing portion 1410 and the second housing portion 1420, respectively, and the number of non-conductive members arranged in the first housing portion 1410 may be different from the number of non-conductive members arranged in the second housing portion 1420. Non-conductive members may be asymmetrically arranged in the first housing portion 1410 and the second housing portion 1420, respectively, and the number of non-conductive members arranged in the first housing portion 1410 may be different from the number of non-conductive members arranged in the second housing portion 1420.

For example, one first non-conductive member 1415 may be disposed in the first housing portion 1410 and two second non-conductive members 1425 and 1426 may be disposed in the second housing portion 1420. The first non-conductive member 1415 disposed in the first housing portion 1410 and one first non-conductive member 1425 disposed in the second housing portion 1420 may be arranged to be aligned to each other.

The non-conductive members disposed in the electronic device 1400 may be arranged not only in the regions of the first and second metal frames 1411 and 1421 of the first and second housing portions 1410 and 1420, but also in the second metal frames 1412 and 1422, the third metal frames 1413 and 1423, or the fourth metal frames 1414 and 1424 of the first and second housing portions 1410 and 1420 as the same arrangement structures.

The electronic device 1400 is different from the electronic device illustrated in FIGS. 12A and 12B only in the configuration of the first housing portion 1410. The configurations of the remaining components (i.e., the second housing portion 1420 and a connection part 1430 are the same as those of the electronic device 1200 illustrated in FIGS. 12A and 12B). Thus, descriptions of the second housing portion 1420 and the connection part 1430 will be omitted. The rim of the first housing portion 1410 of the electronic device 1400 may include a plurality of metal frames (i.e., conductive portions). The metal frames may include first to fourth metal frames 1411 to 1414 depending on the disposed positions thereof.

The fourth metal frame 1414 may include the first non-conductive member 1415. Each of the metal frames 1411 and 1414, which are split by the first non-conductive member 1415, may be used as an antenna radiator. The first non-conductive member 1415 may be disposed at a side of the fourth metal frame 1414. In the state illustrated in FIG. 14A, the first non-conductive member 1415 and the second non-conductive members 1425 and 1426 may be arranged asymmetrically in the vertical direction and in the horizontal direction. In the state where the first and second housing portions 1410 and 1420 are folded, the first non-conductive member 1415 and the one second non-conductive member 1425 may be disposed to be superimposed one on another, which may improve an antenna radiation efficiency.

When the first face of the first housing portion 1410 and the first face of the second housing portion 1420 of the electronic device 1400 face each other, the first non-conductive member 1415 and the one second non-conductive member 1425 are substantially aligned so that antenna radiation may be executed through the open region of the antenna formed in the first housing portion 1410 and an open region of the second housing portion 1420 substantially aligned thereto. Thus, when the antenna radiation is executed to the open region of the second housing 1420, the deterioration of the antenna radiation performance can be prevented.

Each of the first and second non-conductive members 1415, 1425, and 1426 may be equally arranged the third frames 1413 and 1423 of the first and second housing portions, respectively.

Figure 15A:
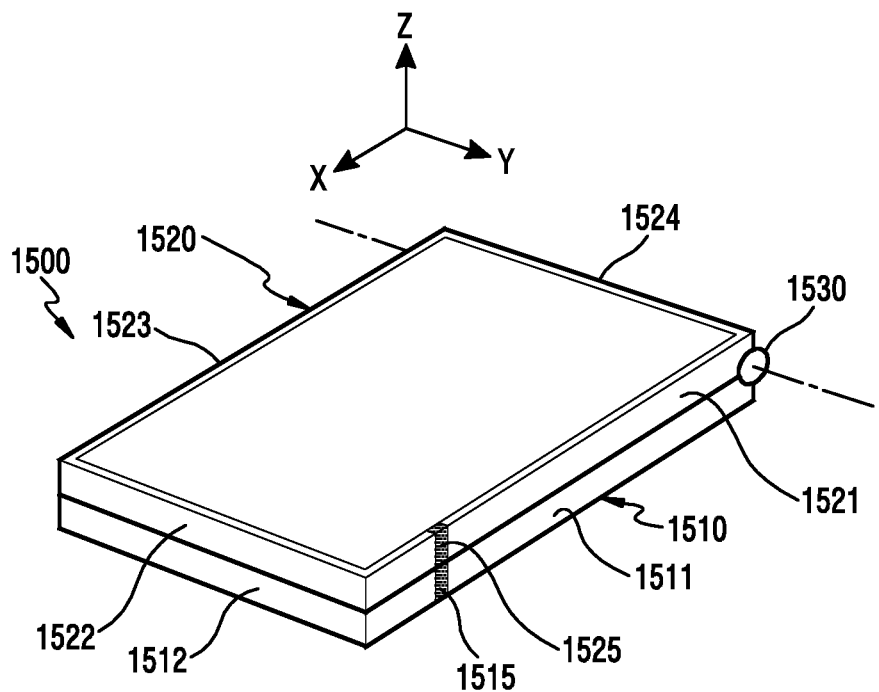
FIGS. 15A and 15B illustrate a folder-type electronic device, according to an embodiment of the present disclosure.
Figure 15B:
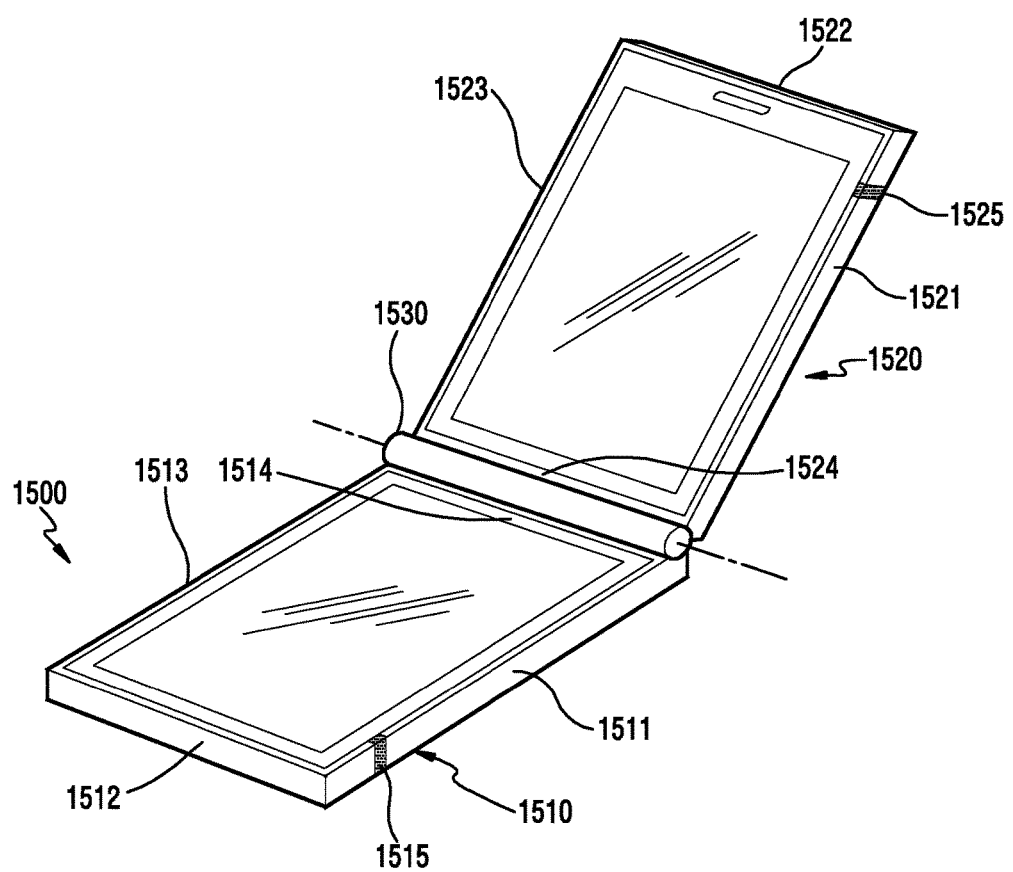

FIGS. 15A and 15B illustrate a folder-type electronic device, according to an embodiment of the present disclosure.

Referring to FIGS. 15A and 15B, a folder-type electronic device 1500 is shown. In FIGS. 15A and 15B, perspective views of the electronic device 1500 in a folded and unfolded state, respectively, are provided. The electronic device 1500, according to various embodiments, may be the same as the electronic device 101 of FIG. 1.

In FIGS. 15A and 15B, at least a portion of a housing of the electronic device 1500 forms at least a portion of an antenna. For example, at least one gap may be formed in a first housing portion 1510 and/or a second housing portion 1520 of the electronic device 1500.

The electronic device 1500 may include one non-conductive member, which is disposed in each of the first housing portion 1510 and the second housing portion 1520. Non-conductive members may be arranged in the first housing portion 1510 and the second housing portion 1520, respectively, and the number of non-conductive members arranged in the first housing portion 1510 may be the same as the number of non-conductive members arranged in the second housing portion 1520. Non-conductive members may be symmetrically arranged in the first housing portion 1510 and the second housing portion 1520, respectively, and the number of non-conductive members arranged in the first housing portion 1510 may be the same as the number of non-conductive members arranged in the second housing portion 1520.

For example, one first non-conductive member 1515 may be disposed in the first housing portion 1510 and one second non-conductive member 1525 may be disposed in the second housing portion 1520. The first non-conductive member 1515 disposed in the first housing portion 1510 and second non-conductive member 1525 disposed in the second housing portion 1520 may be arranged to be aligned to each other.

The non-conductive members disposed in the electronic device 1500 may be arranged not only in the regions of the first and second metal frames 1511 and 1521 of the first and second housing portions 1510 and 1520, but also in the second metal frames 1512 and 1522, the third metal frames 1513 and 1523, or the fourth metal frames 1514 and 1524 of the first and second housing portions 1510 and 1520 as the same arrangement structures.

The configuration of both the first and second housing portions 1510 and 1520 of the electronic device 1500 is the same as that of the first housing portion 1410 illustrated in FIGS. 14A and 14B, and thus, detailed descriptions thereof will be omitted. The first metal frame 1511 of the first housing portion may include the first non-conductive member 1515. Each of the metal frames 1511 and 1512, which are split by the first non-conductive member 1515, may be used as an antenna radiator. The first non-conductive member 1515 of the first housing portion may be disposed at a side of the first metal frame 1511. The first metal frame 1521 of the second housing portion may include the second non-conductive member 1525. Each of the metal frames 1521 and 1522, which are split by the second non-conductive member 1525, may be used as an antenna radiator. The second non-conductive member 1525 may be disposed at a side of the first metal frame 1521.

In the state illustrated in FIG. 15A, the first and second non-conductive members 1515 and 1525 may be arranged symmetrically in the vertical direction and asymmetrically in the horizontal direction. In the state where the first and second housing portions 1510 and 1520 are folded, each of the first and second non-conductive members 1515 and 1525 may be disposed to be superimposed one on another, which may improve an antenna radiation efficiency.

When the first face of the first housing portion 1510 and the first face of the second housing portion 1520 of the electronic device 1500 face each other, the first non-conductive member 1515 and the second non-conductive member 1525 are substantially aligned so that antenna radiation may be executed through the open region of the antenna formed in the first housing portion 1510 and an open region of the second housing portion 1520 substantially aligned thereto. Thus, when the antenna radiation is executed to the open region of the second housing 1520, the deterioration of the antenna radiation performance can be prevented.

Figure 16A:
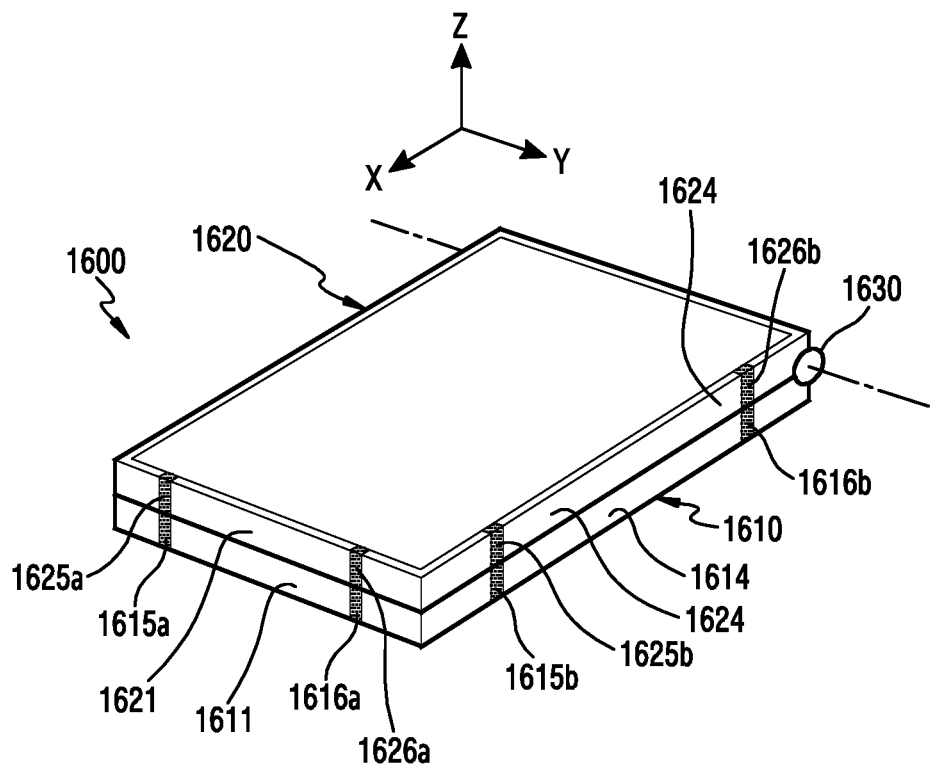
FIGS. 16A and 16B illustrate a folder-type electronic device, according to an embodiment of the present disclosure.
Figure 16B:
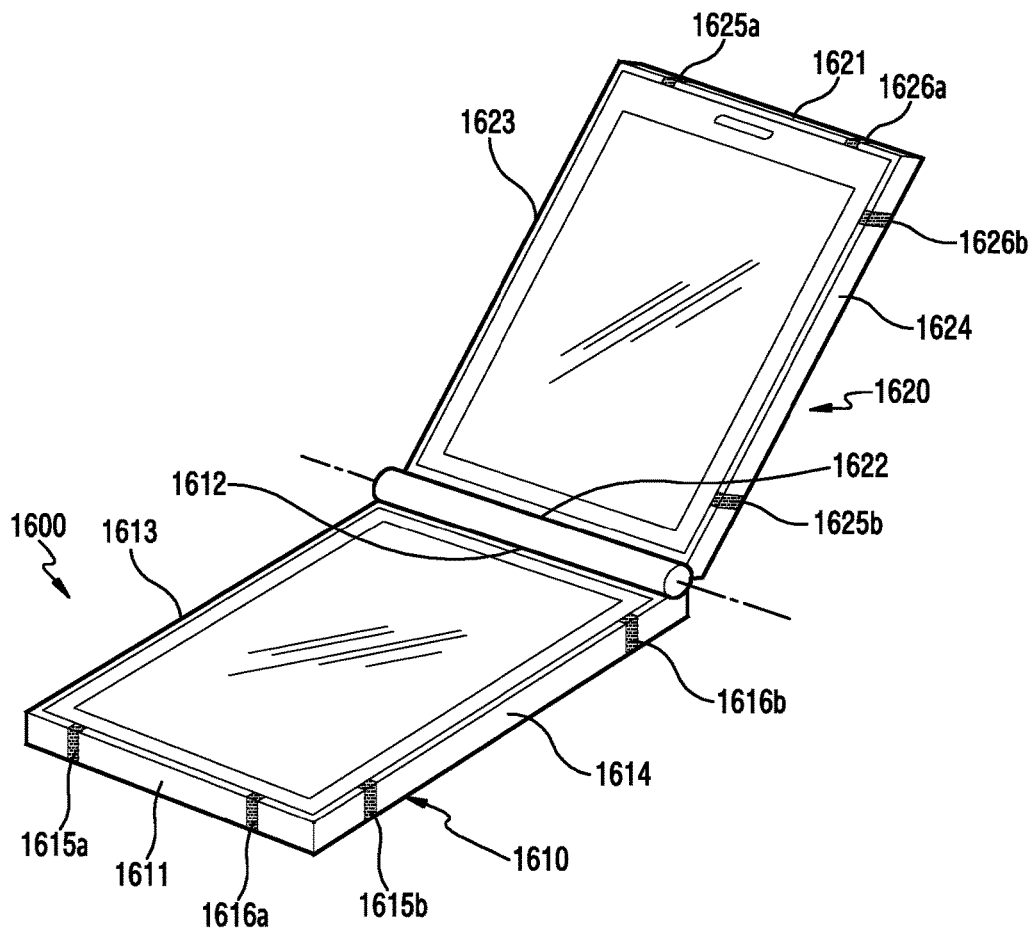

FIGS. 16A and 16B illustrate a folder-type electronic device, according to an embodiment of the present disclosure.

Referring to FIGS. 16A and 16B, a folder-type electronic device 1600 is shown. In FIGS. 16A and 16B, perspective views of the electronic device 1600 in a folded and unfolded state, respectively, are provided. The electronic device 1600, according to various embodiments, may be the same as the electronic device 101 of FIG. 1.

In FIGS. 16A and 16B, at least a portion of a housing of the electronic device 1600 forms at least a portion of an antenna. For example, at least one gap may be formed in each of a first housing portion 1610 and/or a second housing portion 1620 of the electronic device 1600.

In the electronic device 1600, four first non-conductive members 1615*a*, 1616*a*, 1615*b*, and 1616*b* may be disposed in the first housing portion 1610, and four second non-conductive members 1625*a*, 1626*a*, 1625*b*, and 1626*b* may be disposed in the second housing portion 1620. According to various embodiments, the first non-conductive members 1615*a*, 1616*a*, 1615*b*, and 1616*b* of the first housing portion 1610 may be arranged to be symmetric to, and in the same number as the second non-conductive members 1625*a*, 1626*a*, 1625*b*, and 1626*b*.

For example, the first non-conductive members 1615*a*, 1616*a*, 1615*b*, and 1616*b* of the first housing portion 1610 may be disposed in the first and fourth metal frames 1611 and 1614, and the second non-conductive members 1625*a*, 1626*a*, 1625*b*, and 1626*b* of the second housing portion 1620 may be disposed in the first and fourth metal frames 1621 and 1624. In addition, the first and second non-conductive members disposed in the first and second housing portions 1610 and 1620 may be arranged to be aligned to each other.

For example, in the state where the electronic device 1600 is folded, the first non-conductive members 1615*a*, 1616*a*, 1615*b*, and 1616*b* disposed in the first housing portion 1610 may be arranged in the first and fourth metal frames 1611 and 1614 symmetrically in the vertical direction and in the horizontal direction, and the second non-conductive members 1625*a*, 1626*a*, 1625*b*, and 1626*b* disposed in the second housing portion 1620 may be arranged in the first and fourth metal frames 1621 and 1624 symmetrically in the vertical direction and in the horizontal direction.

The non-conductive members disposed in the electronic device 1600 may arranged not only in the regions of the first and fourth metal frames 1611, 1621, 1614, and 1624 of the first and second housing portions 1610 and 1620, but also in the second and fourth metal frames 1612, 1613, 1622, and 1623 of the first and second housing portions as the same arrangement structures.

In the electronic device 1600, the configurations of the first non-conductive members 1615*a* and 1616*a* and the second non-conductive members 1625*a* and 1626*a*, which are respectively disposed in the first metal frames 1611 and 1621 of the first and second housing portions 1610 and 1620, are the same as those of the first non-conductive members 515 and 516 and second non-conductive members 525 and 526, which are respectively disposed in the first metal frames 511 and 521 of the first and second housing portions 510 and 520 that have been described with reference to FIGS. 5A and 5B, and thus detailed descriptions thereof will be omitted. In the electronic device 1600, the configurations of the first non-conductive members 1615b and 1616b and second non-conductive members 1625b, and 1626b, which are respectively disposed in the fourth metal frames 1614 and 1624 of the first and second housing portions 1610 and 1620, are the same as those of the first non-conductive members 1215 and 1216 and second non-conductive members 1225 and 1226, which are respectively disposed in the fourth metal frames 1214 and 1224 of the first and second housings 1210 and 1220 that have been described with reference to FIGS. 12A and 12B, and thus detailed descriptions thereof will be omitted.

In the electronic device 1600, the first non-conductive members 1615a and 1616a of the first housing portion and the second non-conductive members 1625a and 1626a of the second housing portion may be arranged to be substantially symmetrically aligned to each other when viewed with reference to the YZ plane. For example, in the electronic device 1600, the first non-conductive members 1615a and 1616a of the first housing portion and the second non-conductive members 1625a and 1626a of the second housing portion may be arranged to be substantially aligned to each other in the vertical direction and in the horizontal direction with reference to the Z axis.

In the electronic device 1600, the first non-conductive members 1615b and 1616b of the first housing portion and the second non-conductive members 1625b and 1626b of the second housing portion may be arranged to be substantially symmetrically aligned to each other when viewed with reference to the XZ plane. For example, the first non-conductive members 1615b and 1616b of the first housing portion and the second non-conductive members 1625b and 1626b of the second housing portion may be arranged to be substantially aligned to each other in the vertical direction and in the horizontal direction with reference to the Z axis.

According to various embodiments, when the first face of the first housing portion 1610 and the first face of the second housing portion 1620 of the electronic device 1600 face each other, the first non-conductive members 1615a, 1616a and the second non-conductive members 1625a and 1626a and the first non-conductive members 1615b and 1616b and the second non-conductive members 1625b and 1626b are substantially aligned so that antenna radiation may be executed through the open region of the antenna formed in the first housing portion 1610 and an open region of the second housing portion 1620 substantially aligned thereto. Thus, when the antenna radiation is executed to the open region of the second housing 1620, the deterioration of the antenna radiation performance can be prevented.

With this arrangement, the electronic device 1600 may maintain the radiation effect of the antenna even in the state where the first housing portion 1610 and the second housing portion 1620 are disposed close to each other (i.e., when the electronic device 1600 is in a folded state).

Figure 17:
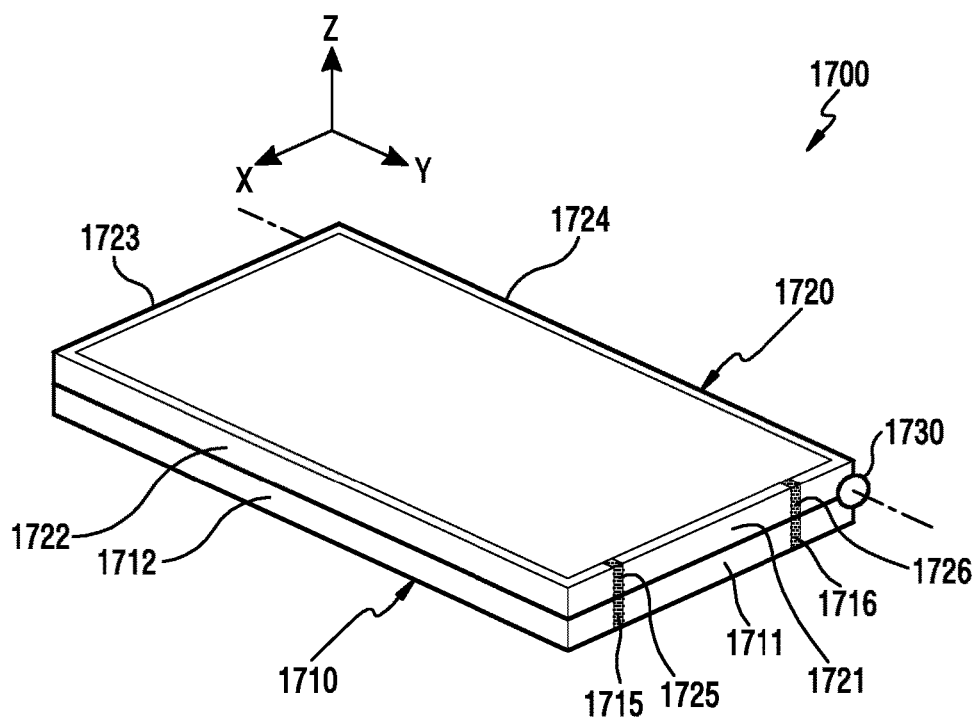
FIG. 17 illustrates a folder-type electronic device, according to an embodiment of the present disclosure.

FIG. 17 illustrates a folder-type electronic device, according to an embodiment of the present disclosure.

Referring to FIG. 17, a perspective view of a folder-type electronic device 1700 in the folded state is shown. The electronic device 1700, according to various embodiments, may be the same as the electronic device 101 of FIG. 1.

In FIG. 17, at least a portion of a housing of the electronic device 1700 forms at least a portion of an antenna. For example, at least one gap may be formed in a first housing portion 1710 and/or a second housing portion 1720 of the electronic device 1700. The electronic device 1700 is provided with a connection part 1730 so as to fold or unfold the first and second housing portions 1710 and 1720, in which the connection part 1730 may be disposed along the vertical side (Y axis) of the first and second housing portions 1710 and 1720.

The electronic device 1700 may include one or more non-conductive member, which may be disposed in each of the first housing portion 1710 and the second housing portion 1720. Non-conductive members may be arranged in the first housing portion 1710 and the second housing portion 1720, respectively, and the number of non-conductive members arranged in the first housing portion 1710 may be the same as the number of non-conductive members arranged in the second housing portion 1720. Non-conductive members may be symmetrically arranged in the first housing portion 1710 and the second housing portion 1720, respectively, and the number of non-conductive members arranged in the first housing portion 1710 may be the same as the number of non-conductive members arranged in the second housing portion 1720.

For example, in the state where the electronic device 1700 is folded, two first non-conductive members 1715 and 1716 may be disposed in the first housing portion 1710 and two second non-conductive members 1725 and 1726 may be disposed in the second housing portion 1720. The first non-conductive members 1715 and 1716 disposed in the first housing portion 1710 and the second non-conductive members 1725 and 1726 disposed in the second housing portion 1720 may be arranged to be aligned to each other. For example, in the state where the electronic device 1700 is folded, first non-conductive members 1715 and 1716 and second non-conductive members 1725 and 1726 may be arranged on the metal frames to be symmetric in the vertical direction and in the horizontal direction.

The non-conductive members disposed in the electronic device 1700 may be arranged not only in the regions of the first and second metal frames 1711 and 1721 of the first and second housing portions 1710 and 1720, but also in the second metal frames 1712 and 1722 of the first and second housing portions, the third metal frame 1723 of the first and second housing portions 1710 and 1720, or the fourth metal frame 1724 of the first and second housing portions 1710 and 1720 as the same arrangement structures.

In the electronic device 1700, the configurations of the first non-conductive members 1715 and 1716 and the second non-conductive members 1725 and 1726, which are respectively disposed in the first metal frames 1711 and 1721 of the first and second housing portions 1710 and 1720, are the same as those of the non-conductive members 515, 516, 525, and 526, which are respectively disposed in the first metal frames 511 and 521 of the first and second housings 510 and 520 that which have been described with reference to FIGS. 5A and 5B, and thus, detailed descriptions thereof will be omitted.

In the electronic device 1700, the first non-conductive members 1715 and 1716 and the second non-conductive members 1725 and 1726 may be arranged to be substantially symmetrically aligned to each other when viewed with reference to the XZ plane. For example, the first non-conductive members 1715 and 1716 and the second non-conductive members 1725 and 1726 may be substantially aligned in the vertical direction and in the horizontal direction with reference to the Z axis.

With this arrangement, the electronic device 1700 may improve the radiation efficiency of the antenna even in the state where the first housing portion 1710 and the second housing portion 1720 are disposed close to each other (i.e., when the electronic device 1700 is in a folded state). When the first face of the first housing portion 1710 and the first face of the second housing portion 1720 of the electronic device 1700 face each other, the first non-conductive members 1715 and 1716 and the second non-conductive members 1725 and 1726 are substantially aligned so that antenna radiation may be executed through the open region of the antenna formed in the first housing portion 1710 and an open region of the second housing portion 1720 substantially aligned thereto. Thus, when the antenna radiation is executed to the open region of the second housing 1720, the deterioration of the antenna radiation performance can be prevented.

Figure 18:
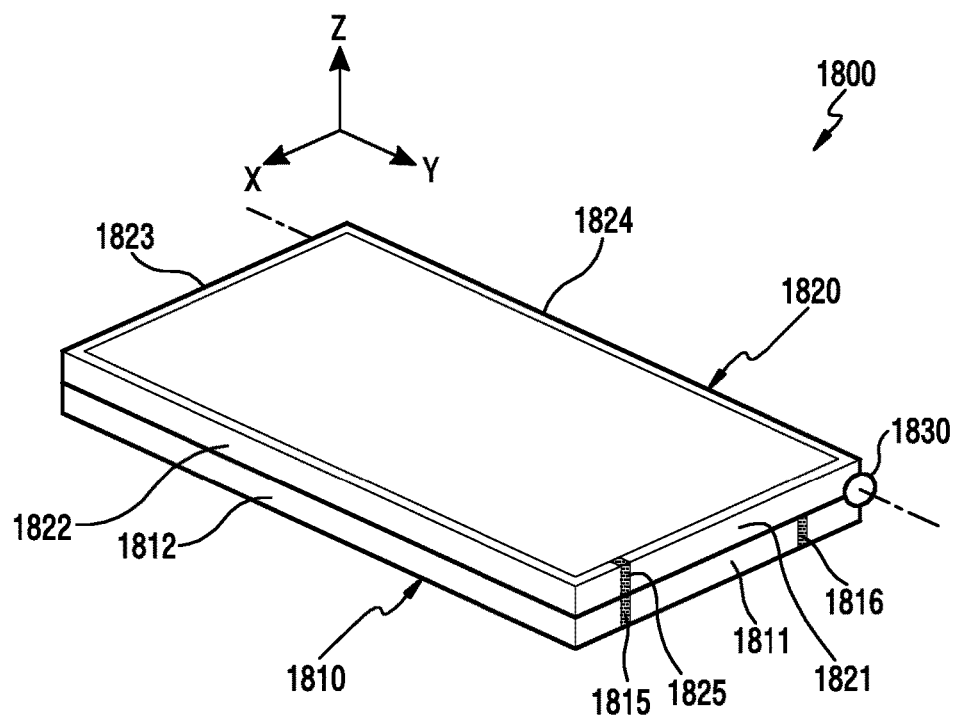
FIG. 18 illustrates a folder-type electronic device, according to an embodiment of the present disclosure.

FIG. 18 illustrates a folder-type electronic device, according to an embodiment of the present disclosure.

Referring to FIG. 18, a perspective view of a folder-type electronic device 1800 in the folded state is shown. The electronic device 1800, according to various embodiments, may be the same as the electronic device 101 of FIG. 1.

In FIG. 18, at least a portion of a housing of the electronic device 1800 forms at least a portion of an antenna. For example, at least one gap may be formed in a first housing portion 1810 and/or a second housing portion 1820 of the electronic device 1800.

The electronic device 1800 may include one or more non-conductive members, which are disposed on the first housing portion 1810 and the second housing portion 1820, respectively. Non-conductive members may be arranged in the first housing portion 1810 and the second housing portion 1820, respectively, and the number of non-conductive members arranged in the first housing portion 1810 may be different from the number of non-conductive members arranged in the second housing portion 1820. Non-conductive members may be asymmetrically arranged in the first housing portion 1810 and the second housing portion 1820, respectively, and the number of non-conductive members arranged in the first housing portion 1810 may be different from the number of non-conductive members arranged in the second housing portion 1820.

For example, at least two first non-conductive members 1815 and 1816 may be disposed in the first housing portion 1810 and one second non-conductive member 1825 may be disposed in the second housing portion 1820. One first non-conductive member 1815 disposed in the first housing portion 1810 and the second non-conductive member 1825 disposed in the second housing portion 1820 may be arranged to be aligned to each other.

For example, the non-conductive members disposed in the electronic device 1800 may be arranged not only in the regions of the first and second metal frames 1811 and 1821 of the first and second housing portions 1810 and 1820, but also in the second metal frames 1812 and 1822 of the first and second housing portions, the third metal frame 1823 of the first and second housing portions, or the fourth metal frame 1824 of the first and second housing portions as the same arrangement structures.

The electronic device 1800 may further include a connection part 1830. The connection part 1830 may be disposed along the vertical direction (Y axis) of the first and second housing portions 1810 and 1820. In the electronic device 1800, the configurations of the first non-conductive members 1815 and 1816 and the second non-conductive member 1825, which are respectively disposed in the first metal frames 1811 and 1821 of the first and second housing portions 1810 and 1820, are the same as those of the first and second non-conductive members 915, 916, and 925, which are respectively disposed in the first metal frames 911 and 921 of the first and second housings 910 and 920, which have been described with reference to FIGS. 9A and 9B, and thus, detailed descriptions thereof will be omitted.

In the electronic device 1800, the first non-conductive members 1815 and 1816 of the first housing portion and the second non-conductive member 1825 of the second housing portion may be arranged to be substantially asymmetrically aligned to each other when viewed with reference to the XZ plane. For example, the first non-conductive members 1815 and 1816 and the second non-conductive member 1825 may be arranged substantially asymmetrically in the vertical direction and in the horizontal direction.

When the first face of the first housing portion 1810 and the first face of the second housing portion 1820 of the electronic device 1800 face each other, the one first non-conductive member 1815 and the second non-conductive member 1825 are substantially aligned so that antenna radiation may be executed through the open region of the antenna formed in the first housing portion 1810 and an open region of the second housing portion 1820 substantially aligned thereto. Thus, when the antenna radiation is executed to the open region of the second housing 1820, the deterioration of the antenna radiation performance can be prevented.

In the state where the first and second housing portions 1810 and 1820 are folded, each of the non-conductive members 1815 and 1825 may be disposed to be superimposed one on another, which may improve an antenna radiation efficiency.

Figure 19:
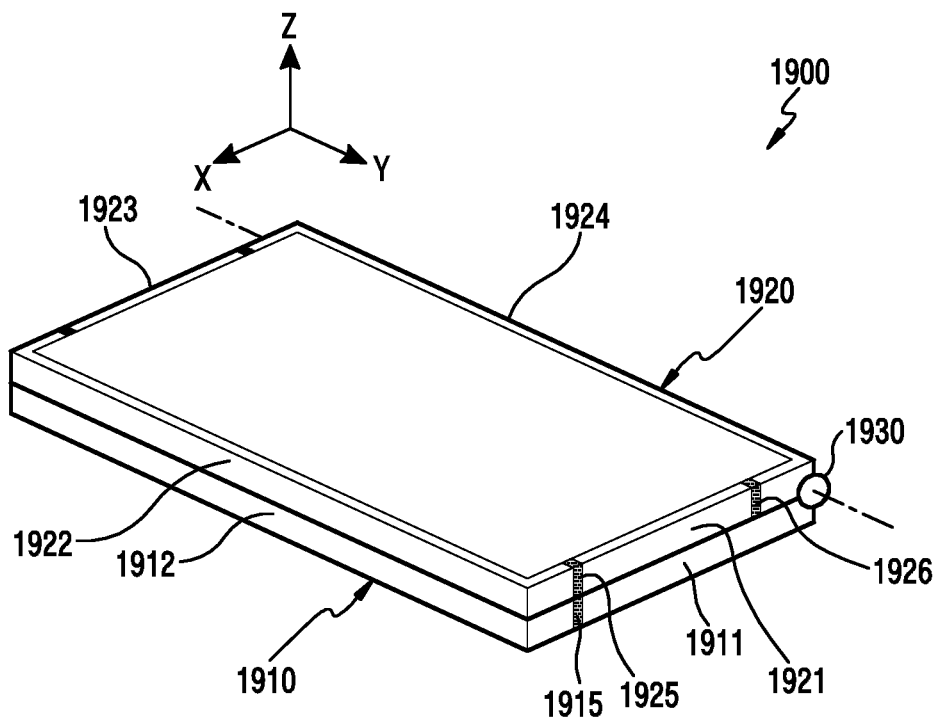
FIG. 19 illustrates a folder-type electronic device, according to an embodiment of the present disclosure.

FIG. 19 illustrates a folder-type electronic device, according to an embodiment of the present disclosure.

Referring to FIG. 19, a perspective view of a folder-type electronic device 1900 in the folded state is shown. The electronic device 1900, according to various embodiments, may be the same as the electronic device 101 of FIG. 1.

In FIG. 19, at least a portion of a housing of the electronic device 1900 forms at least a portion of an antenna. For example, at least one gap may be formed in a first housing portion 1910 and/or a second housing portion 1920 of the electronic device 1900.

The electronic device 1900 may include one or more non-conductive members, which are disposed on the first housing portion 1910 and the second housing portion 1920, respectively. Non-conductive members may be arranged in the first housing portion 1910 and the second housing portion 1920, respectively, and the number of non-conductive members arranged in the first housing portion 1910 may be different from the number of non-conductive members arranged in the second housing portion 1920. Non-conductive members may be asymmetrically arranged in the first housing portion 1910 and the second housing portion 1920, respectively, and the number of non-conductive members arranged in the first housing portion 1910 may be different from the number of non-conductive members arranged in the second housing portion 1920.

For example, one first non-conductive member 1915 may be disposed in the first housing portion 1910 and two or more second non-conductive members 1925 and 1926 may be disposed in the second housing portion 1920. The first non-conductive member 1915 disposed in the first housing portion 1910 and one second non-conductive member 1925 disposed in the second housing portion 1920 may be arranged to be aligned to each other.

The non-conductive members disposed in the electronic device 1900 may be arranged not only in the regions of the first and second metal frames 1911 and 1921 of the first and second housing portions 1910 and 1920, but also in the second metal frames 1912 and 1922 of the first and second housing portions, the third metal frame 1923 of the first and second housing portions, or the fourth metal frame 1924 of the first and second housing portions as the same arrangement structures.

The electronic device 1900 may further include a connection part 1930. In the electronic device 1900, the configurations of the first and second non-conductive members 1915, 1925, and 1926, which are respectively disposed in the first metal frames 1911 and 1921 of the first and second housing portions 1910 and 1920, are the same as those of the non-conductive members 1015, 1025, and 1026, which are respectively disposed in the first metal frames 1011 and 1021 of the first and second housings 1010 and 1020, which have been described with reference to FIGS. 10A and 10B, and thus, detailed descriptions thereof will be omitted.

In the electronic device 1900, the second non-conductive members 1925 and 1926 and the first non-conductive member 1915 may be arranged to be substantially asymmetrically aligned to each other when viewed with reference to the XZ plane. For example, the first non-conductive member 1915 and the second non-conductive members 1925 and 1926 may be arranged substantially asymmetrically in the vertical direction and in the horizontal direction.

When the first face of the first housing portion 1910 and the first face of the second housing portion 1920 of the electronic device 1900 face each other, the first non-conductive member 1915 and the one second non-conductive member 1925 are substantially aligned so that antenna radiation may be executed through the open region of the antenna formed in the first housing portion 1910 and an open region of the second housing portion 1920 substantially aligned thereto. Thus, when the antenna radiation is executed to the open region of the second housing 1920, the deterioration of the antenna radiation performance can be prevented.

In the state where the first and second housing portions 1910 and 1920 are folded, each of the non-conductive members 1915 and 1925 may be disposed to be superimposed one on another, which may improve an antenna radiation efficiency.

Figure 20:
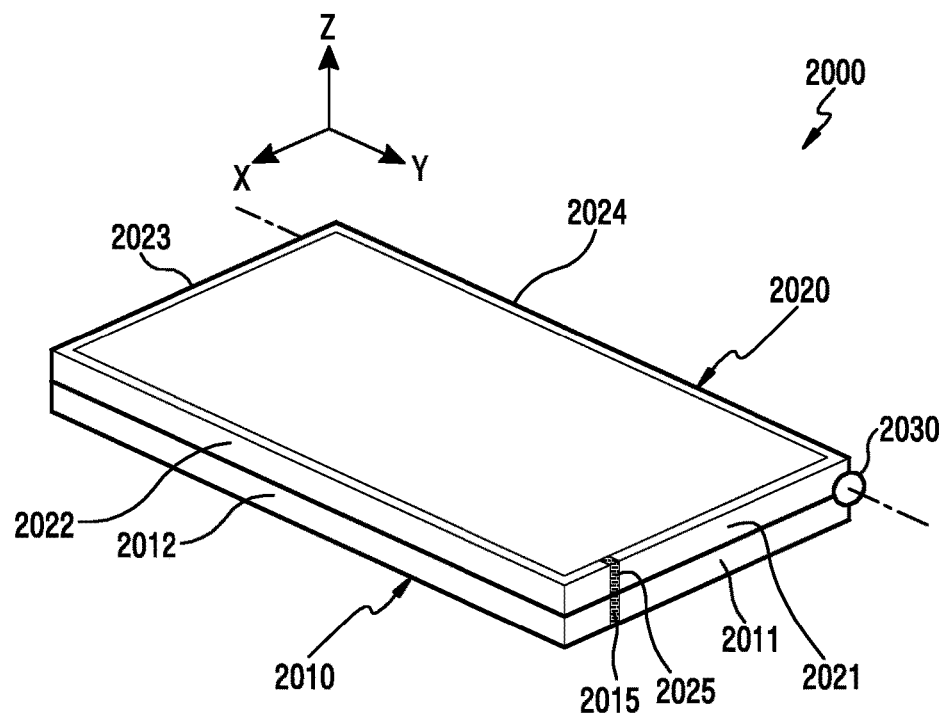
FIG. 20 illustrates a folder-type electronic device, according to an embodiment of the present disclosure.

FIG. 20 illustrates a folder-type electronic device, according to an embodiment of the present disclosure.

Referring to FIG. 20, a perspective view of a folder-type electronic device 2000 in the folded state is shown. The electronic device 2000, according to various embodiments, may be the same as the electronic device 101 of FIG. 1.

In FIG. 20, at least a portion of a housing of the electronic device 2000 forms at least a portion of an antenna. For example, at least one gap may be formed in a first housing portion 2010 and/or a second housing portion 2020 of the electronic device 2000.

The electronic device 2000 may include one or more non-conductive members, which are disposed in each of the first housing portion 2010 and the second housing portion 2020. According to various embodiments, non-conductive members 2015 and 2025 may be arranged in the first housing portion 2010 and the second housing portion 2020, respectively, and the number of non-conductive members arranged in the first housing portion 2010 may be the same as the number of non-conductive members arranged in the second housing portion 2020. Non-conductive members may be symmetrically arranged in the first housing portion 2010 and the second housing portion 2020, and the number of non-conductive members arranged in the first housing portion 2010 may be the same as the number of non-conductive members arranged in the second housing portion 2020.

For example, a first non-conductive member 2015 may be disposed in the first housing portion 2010 and a second non-conductive member 2025 may be disposed in the second housing portion 2020. The first non-conductive member 2015 disposed in the first housing portion 2010 and the second non-conductive member 2025 disposed in the second housing portion 2020 may be arranged to be aligned to each other.

The non-conductive members disposed in the electronic device 2000 may be arranged not only in the regions of the first and second metal frames 2011 and 2021 of the first and second housing portions 2010 and 2020, but also in the second metal frames 2012 and 2022 of the first and second housing portions, the third metal frame 2023 of the first and second housing portions, or the fourth metal frame 2024 of the first and second housing portions as the same arrangement structures.

The electronic device 2000 may further include a connection part 2030. In the electronic device 2000, the configurations of the first and second non-conductive members 2015 and 2016, which are respectively disposed in the first metal frames 2011 and 2021 of the first and second housing portions 2010 and 2020, are the same as those of the first and second non-conductive members 1115 and 1125 which are respectively disposed in the first metal frames 1111 and 1121 of the first and second housings 1110 and 1120, which have been described with reference to FIGS. 11A and 11B, and thus, detailed descriptions thereof will be omitted.

In the electronic device 2000, each of first and second non-conductive members 2015 and 2025 may be arranged to be substantially asymmetrically aligned to each other when viewed with reference to the XZ plane. For example, the each of the first and second non-conductive members 2015 and 2025 may be arranged substantially symmetrically in the vertical direction, and may be arranged substantially asymmetrically in the horizontal direction.

When the first face of the first housing portion 2010 and the first face of the second housing portion 2020 of the electronic device 2000 face each other, the first non-conductive member 2015 and the second non-conductive member 2025 are substantially aligned so that antenna radiation may be executed through the open region of the antenna formed in the first housing portion 2010 and an open region of the second housing portion 2020 substantially aligned thereto. Thus, when the antenna radiation is executed to the open region of the second housing portion 2020, the deterioration of the antenna radiation performance can be prevented.

When the first and second housing portions 2010 and 2020 are folded, each of the first and second non-conductive members 2015 and 2025 may be disposed to be superimposed one on another, which may improve an antenna radiation efficiency.

Figure 21A:
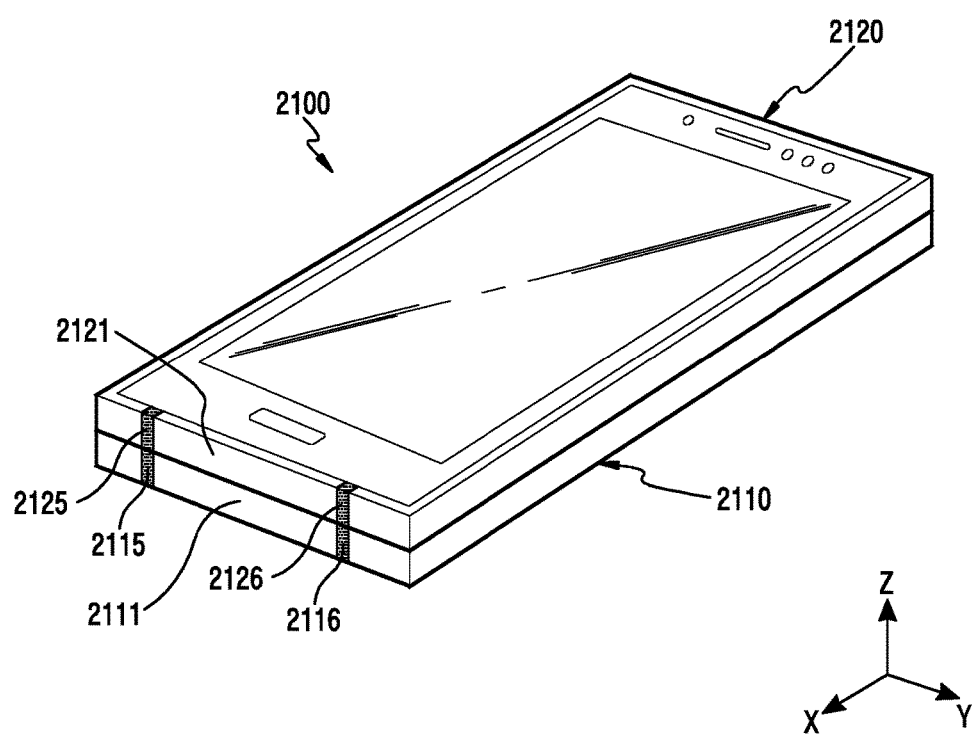
FIGS. 21A to 21C illustrate a sliding-type electronic device, according to an embodiment of the present disclosure.
Figure 21B:
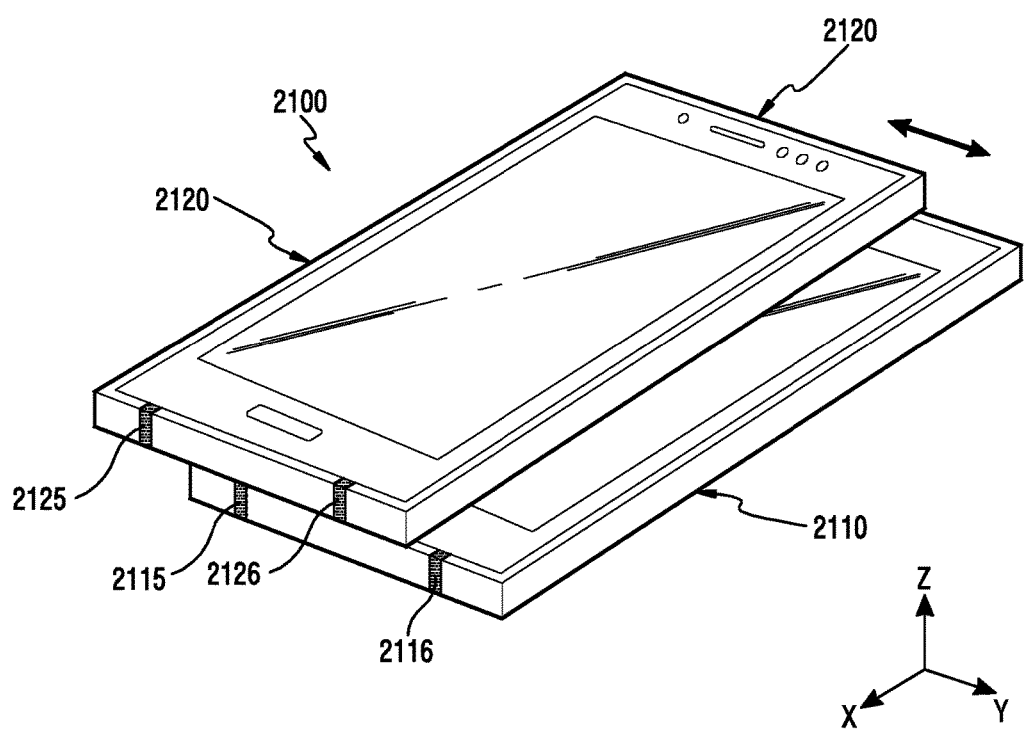
Figure 21C:
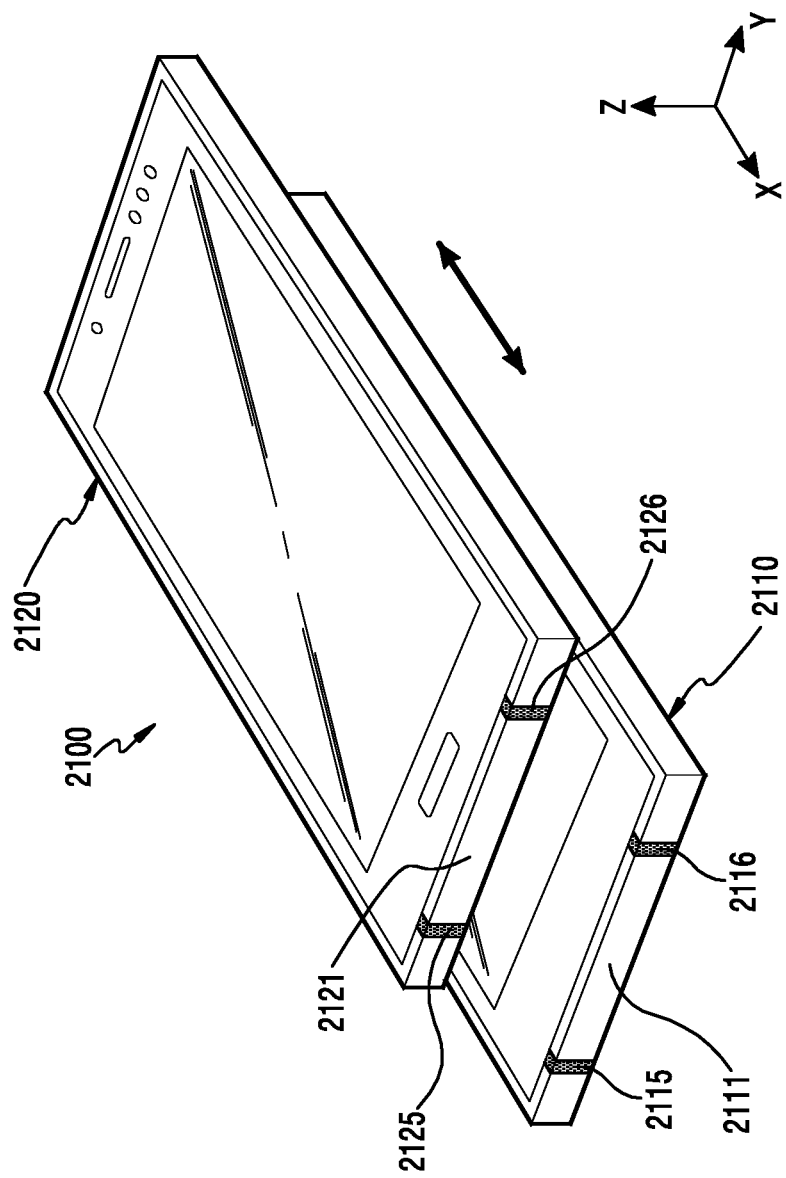

FIGS. 21A to 21C illustrate a sliding-type electronic device, according to an embodiment of the present disclosure.

Referring to FIGS. 21A to 21C, a sliding-type electronic device 2100 is shown. In FIG. 21A, a perspective view of the electronic device 2100 in closed state, is provided. In FIGS. 21B and 21C, perspective views of the electronic device 2100 in states in which a housing portion of the electronic device 2100 is slid open in horizontal and vertical directions, respectively, is provided. The electronic device 2100, according to various embodiments, may be the same as the electronic device 101 of FIG. 1.

In FIGS. 21A to 21C, at least a portion of a housing of the electronic device 2100 forms at least a portion of an antenna. For example, at least one gap may be formed in a first housing portion 2110 and/or a second housing portion 2120 of the electronic device 2100.

In the electronic device 2100, first non-conductive members 2115 and 2116 may be disposed in the first housing portion 2110, and second non-conductive members 2125 and 2126 may be disposed in the second housing portion 2120. The first non-conductive members 2115 and 2116 of the first housing portion 2110 and the second non-conductive members 2125 and 2126 of the second housing portion 2120 may be arranged symmetrically, in which the number of the first non-conductive members may be the same as the number of the second non-conductive members. For example, the first non-conductive members 2115 and 2116 may be disposed in the first metal frame 2111 of the first housing portion 2110 and the second non-conductive members 2125 and 2126 may be disposed in the first metal frame 2121 of the second housing portion 2120, in which the first non-conductive members 2115 and 2116 and the second non-conductive members 2125 and 2126 may be arranged to be aligned to each other.

For example, the first non-conductive members 2115 and 2116 disposed in the first housing portion 2110 may be arranged in the first metal frame 2111 symmetrically in the horizontal direction, and the second non-conductive members 2125 and 2126 disposed in the second housing portion 2120 may be arranged in the first metal frame 2121 symmetrically in the horizontal direction.

The non-conductive members disposed in the electronic device 2100 may be arranged not only in the region of the first metal frames 2111 and 2121 of the first and second housing portions 2110 and 2120, but also in each of the second to fourth metal frames of the first and second housing portions as the same arrangement structures.

The electronic device 2100 may further include a sliding module. In the electronic device 2100, the second housing portion 2020 may be slid on the in the horizontal direction by the sliding module so as to open/close the top surface of the first housing portion 2010. The second housing portion 2020 may be slid on the in the vertical direction by the sliding module so as to open/close the top surface of the first housing portion 2010. In the electronic device 2100, the configurations of the first and second non-conductive members 2115, 2116, 2125, and 2126, which are respectively disposed in the first metal frames 2111 and 2121 of the first and second housing portions 2110 and 2120, are the same as those of the first and second non-conductive members 515, 516, 525, and 526, which are respectively disposed in the first metal frames 511 and 521 of the first and second housing portions 510 and 520 that have been described with reference to FIGS. 5A and 5B, and thus, detailed descriptions thereof will be omitted.

In the electronic device 2100, each of the first and second non-conductive member 2115, 2116, 2125, and 2126 may be arranged to be substantially symmetrically aligned to each other when viewed with reference to the YZ plane. For example, each of the non-conductive members 2115, 2116, 2125, and 2126 may be arranged substantially symmetrically in the vertical direction, and may be arranged substantially symmetrically in the horizontal direction.

When the first face of the first housing portion 2110 and the first face of the second housing portion 2120 of the electronic device 2100 face each other, the first non-conductive members 2115 and 2116 and the second non-conductive members 2125 and 2126 are substantially aligned so that antenna radiation may be executed through the open region of the antenna formed in the first housing portion 2110 and an open region of the second housing portion 2120 substantially aligned thereto. Thus, when the antenna radiation is executed to the open region of the second housing 2120, the deterioration of the antenna radiation performance can be prevented.

When the first and second housing portions 2110 and 2120 are vertically aligned, the non-conductive members 2115, 2116, 2125, and 2126 may be disposed to be superimposed one on another, which may improve an antenna radiation efficiency.

Figure 22A:
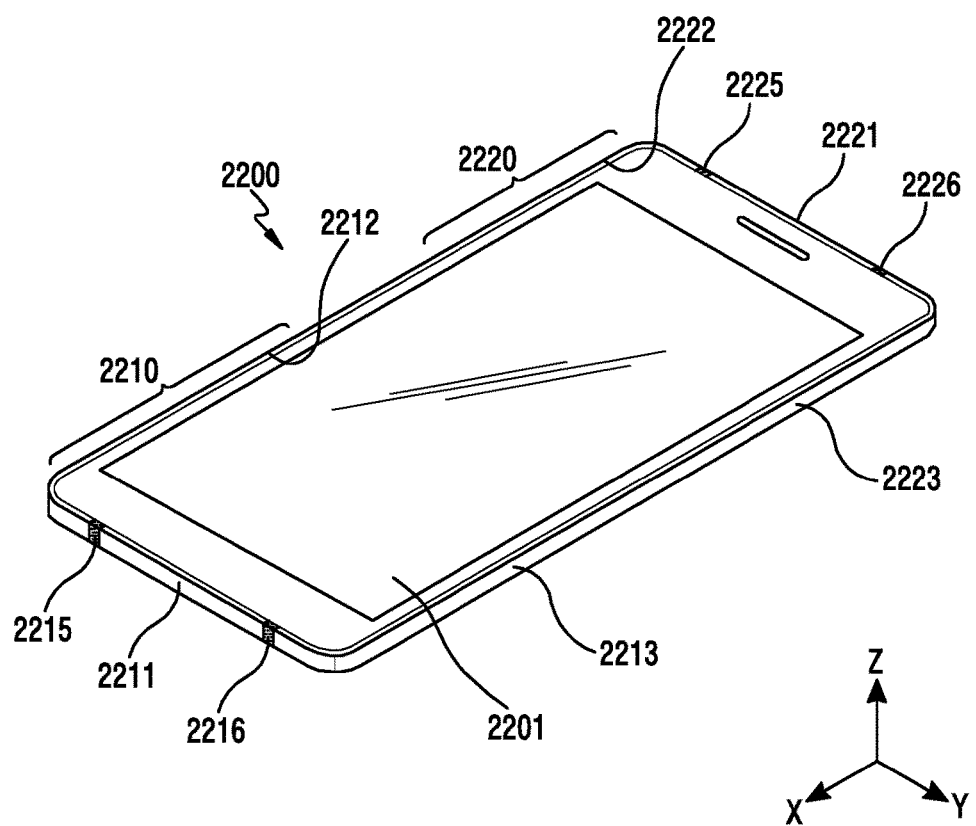
FIGS. 22A to 22C illustrate a flexible electronic device, according to an embodiment of the present disclosure.
Figure 22B:
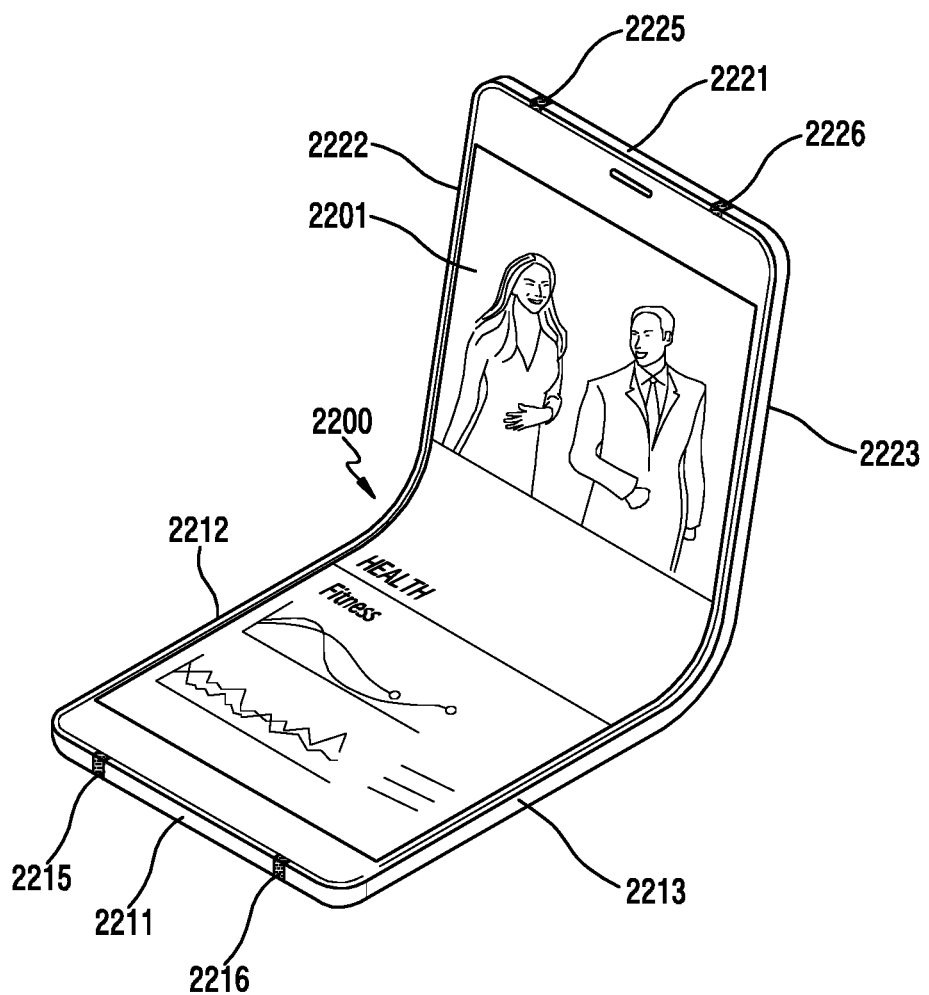
Figure 22C:
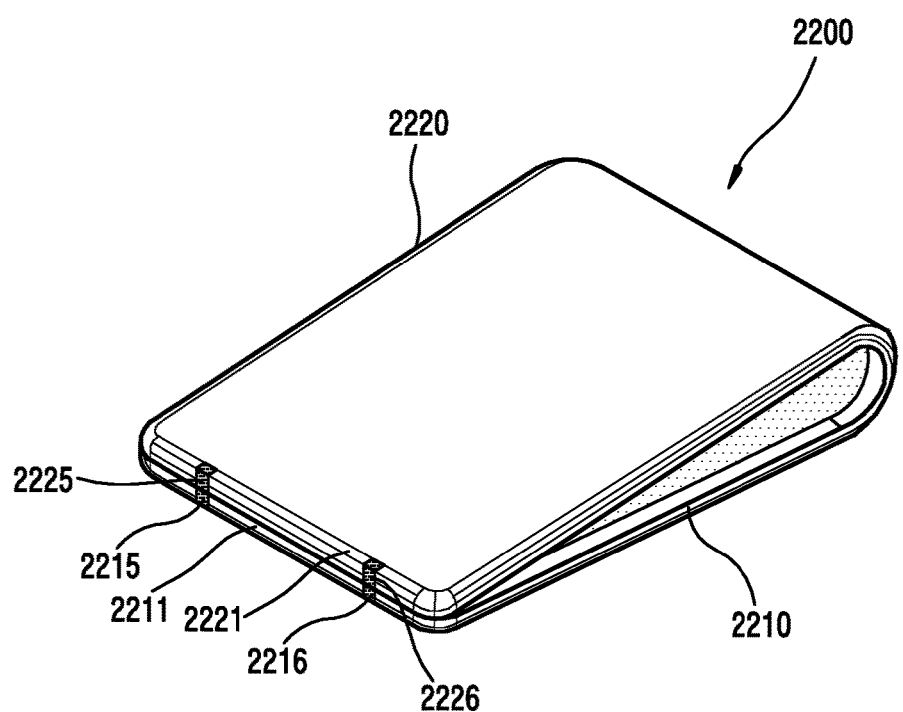

FIGS. 22A to 22C illustrate a flexible electronic device, according to an embodiment of the present disclosure.

Referring to FIGS. 22A to 22C, a flexible electronic device 2200 is shown. In FIG. 22A, a perspective view of the electronic device 2200 in flat state is provided. In FIG. 22B, a perspective view of the electronic device 2200 in a bent state is provided. In FIG. 22C, a perspective view of the electronic device 2200 in a folded state is provided. The electronic device 2200, according to various embodiments, may be the same as the electronic device 101 of FIG. 1.

In FIGS. 22A to 22C, at least a portion of a housing of the electronic device 2200 forms at least a portion of an antenna. For example, at least one gap may be formed in a first housing portion 2210 and/or a second housing portion 2220 of the electronic device 2200.

The electronic device 2200 may include one or more non-conductive members, which are disposed on the first housing portion 2210 and/or the second housing portion 2220, respectively. Non-conductive members may be arranged in the first housing portion 2210 and the second housing portion 2220, respectively, and the number of non-conductive members arranged in the first housing portion 2210 may be the same as, or different from, the number of non-conductive members arranged in the second housing portion 2220. Non-conductive members may be symmetrically or asymmetrically arranged in the first housing portion 2210 and the second housing portion 2220, respectively, and the number of non-conductive members arranged in the first housing portion 2210 may be the same as, or different from the number of non-conductive members arranged in the second housing portion 2220.

For example, one or more first non-conductive members 2215 and 2216 may be disposed in the first housing portion 2210 and one or more second non-conductive members 2225 and 2226 may be disposed in the second housing portion 2220. When the electronic device 2200 is folded, the first non-conductive members 2215 and 2216 and the second non-conductive members 2225 and 2226 disposed in the first and second housing portion 2210 and 2220 may be arranged to be aligned to each other in the vertical direction and in the horizontal direction.

The electronic device 2200 may be bent from the first housing portion 2210. The first and second housing portions 2210 and 2220 are differentiated by the bent portion, and may be understood as one housing. Accordingly, the first and second housing portions 2210 and 2220 are not fixed portions, but may be variously configured depending on the position of the bent portion in one housing.

The electronic device 2200 may further include a flexible display 2201. The first and second housing portions 2210 and 2220 may be arranged to be flat or to be bent. The electronic device 2200 may include metal frames, each of which may be arranged in the peripheral rim. First to third metal frames 2211 to 2213 may be arranged in the edge of the first housing portion 2210, and first to third metal frames 2221 to 2223 may be arranged in the edge of the second housing portion 2220.

The first housing portion 2210 may include the first non-conductive members 2215 and 2216, which may be disposed in the first metal frame 2211. The second housing portion 2220 may include the second non-conductive members 2225 and 2226, which may be disposed in the first metal frame 2221. In a state where the electronic device 2200 is bent, the first non-conductive members 2215 and 2216 and the second non-conductive members 2225 and 2226 are symmetrically aligned in the vertical direction and in the horizontal direction.

In the state where the first and second housing portions 2210 and 2220 are folded, the first and second non-conductive members 2215, 2216, 2225, and 2226 may be disposed to be superimposed one on another, which may improve an antenna radiation efficiency.

The bent portion of the electronic device 2200 may be formed in a predetermined portion, and may be located at about a 5:5 position, about a 6:4 position, or about an 7:3 position. For example, the bent portion of the electronic device may be made of a flexible material (e.g., a flexible metal material) or may be provided with a separate folding unit.

The electronic device 2200 may include one or more non-conductive members which may be arranged at various positions of the metal frames. A non-conductive member may be disposed in each of the second metal frames 2212 and 2222 of the first and second housing portions 2210 and 2220 or each of the third metal frames 2213 and 2223 of the first and second housing portions 2210 and 2220.

The electronic device 2200 may include one non-conductive member, which is disposed in the first metal frame of each of the housing portions 2210 and 2220.

When the first housing portion 2210 and the second housing portion 2220 of the electronic device 2200 substantially face each other, the first non-conductive member 2215 and 2216 and the second non-conductive member 2225 and 2226 are substantially aligned so that antenna radiation may be executed through the open region of the antenna formed in the first housing portion 2210 and an open region of the second housing portion 2220 substantially aligned thereto. Thus, when the antenna radiation is executed to the open region of the second housing 2220, the deterioration of the antenna radiation performance can be prevented.

Figure 23A:
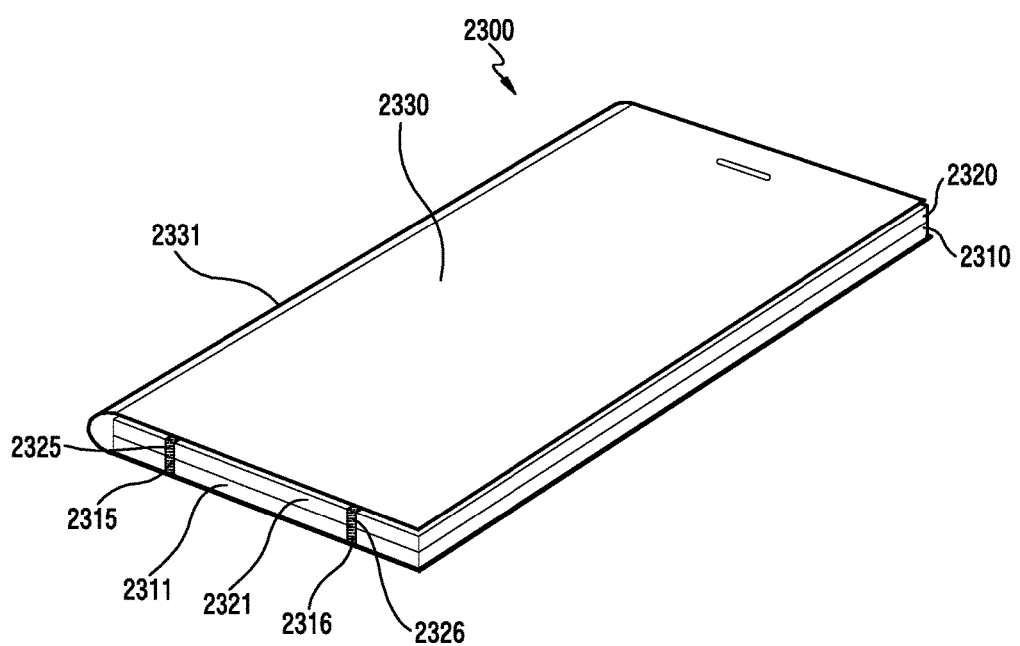
FIGS. 23A and 23B illustrate an exterior cover-type electronic device, according to an embodiment of the present disclosure.
Figure 23B:
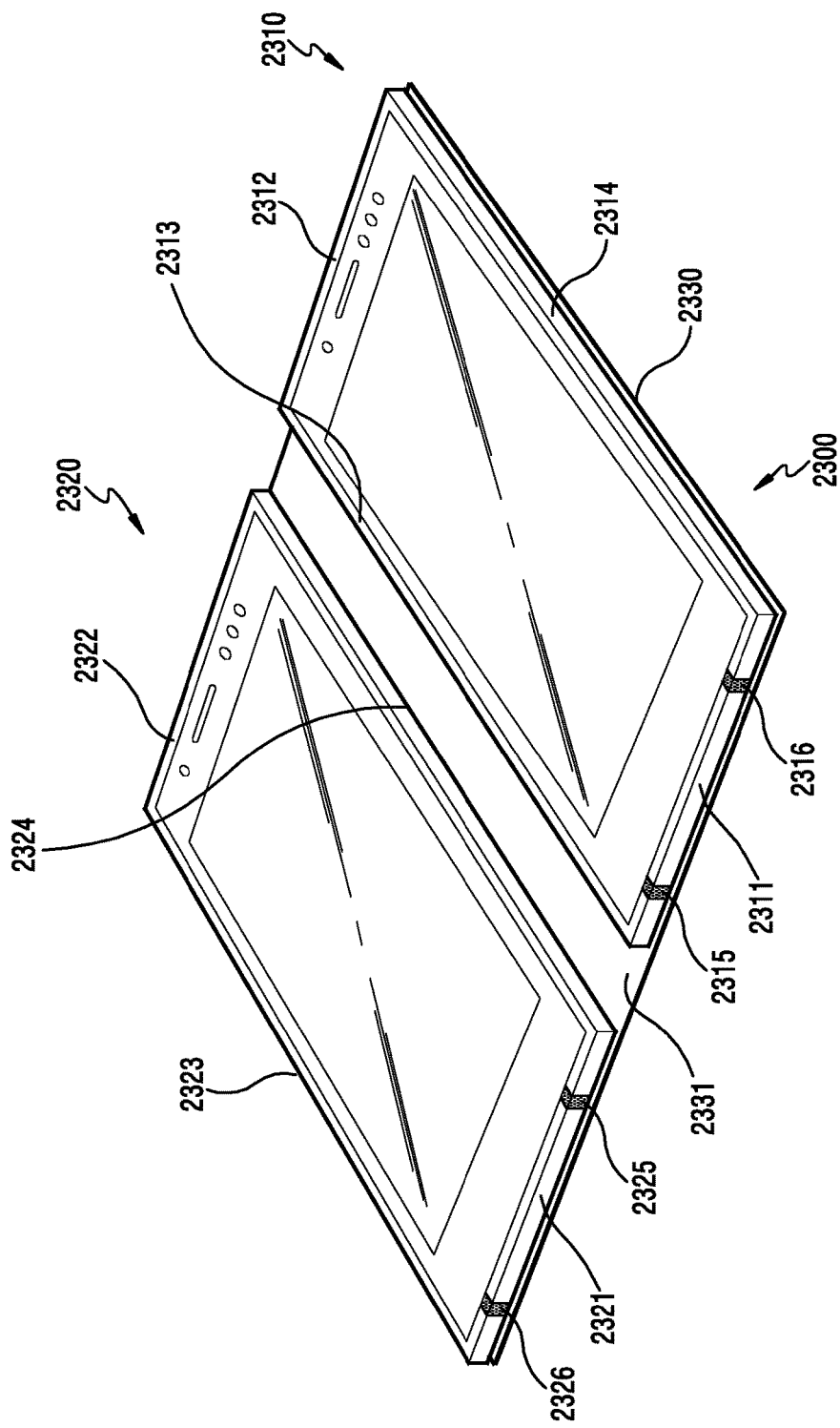

FIGS. 23A and 23B illustrate an exterior-cover type electronic device, according to an embodiment of the present disclosure.

Referring to FIGS. 23A and 23B, an exterior-cover type electronic device 2300 is shown. In FIG. 23A, a perspective view of the electronic device 2300 in folded state is provided. In FIG. 23B, a perspective view of the electronic device 2300 in an unfolded state is provided. The electronic device 2300, according to various embodiments, may be the same as the electronic device 101 of FIG. 1.

In FIGS. 23A and 23B, at least a portion of a housing of the electronic device 2300 forms at least a portion of an antenna. For example, at least one gap may be formed in a first housing portion 2310 and/or a second housing portion 2320 of the electronic device 2300.

In the electronic device 2300, first non-conductive members 2315 and 2316 may be disposed in the first housing portion 2310, and second non-conductive members 2325 and 2326 may be disposed in the second housing portion 2320. The first non-conductive members 2315 and 2316 of the first housing portion 2310 and the second non-conductive members 2225 and 2226 of the second housing portion 2320 may be arranged symmetrically.

For example, the first non-conductive members 2315 and 2316 may be disposed in the first metal frame 2311 of the first housing portion 2310 and the second non-conductive members 2325 and 2326 may be disposed in the first metal frame 2321 of the second housing portion 2320, in which the first non-conductive members 2315 and 2316 and the second non-conductive members 2325 and 2326 may be arranged to be vertically aligned to each other.

For example, in the state where the electronic device 2300 is folded, the first non-conductive members 2315 and 2316 disposed in the first housing portion 2310 may be arranged in the first metal frame 2311 symmetrically in the horizontal direction, and the second non-conductive members 2325 and 2326 disposed in the second housing portion 2320 may be arranged in the first metal frame 2321 symmetrically in the horizontal direction.

For example, the non-conductive members disposed in the electronic device 2300 may arranged not only in the region of the first metal frames 2311 and 2321 of the first and second housing portions 2310 and 2320, but also in each of the second to fourth metal frames of the first and second housing portions as the same arrangement structures.

The electronic device 2300 may further include an exterior cover 2330. For example, the exterior cover 2330 may physically or electrically connect the first and second housing portions 2310 and 2320 to each other. For example, the exterior cover 2330 includes a connection part 2331, which may physically or electrically connect the first and second housing portions 2310 and 2320 to each other. According to various embodiments, the first housing portion 2310 may be a first electronic device, and the second housing portion 2320 may be a second electronic device.

The exterior cover 2330 may be made of a flexible material (e.g., leather) to be folded around the connection part 2331. For example, the exterior cover 2330 may be integrated with the first and second housing portions 2310 and 2320, or may be configured to be attachable to/detachable from the first and second housing portions 2310 and 2320.

The electronic device 2300 includes the first housing portion 2310 arranged on one inner side with reference to the connection part 2331 and the second housing portion 2320 arranged on the other inner side, in which the first and second housing portions are capable of being folded or unfolded.

In the electronic device 2300, first to fourth metal frames 2311 to 2314 may be arranged in the edge of the first housing portion 2310, and first to fourth metal frames 2321 to 2324 may be arranged in the edge of the second housing portion 2320.

The first housing portion 2310 may include the first non-conductive members 2315 and 2316, which may be disposed in the first metal frame 2311. The second housing portion 2320 may include the second non-conductive members 2325 and 2326, which may be disposed in the first metal frame 2321. In a state where the electronic device 2300 is folded, the first non-conductive members 2315 and 2316 and the second non-conductive members 2325 and 2326 are symmetrically aligned in the vertical direction and in the horizontal direction.

When the first and second housing portions 2310 and 2320 are folded, the first and second non-conductive members 2315, 2316, 2325, and 2326 may be disposed to be superimposed on one on another, which may improve an antenna radiation efficiency.

An FPCB may pass through the connection part 2331 of the exterior cover 2330.

The arrangement positions of the conductive members (i.e., the metal frames) and non-conductive members 2315, 2316, 2325, and 2326, which are arranged in the first and second housing portions 2310 and 2320 of the electronic device 2300, may be the same as those of the conductive members and the non-conductive members, which are arranged in the first and second housing portions of the electronic devices, which are illustrated in FIGS. 4A to 5B and FIGS. 9A to 20.

According to various embodiments, when the first face of the first housing portion 2310 and the first face of the second housing portion 2320 of the electronic device 2300 face each other, the first non-conductive member 2315 and 2316 and the second non-conductive member 2325 and 2326 are substantially aligned so that antenna radiation may be executed through the open region of the antenna formed in the first housing portion 2310 and an open region of the second housing portion 2320 substantially aligned thereto. Thus, when the antenna radiation is executed to the open region of the second housing 2320, the deterioration of the antenna radiation performance can be prevented.

Figure 24:
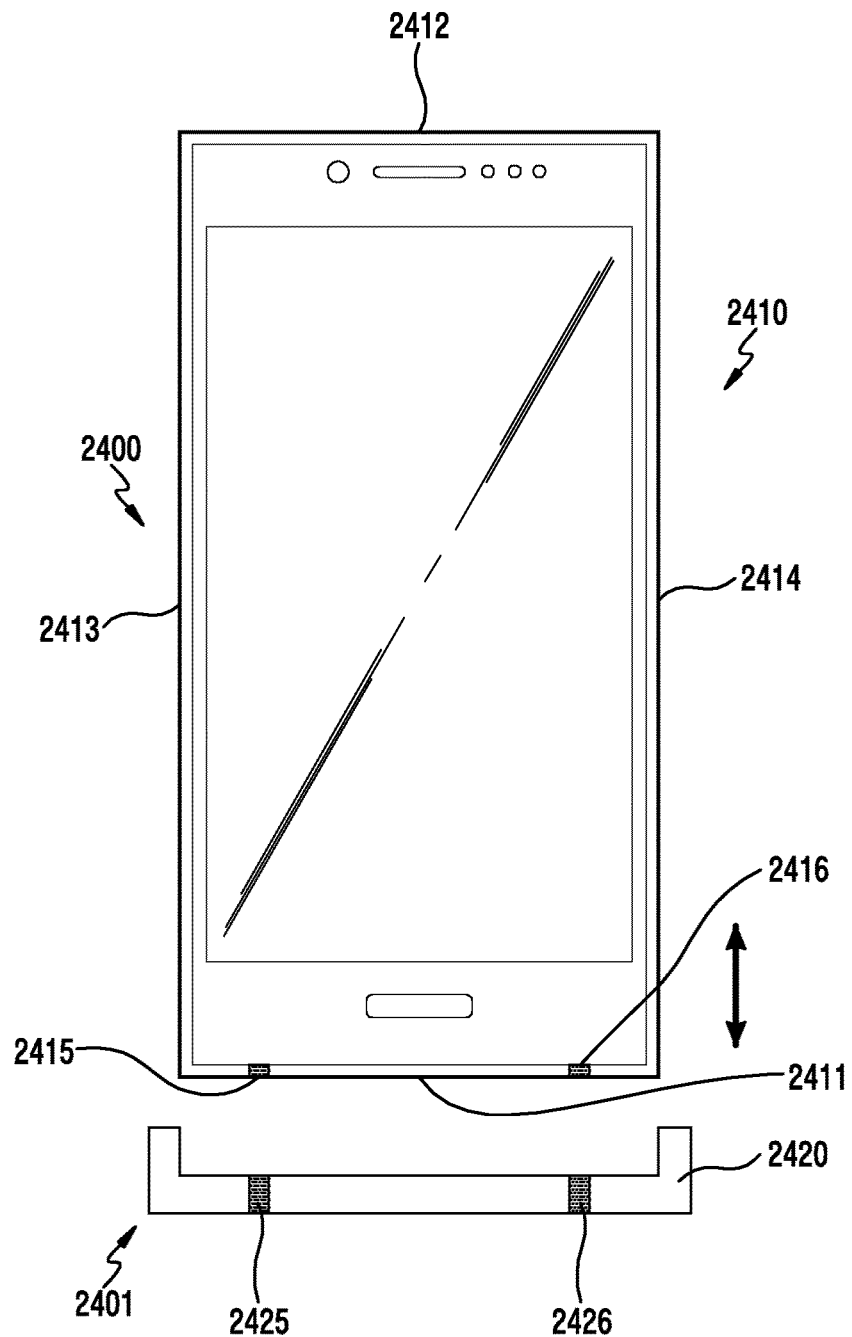
FIG. 24 illustrates a state in which an electronic device is docked, according to an embodiment of the present disclosure.

FIG. 24 illustrates a state in which an electronic device is docked, according to an embodiment of the present disclosure.

Referring to FIG. 24, a first electronic device 2400 and a second electronic device 2401 are provided. The electronic devices 2400 and/or 2401, according to various embodiments, may be the same as the electronic device 101 of FIG. 1.

In FIG. 24, the first and second electronic devices 2400 and 2401 are coupled to each other in a docked state. The second electronic device 2401 coupled to the first electronic device 2400 may include a docking structure. For example, at least one gap may be formed in a first housing portion 2410 of the first electronic device 2400 and/or a second housing portion 2420 of the second electronic device 2401.

The electronic devices 2400 and 2401 may include one or more non-conductive members, which are disposed on the first housing portion 2410 of the first electronic device 2400 and/or the second housing portion 2420 of the second electronic device 2401, respectively. Non-conductive members may be arranged in the first housing portion 2410 and the second housing portion 2420, respectively, and the number of non-conductive members arranged in the first housing portion 2410 may be the same as, or different from, the number of non-conductive members arranged in the second housing portion 2420. Non-conductive members may be symmetrically or asymmetrically arranged in the first housing portion 2410 and the second housing portion 2420, respectively, and the number of non-conductive members arranged in the first housing portion 2410 may be the same as, or different from the number of non-conductive members arranged in the second housing portion 2420.

For example, one or more first non-conductive members 2415 and 2416 may be disposed in the first housing portion 2410 and one or more second non-conductive members 2425 and 2426 may be disposed in the second housing portion 2420. When the first housing 2410 is docked to the second housing portion 2420, the first non-conductive members 2415 and 2416 and the second non-conductive members 2425 and 2426 may be arranged to be aligned to each other in the vertical direction and in the horizontal direction.

In the electronic device, the first housing portion 2410 of the first electronic device 2400 may be coupled to, or mounted on, the second housing portion 2420 of the second electronic device 2401 in a docking manner. According to various embodiments, the first housing portion 2410 may be an electronic device such as a smart phone, and the second housing portion 2420 may be a cover, an auxiliary input device, a charging device of the smart phone, a docking station mounted on a vehicle, etc. The second housing portion 2420 may be a charging device mounted on an interior table, desk, etc.

As another example, the first housing portion 2410 and the second housing portion 2420 may be separate smart phones, respectively. For example, the smart phones may be separately used, and may be used as one smart phone by being docked to each other. The second housing portion 2420 may include various external function devices.

The first housing portion 2410 of the first electronic device 2400 may include first to fourth metal frames 2411 to 2414.

The first housing portion 2410 may include first non-conductive members 2415 and 2416, which may be disposed in the first metal frame 2411. The second housing portion 2420 of the second electronic device 2401 may include second non-conductive members 2425 and 2426, which may be disposed on the facing body. In a state where the electronic devices 2400 and 2401 are docked to each other, the first non-conductive members 2415 and 2416 and the second non-conductive members 2425 and 2426 are symmetrically aligned in the vertical direction and in the horizontal direction. In the state where the first and second housing portions 2410 and 2420 are docked to each other, the first and second non-conductive members 2415, 2416, 2425, and 2426 may be disposed to be superimposed one on another, which may improve an antenna radiation efficiency of the first housing portion.

When the first face of the first housing portion 2410 of the first electronic device 2400 and the first face of the second housing portion 2420 of the second electronic device 2401 face each other, the first non-conductive members 2415 and 2416 and the second non-conductive members 2425 and 2426 are substantially aligned so that antenna radiation may be executed through the open region of the antenna formed in the first housing portion 2410 and an open region of the second housing portion 2420 substantially aligned thereto. Thus, when the antenna radiation is executed to the open region of the second housing 2420, the deterioration of the antenna radiation performance can be prevented.

In the electronic device 2400, one or more non-conductive member may be disposed in the first housing portion and one or more non-conductive member may be disposed in the second housing portion, in which, in the state where the electronic device is docked, the non-conductive members of the first and second housing portions 2410 and 2420 may be aligned to each other. For example, three or more non-conductive members may be disposed in each of the first and second housing portions 2410 and 2420.

According to various embodiments of the present disclosure, an electronic device may include: a housing including a first housing portion that includes a first face, a second face that faces opposite to the first face, and a first side face that encloses at least a portion of a space between the first face and the second face, and further including a second housing portion that includes a first face oriented to face the first face of the first housing portion, a second face that faces opposite to the first face, and a second side face that encloses at least a portion of a space between the first face and the second face; a connection part that interconnects the first housing portion and the second housing portion; a communication circuit disposed within the housing; a first conductive member extending along at least a portion of the first side face, and including at least one gap configured to electrically separate portions of the first conductive member; a first non-conductive member configured to fill at least a portion of the at least one gap of the first conductive member; a second conductive member extending along at least a portion of the second side face, and including at least one gap configured to electrically separate portions of the second conductive member; and a second non-conductive member configured to fill at least a portion of the at least one gap of the second conductive member, wherein, in a state where the first face of the second housing portion faces the first face of the first housing portion, the first non-conductive member and the second non-conductive member are substantially aligned to each other when viewed from the side face of the first or second housing portion.

The first conductive member may be electrically connected to the communication circuit.

The electronic device may further include a ground member positioned within the housing, the second conductive member may be electrically connected to the ground member.

The second conductive member may not be electrically connected to the communication circuit.

The first non-conductive member may include a metallic material, and the second conductive member may include a material that is the same as the metallic material of the first non-conductive member.

The metallic material may include at least one of aluminum, stainless steel, and amorphous metal alloy.

The first conductive member may include two gaps that are spaced apart from each other along at least a portion of the first side face to electrically separate portions of the first conductive member from each other, the first non-conductive member fills at least one of the two gaps, and the electronic device further may include a third non-conductive member that fills at least a portion of another one of the two gaps.

The second conductive member may include two gaps that are spaced apart from each other along at least a portion of the second side face to electrically separate portions of the second conductive member from each other, the second non-conductive member may fill at least one of the two gaps, and the electronic device may further include a fourth non-conductive member that fills at least a portion of another one of the two gaps.

In a state where the first face of the second housing portion faces the first face of the first housing portion, the third non-conductive member and the fourth non-conductive member may be substantially aligned to each other when viewed from the side face of the first or second housing portion.

Each of the first non-conductive member and the second non-conductive member may include one non-conductive member or a pair of non-conductive members spaced apart from each other, the one non-conductive member or the pair of non-conductive members being disposed on the first side face or the second side face.

The first non-conductive member and the second non-conductive member may include one non-conductive member disposed on the first side face or the second side face, and the other of the first non-conductive member and the second non-conductive member includes a pair of non-conductive members that are spaced apart from each other and disposed on the second side face or the first side face. In a state where the first face of the second housing portion faces the first face of the first housing portion, one of the pair of non-conductive members may be aligned to the one non-conductive member when viewed from the side face of the first or second housing portion.

The connection part may include a shaft configured to provide a pivot movement such that the first and second housing portions are folded to or unfolded from each other.

The connection part may include a connection structure configured to connect the first and second housing portions such that the first and second housing portions are slid in a direction parallel to the first or second face of the first housing in a state where the first and second housings at least partially face each other.

According to various embodiments, an electronic device may include: a first electronic device including a first side face; and a second electronic device connected to the first electronic device to be detachable/attachable or by using a connection device, and including a second side face that is at least partially aligned to the first side face when the second electronic device is connected to the first electronic device. The first electronic device may include: a first conductive rim structure that encloses at least a portion of the first side face and includes at least one first gap, and a first insulation portion that fills the at least one first gap to electrically separate portions of the first conductive rim structure. The second electronic device may include: a second conductive rim structure that encloses at least a portion of the second side face and includes at least one second gap, and a second insulation portion that fills the at least one second gap to electrically separate portions of the second conductive rim structure.

The first conductive rim structure may include one first gap or a pair of first gaps, and the second conductive rim structure may include one second gap or a pair of second gap.

The first conductive rim structure may have a substantially rectangular shape including a first side, a second side that is shorter than the first side, a third side that has a length that is equal to that of the first side, and a fourth side that has a length that is equal to the second side, and the at least one first gap is included in the second side.

The second conductive rim structure may have a substantially rectangular shape that includes a first side, a second side shorter than the first side, a third side that has a length that is equal to that of the first side, and a fourth side that has a length that is equal to that of the second side, and when the first and second electronic devices are connected to each other such that the first side face and the second side face are at least partially aligned to each other, the first to fourth sides are positioned to be adjacent to the first to fourth sides of the first conductive rim structure, respectively, and the at least one second gap may be included in the second side of the second conductive rime structure.

The first electronic device may further include a communication circuit electrically connected to a partial region of the first conductive rim structure.

At least one of the first and second electronic devices may further include a ground member positioned within the housing, and at least one of the first and second conductive rim structures may be electrically connected to the ground member.

At least one of the first electronic device and the second electronic device may include a display device, a processor that is electrically connected to the display device and the communication circuit, and a memory electrically connected to the processor. The memory may store instructions which, when executed, cause the processor to receive a wireless signal through the communication circuit by using at least a portion of the first conductive rim structure as an antenna, and to cause the processor to display at least one item on the display device, based on at least a portion of the received signal.

According to various embodiments of the present disclosure, a portable electronic device may include: a first electronic device portion including a first housing; and a second electronic device portion including a second housing connected to a portion of the first housing and folded to at least partially overlap with the first housing. The first housing may include a first side face, and the second housing may include a second side face that is aligned to the first side face when the second housing is folded to overlap with the first housing. The first side face of the first electronic device may include a first metal portion, a second metal portion electrically spaced apart from the first metal portion, and a first non-metal portion that fills a gap between the first metal portion and the second metal portion. The second side face of the second electronic device may include a third metal portion, a fourth metal portion electrically spaced apart from the third metal portion, and a second non-metal portion that fills a gap between the third metal portion and the fourth metal portion. The first non-metal portion and the second non-metal portion may be aligned to each other when the second housing is folded to overlap with the first housing.

The first side face of the first electronic device may include a fifth metal portion that is electrically spaced apart from the second metal portion, and a third non-metal portion that fills a gap between the second metal portion and the fifth metal portion. The second side face of the second electronic device may include a sixth metal portion that is electrically spaced apart from the fourth metal portion, and a fourth non-metal portion that fills a gap between the fourth metal portion and the sixth metal portion. The third non-metal portion and the fourth non-metal portion may be aligned to each other when the second housing is folded to overlap with the first housing.

According to various embodiments of the present disclosure, an electronic device may include: a foldable, slidable, or combinable housing including a first housing portion that includes a first face, a second face that faces opposite to the first face, and a side face that encloses at least a portion of a space between the first face and the second face and further including a second housing portion that includes a first face that faces the first face of the first housing portion when the second housing portion is folded, slid, or combined to overlap with the first housing portion, a second face that faces opposite to the first face, and a side face that encloses at least a portion of a space between the first face and the second face; a connection part that interconnects the first housing portion and the second housing portion; a communication circuit disposed within the housing; a first conductive member configured to form a portion of the side face of the first housing portion, and electrically connected to the communication circuit; a first non-conductive member configured to form another portion of the side face of the first housing, and to be in contact with the first conductive member so as to electrically separate the first conductive member from another portion of the side face of the first housing portion; a second conductive member configured to form a portion of the side face of the second housing portion; and a second non-conductive member configured to form another portion of the side face of the second housing, and to be in contact with the second conductive member so as to electrically separate the second conductive member from another portion of the side face of the second housing portion. When the first and second housing portions are folded, slid, or combined to overlap, the first non-conductive member and the second non-conductive member may be substantially aligned to each other when viewed from the side face of the first or second housing portion.

Each of the elements described in the present document may be configured with one or more components, and the names of the corresponding elements may vary based on the type of the electronic device 100. According to various embodiments, the electronic device 100 may include at least one of the elements described in the present document. Some elements may be omitted or other additional elements may be further included in the electronic device. Also, some of the elements of the electronic device 100 may be combined into one entity, which may perform functions identical to those of the corresponding elements before the combination.

While the disclosure has been shown and described with reference to various embodiments described herein, it will be understood by those skilled in the art that various changes in form and detail may be made therein without departing from the spirit and scope of the disclosure as defined, not by the detailed description and embodiments, but by the appended claims and their equivalents.

What is claimed is:

1. An electronic device comprising:
    a housing comprising:
        a first housing portion that includes a first side face, and
        a second housing portion that includes a second side face; and
        a connection part that connects the first housing portion and the second housing portion,
    wherein a first conductive member extends along at least a portion of the first side face,
    wherein a first non-conductive member is disposed on a perimeter of the first side face,
    wherein a second conductive member extends along at least a portion of the second side face,
    wherein a second non-conductive member is disposed on a perimeter of the second side face, and
    wherein, when the second housing portion faces the first housing portion, the first non-conductive member and the second non-conductive member are substantially aligned and radiation radiated from an antenna radiator formed by at least a portion of the first housing portion radiates through the second non-conductive member of the second housing portion.

2. The electronic device of claim 1, further comprising:
    a ground member positioned within the housing,
    wherein the second conductive member is electrically connected to the ground member.

3. The electronic device of claim 2, further comprising:
    a communication circuit disposed within the housing,
    wherein the first conductive member is electrically connected to the communication circuit, and
    wherein the second conductive member is not electrically connected to the communication circuit.

4. The electronic device of claim 1, wherein the first conductive member includes a metallic material,
    wherein the second conductive member includes a material that is the same as the metallic material of the first conductive member, and
    wherein the metallic material includes at least one of aluminum, stainless steel, and amorphous metal alloy.

5. The electronic device of claim 1, further comprising:
    a third non-conductive member, wherein the first side face includes two gaps that are spaced apart from each other to electrically separate portions of the first conductive member from each other, wherein the first non-conductive member fills at least one of the two gaps, and wherein the third non-conductive member fills at least a portion of another one of the two gaps.

6. The electronic device of claim 5, further comprising:
a fourth non-conductive member, wherein the second side face includes two gaps that are spaced apart from each other to electrically separate portions of the second conductive member from each other, wherein the second non-conductive member fills at least one of the two gaps, and wherein the fourth non-conductive member fills at least a portion of another one of the two gaps.

7. The electronic device of claim 6, wherein, in a state where the second housing portion faces the first housing portion, the third non-conductive member and the fourth non-conductive member are substantially aligned.

8. The electronic device of claim 1, wherein each of the first non-conductive member and the second non-conductive member includes one non-conductive member or a pair of non-conductive members spaced apart from each other.

9. The electronic device of claim 1, wherein one of the first non-conductive member and the second non-conductive member includes one non-conductive member and another of the first non-conductive member and the second non-conductive member includes a pair of non-conductive members that are spaced apart from each other, and wherein, when the second housing portion faces the first housing portion, one of the pair of non-conductive members is aligned to the one non-conductive member.

10. The electronic device of claim 1, wherein the connection part includes a shaft configured to provide a pivot movement such that the first housing portion and the second housing portion are folded to or unfolded from each other.

11. The electronic device of claim 1, wherein the connection part includes a connection structure configured to connect the first housing portion and the second housing portion such that the first housing portion and the second housing portion are slid in a direction parallel to the first housing when the first housing portion and second housing portion at least partially face each other.

12. A portable electronic device comprising:
a first electronic device portion including a first housing having a first side face; and
a second electronic device portion including a second housing having a second side face, the second housing connected to the first housing and folded to at least partially overlap with the first housing, wherein the first side face of the first electronic device includes:
a first metal portion,
a second metal portion electrically spaced apart from the first metal portion, and
a first non-metal portion between the first metal portion and the second metal portion, wherein the second side face of the second electronic device includes:
a third metal portion,
a fourth metal portion electrically spaced apart from the third metal portion, and
a second non-metal portion between the third metal portion and the fourth metal portion, and wherein the first non-metal portion and the second non-metal portion are aligned to each other when the second housing is folded to overlap with the first housing.

13. The electronic device of claim 12,
wherein the first side face of the first electronic device includes:
a fifth metal portion that is electrically spaced apart from the second metal portion, and
a third non-metal portion between the second metal portion and the fifth metal portion, wherein the second side face of the second electronic device includes:
a sixth metal portion that is electrically spaced apart from the fourth metal portion, and
a fourth non-metal portion between the fourth metal portion and the sixth metal portion, and wherein the third non-metal portion and the fourth non-metal portion are aligned to each other when the second housing is folded to overlap with the first housing.

* * * * *